US011246017B2

(12) United States Patent
Tegreene

(10) Patent No.: US 11,246,017 B2
(45) Date of Patent: Feb. 8, 2022

(54) MOTE NETWORKS USING DIRECTIONAL ANTENNA TECHNIQUES

(71) Applicant: JTT INVESTMENT PARTNERS, LLC, Atlanta, GA (US)

(72) Inventor: Clarence T. Tegreene, Mercer Island, WA (US)

(73) Assignee: JTT INVESTMENT PARTNERS, LLC, Atlanta, GA (US)

( * ) Notice: Subject to any disclaimer, the term of this patent is extended or adjusted under 35 U.S.C. 154(b) by 89 days.

(21) Appl. No.: 16/726,504

(22) Filed: Dec. 24, 2019

(65) Prior Publication Data

US 2020/0382920 A1 Dec. 3, 2020

Related U.S. Application Data

(60) Continuation of application No. 15/148,830, filed on May 6, 2016, now abandoned, which is a division of
(Continued)

(51) Int. Cl.
*H04W 4/38* (2018.01)
*G06F 16/22* (2019.01)
(Continued)

(52) U.S. Cl.
CPC ............. *H04W 4/38* (2018.02); *G01D 21/00* (2013.01); *G06F 16/22* (2019.01);
(Continued)

(58) Field of Classification Search
CPC ....... H04W 4/38; H04W 24/08; H04W 84/18; G06F 16/22; G06F 16/245; G06F 16/248; G06F 16/2228; G06F 16/2477; G06F 3/0481; H04B 17/318; H04B 17/336; H04L 5/0048; G01D 21/00
See application file for complete search history.

(56) References Cited

U.S. PATENT DOCUMENTS

| 7,277,679 B1* | 10/2007 | Barratt | H04B 7/084 375/347 |
| 2003/0017853 A1* | 1/2003 | Kanamaluru | H04B 7/0617 455/562.1 |
| 2004/0114535 A1* | 6/2004 | Hoffmann | H04B 7/088 370/252 |

OTHER PUBLICATIONS

Sievenpiperetal, Two-Dimensional Beam Steering Using an Electrically Tunable Impedance Surface, Oct. 2003 (Year: 2003).*

* cited by examiner

*Primary Examiner* — Yaotang Wang
(74) *Attorney, Agent, or Firm* — Fish & Richardson P.C.

(57) ABSTRACT

In some embodiments, the present invention is directed to a first mote, at least including: a first-mote directional antenna; wherein the first-mote directional antenna comprises a plurality of first antennas elements; ad hoc programmed computer processor which is configured to perform at least causing to establish a first communication link between the first mote and a second mote, based on a first direction; where the first direction corresponds to a first state of the plurality of first antennas elements; monitoring, in real time, the initial communication link data; determining, based on the initial communication link data, a second; selectively varying an antenna property operatively associated with the plurality of first antennas elements to establish a second state, corresponding to the second direction, and causing to establish a second communication link between the first mote and the second mote, based on the second state.

39 Claims, 61 Drawing Sheets

Related U.S. Application Data application No. 14/744,863, filed on Jun. 19, 2015, now abandoned, which is a continuation of application No. 10/900,163, filed on Jul. 27, 2004, now Pat. No. 9,062,992, which is a continuation of application No. 10/844,613, filed on May 12, 2004, now abandoned, which is a continuation of application No. 10/844,564, filed on May 12, 2004, now abandoned, which is a continuation of application No. 10/844,612, filed on May 12, 2004, now abandoned, which is a continuation of application No. 10/844,614, filed on May 12, 2004, now Pat. No. 8,346,846, which is a continuation of application No. 10/843,987, filed on May 12, 2004, now abandoned, which is a continuation of application No. 10/816,375, filed on Mar. 31, 2004, now Pat. No. 8,200,744, which is a continuation of application No. 10/816,082, filed on Mar. 31, 2004, now abandoned, and a continuation of application No. 10/816,358, filed on Mar. 31, 2004, now Pat. No. 8,161,097, which is a continuation of application No. 10/816,102, filed on Mar. 31, 2004, now Pat. No. 8,335,814, which is a continuation of application No. 10/816,364, filed on Mar. 31, 2004, now abandoned, which is a continuation of application No. 10/813,967, filed on Mar. 31, 2004, now Pat. No. 7,366,544, which is a continuation of application No. 10/814,454, filed on Mar. 31, 2004, now Pat. No. 7,317,898, which is a continuation of application No. 10/850,914, filed on May 20, 2004, now abandoned, which is a continuation of application No. 10/877,109, filed on Jun. 25, 2004, now Pat. No. 7,389,295, which is a continuation of application No. 10/877,099, filed on Jun. 25, 2004, now Pat. No. 7,599,696, which is a continuation of application No. 10/882,119, filed on Jun. 30, 2004, now abandoned, which is a continuation of application No. 10/900,147, filed on Jul. 27, 2004, now abandoned.

(51) Int. Cl.

| | |
|---|---|
| *G06F 16/245* | (2019.01) |
| *G06F 16/248* | (2019.01) |
| *G06F 16/2458* | (2019.01) |
| *G01D 21/00* | (2006.01) |
| *H04B 17/318* | (2015.01) |
| *H04B 17/336* | (2015.01) |
| *H04L 5/00* | (2006.01) |
| *H04W 24/08* | (2009.01) |
| *H04W 28/14* | (2009.01) |
| *H04W 84/18* | (2009.01) |
| *G06F 3/0481* | (2013.01) |

(52) U.S. Cl.
CPC ........ *G06F 16/2228* (2019.01); *G06F 16/245* (2019.01); *G06F 16/248* (2019.01); *G06F 16/2477* (2019.01); *H04B 17/318* (2015.01); *H04B 17/336* (2015.01); *H04L 5/0048* (2013.01); *H04W 24/08* (2013.01); *G06F 3/0481* (2013.01); *H04W 28/14* (2013.01); *H04W 84/18* (2013.01)

FIG. 5B

| MULTI-MOTE INDEX ENTRY FOR MOTE ADDRESS 1A CONTENT INDEXES | | | | MULTI-MOTE INDEX ENTRY FOR MOTE ADDRESS 3A CONTENT INDEXES | | | |
|---|---|---|---|---|---|---|---|
| MOTE 1A: SENSING INDEX | | | | MOTE 3A: SENSING INDEX | | | |
| Light Device | Light Device Information Available | Query Command Format | Output Format | Pressure Device | Pressure Device Information Available | Query Command Format | Output Format |
| Electrical/ Magnetic Device | Electrical/ Magnetic Device Information Available | Query Command Format | Output Format | Temp. Device | Temp. Device Information Available | Query Command Format | Output Format |
| Inertial Device | Inertial Device Information Available | Query Command Format | Output Format | Volume Device | Volume Device Information Available | Query Command Format | Output Format |
| Antenna | Antenna Information Available | Query Command Format | Output Format | Antenna | Antenna Information Available | Query Command Format | Output Format |
| MOTE 1A: CONTROL INDEX | | | | MOTE 3A: CONTROL INDEX | | | |
| Light Sensor | Light Device Commands Available | Control Command Format | Feedback Format | Pressure Device | Pressure Device Commands Available | Control Command Format | Feedback Format |
| Electrical/ Magnetic Device | Electrical/ Magnetic Device Commands Available | Control Command Format | Feedback Format | Temp. Device | Temp. Device Commands Available | Control Command Format | Feedback Format |
| Inertial Device | Inertial Device Commands Available | Control Command Format | Feedback Format | Volume Device | Volume Device Commands Available | Control Command Format | Feedback Format |
| Antenna | Antenna Commands Available | Control Command Format | Feedback Format | Antenna | Antenna Commands Available | Control Command Format | Feedback Format |

504

| 5A | 5B |
|---|---|

Key To Fig. 5

FIG. 11A

Federated Mote Index for First-Administered Set of Motes and Second-Administered Set of Motes 916

| AGGREGATION OF CONTENT INDEXES FOR MOTE ADDRESSES 1A AND 2A OF FIRST-ADMINISTERED SET OF MOTES | | | | AGGREGATION OF CONTENT INDEXES FOR MOTE ADDRESSES 3A AND 4A OF SECOND-ADMINISTERED SET OF MOTES | | | |
|---|---|---|---|---|---|---|---|
| MOTE 1A OF FIRST-ADMINISTERED SET OF MOTES: SENSING INDEX | | | | MOTE 3A OF SECOND-ADMINISTERED SET OF MOTES: SENSING INDEX | | | |
| Light Device | Light Device Information Available | Query Command Format | Output Format | Pressure Device | Pressure Device Information Available | Query Command Format | Output Format |
| Electrical/ Magnetic Device | Electrical/ Magnetic Device Information Available | Query Command Format | Output Format | Temp. Device | Temp. Device Information Available | Query Command Format | Output Format |
| Inertial Device | Inertial Device Information Available | Query Command Format | Output Format | Volume Device | Volume Device Information Available | Query Command Format | Output Format |
| Antenna | Antenna Information Available | Query Command Format | Output Format | Antenna | Antenna Information Available | Query Command Format | Output Format |
| MOTE 2A OF FIRST-ADMINISTERED SET OF MOTES: CONTROL INDEX | | | | MOTE 4A OF SECOND-ADMINISTERED SET OF MOTES: CONTROL INDEX | | | |
| Light Sensor | Light Device Commands Available | Control Command Format | Feedback Format | Pressure Device | Pressure Device Commands Available | Control Command Format | Feedback Format |
| Electrical/ Magnetic Device | Electrical/ Magnetic Device Commands Available | Control Command Format | Feedback Format | Temp. Device | Temp. Device Commands Available | Control Command Format | Feedback Format |
| Inertial Device | Inertial Device Commands Available | Control Command Format | Feedback Format | Volume Device | Volume Device Commands Available | Control Command Format | Feedback Format |
| Antenna | Antenna Commands Available | Control Command Format | Feedback Format | Antenna | Antenna Commands Available | Control Command Format | Feedback Format |

| 11A | 11B |
|---|---|

Key To Fig. 11

FIG. 11B

| 11A | 11B |
|---|---|

Key To Fig. 11

| MOTE 2A OF FIRST-ADMINISTERED SET OF MOTES: ROUTING /SPATIAL INDEX | | | | MOTE 4A OF SECOND-ADMINISTERED SET OF MOTES: ROUTING /SPATIAL INDEX | | | |
|---|---|---|---|---|---|---|---|
| Mote-Network Address 2A | Comm. Link Quality of Service: Good | Absolute Coordinates: Long Lat. (e.g., GPS) | Relative Coordinates (e.g., 2-d or 3-d relative to mote 1A location) | Mote-Network Address 1A | Comm. Link Quality of Service: Good | Absolute Coordinates: Long Lat. (e.g., GPS) | Relative Coordinates (e.g., 2-d or 3-d relative to mote 1A location) |
| Mote-Network Address 3A | Comm. Link Quality of Service: Fair | Absolute Coordinates: Long Lat. (e.g., GPS) | Relative Coordinates (e.g., 2-d or 3-d relative to mote 1A location) | Mote-Network Address 2A | Comm. Link Quality of Service: Fair | Absolute Coordinates: Long Lat. (e.g., GPS) | Relative Coordinates (e.g., 2-d or 3-d relative to mote 1A location) |
| Mote-Network Address 5A | Comm. Link Quality of Service: Poor | Absolute Coordinates: Long Lat. (e.g., GPS) | Relative Coordinates (e.g., 2-d or 3-d relative to mote 1A location) | Mote-Network Address 5A | Comm. Link Quality of Service: Poor | Absolute Coordinates: Long Lat. (e.g., GPS) | Relative Coordinates (e.g., 2-d or 3-d relative to mote 1A location) |
| | | | | Mote-Network Address 6A | Comm. Link Quality of Service: Fair | Absolute Coordinates: Long Lat. (e.g., GPS) | Relative Coordinates (e.g., 2-d or 3-d relative to mote 1A location) |

916

MOTE NETWORKS USING DIRECTIONAL ANTENNA TECHNIQUES

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):

PRIORITY APPLICATIONS

For purposes of the USPTO extra-statutory requirements, the present application constitutes a divisional of U.S. patent application Ser. No. 14/744,863, entitled "USING MOTE-ASSOCIATED INDEXES", naming Edward K. Y. Jung and Clarence T. Tegreene as inventors, filed Jun. 19, 2015, which is currently co-pending, or is an application of which a currently co-pending application is entitled to the benefit of the filing date; and which is continuation of and claims priority to:

1. For purposes of the USPTO extra-statutory requirements, the present application constitutes a continuation of U.S. patent application Ser. No. 10/844,613, now U.S. Pat. No. 9,062,992, entitled MOTE-ASSOCIATED LOG CREATION, naming Edward K. Y. Jung and Clarence T. Tegreene as inventors, filed 12 May 2004, which is currently co-pending, or is an application of which a currently co-pending application is entitled to the benefit of the filing date;

2. For purposes of the USPTO extra-statutory requirements, the present application constitutes a continuation of U.S. patent application Ser. No. 10/844,564, entitled TRANSMISSION OF MOTE-ASSOCIATED LOG DATA, naming Edward K. Y. Jung and Clarence T. Tegreene as inventors, filed 12 May 2004, which is currently abandoned, but is an application of which a currently co-pending application is entitled to the benefit of the filing date;

3. For purposes of the USPTO extra-statutory requirements, the present application constitutes a continuation of U.S. patent application Ser. No. 10/844,612, AGGREGATING MOTE-ASSOCIATED LOG DATA, naming Edward K. Y. Jung and Clarence T. Tegreene as inventors, filed 12 May 2004, which is currently co-pending, or is an application of which a currently co-pending application is entitled to the benefit of the filing date;

4. For purposes of the USPTO extra-statutory requirements, the present application constitutes a continuation of U.S. patent application Ser. No. 10/844,614, entitled TRANSMISSION OF AGGREGATED MOTE-ASSOCIATED LOG DATA, naming Edward K. Y. Jung and Clarence T. Tegreene as inventors, filed 12 May 2004, now issued as U.S. Pat. No. 8,346,846, and which is an application of which a currently co-pending application is entitled to the benefit of the filing date;

5. For purposes of the USPTO extra-statutory requirements, the present application constitutes a continuation of U.S. patent application Ser. No. 10/843,987, entitled FEDERATING MOTE-ASSOCIATED LOG DATA, naming Edward K. Y. Jung and Clarence T. Tegreene as inventors, filed 12 May 2004, which is currently abandoned, but is an application of which a currently co-pending application is entitled to the benefit of the filing date;

6. For purposes of the USPTO extra-statutory requirements, the present application constitutes a continuation of U.S. patent application Ser. No. 10/816,375, entitled MOTE-ASSOCIATED INDEX CREATION, naming Edward K. Y. Jung and Clarence T. Tegreene as inventors, filed 31 Mar. 2004, now issued as U.S. Pat. No. 8,200,744, and which is an application of which a currently co-pending application is entitled to the benefit of the filing date;

7. For purposes of the USPTO extra-statutory requirements, the present application constitutes a continuation of U.S. patent application Ser. No. 10/816,082, entitled TRANSMISSION OF MOTE-ASSOCIATED INDEX DATA, naming Edward K. Y. Jung and Clarence T. Tegreene as inventors, filed 31 Mar. 2004, which is currently abandoned, but is an application of which a currently co-pending application is entitled to the benefit of the filing date;

8. For purposes of the USPTO extra-statutory requirements, the present application constitutes a continuation of U.S. patent application Ser. No. 10/816,358, entitled AGGREGATING MOTE-ASSOCIATED INDEX DATA, naming Edward K. Y. Jung and Clarence T. Tegreene as inventors, filed 31 Mar. 2004, now issued as U.S. Pat. No. 8,161,097, and which is an application of which a currently co-pending application is entitled to the benefit of the filing date;

9. For purposes of the USPTO extra-statutory requirements, the present application constitutes a continuation of U.S. patent application Ser. No. 10/816,102, entitled TRANSMISSION OF AGGREGATED MOTE-ASSOCIATED INDEX DATA, naming Edward K. Y. Jung and Clarence T. Tegreene as inventors, filed 31 Mar. 2004, now issued as U.S. Pat. No. 8,335,814, and which is an application of which a currently co-pending application is entitled to the benefit of the filing date;

10. For purposes of the USPTO extra-statutory requirements, the present application constitutes a continuation of U.S. patent application Ser. No. 10/816,364, entitled FEDERATING MOTE-ASSOCIATED INDEX DATA, naming Edward K. Y. Jung and Clarence T. Tegreene as inventors, filed 31 Mar. 2004, which is currently co-pending, or is an application of which a currently co-pending application is entitled to the benefit of the filing date;

11. For purposes of the USPTO extra-statutory requirements, the present application constitutes a continuation of U.S. patent application Ser. No. 10/813,967, entitled MOTE NETWORKS HAVING DIRECTIONAL ANTENNAS, naming Clarence T. Tegreene as inventor, filed 31 Mar. 2004, now issued as U.S. Pat. No. 7,366,544, and which is an application of which a currently co-pending application is entitled to the benefit of the filing date;

12. For purposes of the USPTO extra-statutory requirements, the present application constitutes a continuation of U.S. patent application Ser. No. 10/814,454, entitled MOTE NETWORKS USING DIRECTIONAL ANTENNA TECHNIQUES, naming Clarence T. Tegreene as inventor, filed 31 Mar. 2004, now issued as U.S. Pat. No. 7,317,898, and which is an application of which a currently co-pending application is entitled to the benefit of the filing date;

13. For purposes of the USPTO extra-statutory requirements, the present application constitutes a continuation of U.S. patent application Ser. No. 10/850,914, entitled USING MOTE-ASSOCIATED LOGS, naming Edward K. Y. Jung and Clarence T. Tegreene as inventors, filed 20 May 2004, which is currently abandoned, but is an application of which a currently co-pending application is entitled to the benefit of the filing date;

14. For purposes of the USPTO extra-statutory requirements, the present application constitutes a continuation of U.S. patent application Ser. No. 10/877,109, entitled USING FEDERATED MOTE-ASSOCIATED LOGS, naming Edward K. Y. Jung and Clarence T. Tegreene as inventors, filed 25 Jun. 2004, now issued as U.S. Pat. No. 7,389,295, and which is an application of which a currently co-pending application is entitled to the benefit of the filing date;

15. For purposes of the USPTO extra-statutory requirements, the present application constitutes a continuation of U.S. patent application Ser. No. 10/877,099, entitled FREQUENCY REUSE TECHNIQUES IN MOTE-APPROPRIATE NETWORKS, naming Edward K. Y. Jung and Clarence T. Tegreene as inventors, filed 25 Jun. 2004, now issued as U.S. Pat. No. 7,599,696, and which is an application of which a currently co-pending application is entitled to the benefit of the filing date;

16. For purposes of the USPTO extra-statutory requirements, the present application constitutes a continuation of U.S. patent application Ser. No. 10/882,119, entitled MOTE-APPROPRIATE NETWORK POWER REDUCTION TECHNIQUES, naming Edward K. Y. Jung and Clarence T. Tegreene as inventors, filed 30 Jun. 2004, which is currently abandoned, but is an application of which a currently co-pending application is entitled to the benefit of the filing date; and 17. For purposes of the USPTO extra-statutory requirements, the present application constitutes a continuation of U.S. patent application Ser. No. 10/900,147, entitled USING FEDERATED MOTE-ASSOCIATED INDEXES, naming Edward K. Y. Jung and Clarence T. Tegreene as inventors, filed contemporaneously herewith, which is currently abandoned, but is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

TECHNICAL FIELD

The present application is related, in general, to mote networks systems using directional antenna techniques.

SUMMARY

In some embodiments, the present application is directed to an exemplary inventive method which includes at least: causing, by at least one ad hoc programmed computer processor of at least one first mote, to establish a first communication link between the at least one first mote and at least one second mote, based on a first direction associated with the at least one second mote; wherein the at least one first mote comprises at least one first-mote directional antenna; wherein the at least one first-mote directional antenna comprises a plurality of first antennas elements; wherein the first direction corresponds to a first state of the plurality of first antennas elements; wherein the at least one initial communication link comprises a first plurality of signals which are exchanged between the at least one first mote and the at least one second mote; wherein the first plurality of signals includes: i) a plurality of first transmitted signals, being transmitted by the at least one first mote to the at least one second mote; ii) a plurality of first received signals, being received by the at least one first mote from the at least one second mote; monitoring, in real time, by the at least one ad hoc programmed computer processor of the at least one first mote, the initial communication link data regarding at least one of: i) a level of the at least one signal indicator of at least one signal characteristic of each first received signal of the plurality of first received signals, ii) a level change of the at least one signal indicator of the at least one signal characteristic of each first received signal of the plurality of first received signals, and iii) a rate of change of the at least one signal indicator of the at least one signal characteristic of each first received signal of the plurality of first received signals; storing, in a memory, the initial communication link data; determining, by the at least one ad hoc programmed computer processor of the at least one first mote, based on the initial communication link data, a second direction associated with the at least one second mote, wherein the second direction is distinct from the first direction; selectively varying, by the at least one ad hoc programmed computer processor of the at least one first mote, at least one antenna property operatively associated with the plurality of first antennas elements to establish a second state of the plurality of first antenna elements, wherein the second state of the plurality of first antenna elements corresponds to the second direction associated with the at least one second mote; and causing, by the at least one ad hoc programmed computer processor of the at least one first mote, to establish a second communication link between the at least one first mote and the at least one second mote, based on the second state of the plurality of first antenna elements.

In some embodiments, the present application is directed to an exemplary inventive first mote, including at least: at least one first-mote directional antenna; wherein the at least one first-mote directional antenna comprises a plurality of first antennas elements; at least one ad hoc programmed computer processor which is configured to perform at least the following operations: causing to establish a first communication link between the first mote and at least one second mote, based on a first direction associated with the at least one second mote; wherein the first direction corresponds to a first state of the plurality of first antennas elements; wherein the at least one initial communication link comprises a first plurality of signals which are exchanged between the first mote and the at least one second mote; wherein the first plurality of signals comprises: i) a plurality of first transmitted signals, being transmitted by the first mote to the at least one second mote; ii) a plurality of first received signals, being received by the first mote from the at least one second mote; monitoring, in real time, the initial communication link data regarding at least one of: i) a level of the at least one signal indicator of at least one signal characteristic of each first received signal of the plurality of first received signals, ii) a level change of the at least one signal indicator of the at least one signal characteristic of each first received signal of the plurality of first received signals, and iii) a rate of change of the at least one signal indicator of the at least one signal characteristic of each first received signal of the plurality of first received signals; storing, in a memory, the initial communication link data; determining, based on the initial communication link data, a second direction associated with the at least one second mote, wherein the second direction is distinct from the first direction; selectively varying at least one antenna property operatively associated with the plurality of first antennas elements to establish a second state of the plurality of first antenna elements, wherein the second state of the plurality of first antenna elements corresponds to the second direction associated with the at least one second mote; and causing to establish a second communication link between the first mote and the at least one second mote, based on the second state of the plurality of first antenna elements.

BRIEF DESCRIPTION OF THE FIGURES

FIGS. 5A-5B of FIG. 5 depict an exploded view of mote 500 forming a part of mote-appropriate network 550 that may serve as a context for introducing one or more processes and/or devices described herein.

FIGS. 11A-11B of FIG. 11 show an exemplary exploded view of federated index 916.

The use of the same symbols in different drawings typically indicates similar or identical items.

DETAILED DESCRIPTION

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Mote-Associated Index Creation

A. Structure(s) and/or System(s)

Figure 1:
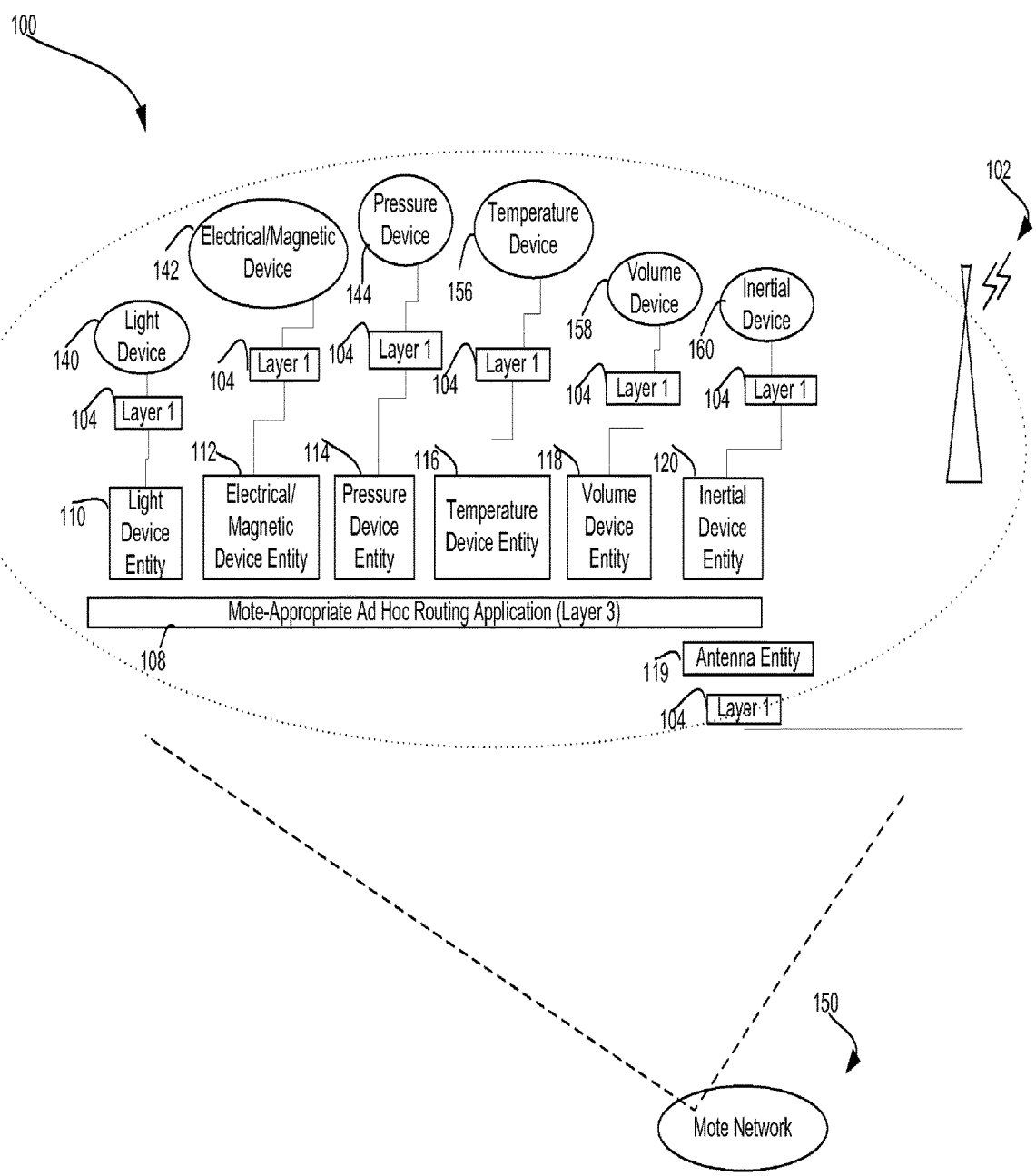
FIG. 1 shows an example of mote 100 of mote-appropriate network 150 that may serve as a context of one or more processes and/or devices described herein.

With reference now to FIG. 1, shown is an example of mote 100 of mote-appropriate network 150 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 100 depicts a specific example of a more general mote. Mote 100 is illustrated as having antenna 102, physical layer 104, antenna entity 119, network layer 108 (shown for sake of example as a mote-appropriate ad hoc routing application), light device entity 110, electrical/magnetic device entity 112, pressure device entity 114, temperature device entity 116, volume device entity 118, and inertial device entity 120. Light device entity 110, electrical/magnetic device entity 112, pressure device entity 114, temperature device entity 116, volume device entity 118, antenna entity 119, and inertial device entity 120 are depicted to respectively couple through physical layers 104 with light device 140, electrical/magnetic device 142, pressure device 144, temperature device 156, volume device 158, antenna 102, and inertial device 160. Those skilled in the art will appreciate that the herein described entities and/or devices are illustrative, and that other entities and/or devices consistent with the teachings herein may be substituted and/or added.

Those skilled in the art will appreciate that in some implementations motes may contain their own power sources, while in other implementations power may be supplied to motes by an outside source (e.g., through electromagnetic induction from a parasitic network or optical to electrical conversion). Those skilled in the art will further appreciate that there are various ways in which motes may be distributed to form a mote network. For example, in some implementations the motes are randomly dispersed, while in other implementations the motes are either directly or indirectly in physical contact with (e.g., affixed to and/or integrated within) various inanimate and/or animate units (e.g., inanimate structural components such as those used in building, and/or bridges, and/or machines, and/or animate structural components such as rodents and/or birds and/or other animals). Those skilled in the art will appreciate that the herein described powering and/or distribution approaches are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 140 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 142 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 144 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 156 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 158 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 160 is implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) may be present and active to allow/provide communications consistent with the teachings herein. Those having skill in the art will appreciate that these entities and/or functions are not expressly shown/described herein for sake of clarity.

Figure 2:
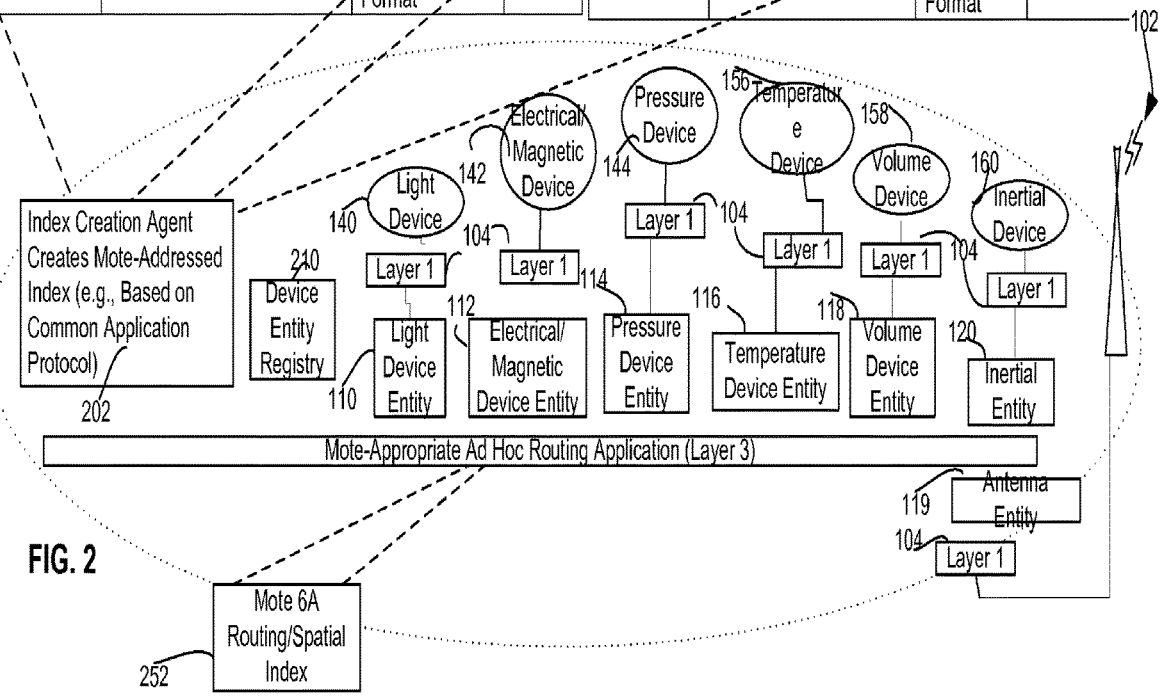
FIG. 2 depicts an exploded view of mote 200 that forms a part of a mote-appropriate network (e.g., as shown in FIGS. 4, 7, 8, 9, and/or 10).

Referring now to FIG. 2, depicted is an exploded view of mote 200 that forms a part of a mote-appropriate network (e.g., as shown in FIGS. 4, 7, 8, 9, and/or 10). Mote 200 is illustrated as similar to mote 100 (FIG. 1), but with the addition of index creation agent 202, mote-addressed sensing index 204, mote-addressed control index 206, and mote-addressed routing/spatial index 252. Specific instances of mote-addressed control and/or mote-addressed sensing indexes are shown in FIG. 2. For an example of what one implementation of a mote-addressed routing/spatial index might contain, see the mote-addressed routing/spatial indexes shown internal to multi-mote content index 504 of FIGS. 5A-5B. As shown in FIGS. 5A-5B, in some implementations a mote-addressed routing/spatial index will contain a listing of mote addresses directly accessible from a mote (e.g., via direct radio transmission/reception from/by antenna 102), an assessment of qualities of data communications service on the data communication links to such directly accessible motes, and/or a listing of relative and/or absolute spatial coordinates of such directly accessible motes.

In one implementation, index creation agent 202 is a computer program—resident in mote 200—that executes on a processor of mote 200 and that constructs and/or stores mote-addressed sensing index 204, mote-addressed control index 206, and/or mote-addressed routing/spatial index 252 in memory of mote 200. In some implementations, index creation agent 202 is pre-installed on mote 200 prior to mote 200 being added to a mote-appropriate network, while in other implementations index creation agent 202 crawls and/or is transmitted to mote 200 from another location (e.g., an index creation agent at another mote or another networked computer (not shown) clones itself and sends that clone to mote 200). In yet other implementations, index creation agent 202 is installed at a proxy (not shown) for mote 200.

The inventors point out that in some applications the systems and/or processes transfer their instructions in a piecewise fashion over time, such as is done in the mote-appropriate Mate' virtual machine of the related art. The inventors also point out that in some applications motes are low-power and/or low bandwidth devices, and thus in some implementations the system(s) and process(es) described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 200 of FIG. 2 can serve as a context in which one or more processes and/or devices may be illustrated. In one exemplary process, once index creation agent 202 has become active at mote 200, index creation agent 202 communicates with device entity registry 210 to receive device identifiers indicative of device entities present at mote 200 (e.g., light device entity 110, electrical/magnetic device entity 112, pressure device entity 114, etc.). In some implementations, device entities of mote 200 register their presences with device entity registry 210, while in other implementations the operating system of mote 200 registers the device entities when the operating system installs the device entities and/or their associated drivers (if any). In some implementations, once index creation agent 202 becomes aware of what device entities are present, index creation agent 202 communicates with the device entities (e.g., light device entity 110, electrical/magnetic entity 112, pressure entity 114, etc.) to find out what sensing functions are present and/or available at their various respectively associated devices (e.g., light device 140, electrical/magnetic device 142, pressure device 144, etc.), the formats used to query their various respectively associated devices, and the format in which the information will be rendered by their various respectively associated devices; index creation agent 202 also queries the device entities to find out what control functions are present at their various respectively associated devices, the formats used to cause their various respectively associated devices to execute their respective control functions, and the formats in which their various respectively associated devices will render feedback about control command execution. In some implementations, index creation agent 202 also communicates with routing/spatial index 252 to find out the mote-network address of mote 200 (e.g., mote-network address 6A) as well as other spatial information (e.g., mote-network addresses and/or spatial locations of the motes that can be reached directly by wireless link from mote 200; spatial locations may be absolute and/or relative to some marker, such as mote 200 itself). In some implementations, index creation agent 202 communicates with the device entities using a common application protocol which specifies standard interfaces that allow index creation agent 202 to garner the necessary information without knowing the internal workings and/or architectures of each specific device entity. In other implementations, such a common application protocol is not used.

In various implementations, contemporaneous with and/or subsequent to index creation agent 202 communicating with the device entities, index creation unit 202 creates one or more mote-addressed content indexes which in some implementations are associated with the mote-network address of the mote at which index creation unit 202 resides. The inventors point out that examples of the term "index," and/or phrases containing the term "index," exist in the text (e.g., independent claims, dependent claims, detailed description, and/or summary) and/or drawings forming the present application and that such term and/or phrases may have scopes different from like terms and/or phrases used in other contexts. Mote 200 is depicted for sake of illustration as having a mote-address of 6A. Accordingly, specific examples of more general mote-addressed content indexes are shown in FIG. 2 as mote 6A-addressed sensing index 204 and mote 6A-addressed control index 206, which respectively list the sensing and control capabilities in association with device-identifiers associated with devices present and/or available at mote 200; in addition, shown as yet another specific example of more general mote-addressed content indexes is mote 6A-addressed routing/spatial index 252 which typically contains a listing of mote-network addresses of those motes directly accessible from mote 200 and such directly accessible motes' spatial orientations relative to mote 200 and/or some other common spatial reference location (e.g., GPS). In some implementations, index creation unit 202 creates one or more extensible mote-addressed content indexes (e.g., creating the one or more extensible indexes in response to a type of content being indexed).

In addition, those having skill in the art will appreciate that while direct mote addressing is shown and described herein for sake of clarity (e.g., mote-appropriate network addresses), the mote addressing described herein may also entail indirect addressing, dependent upon context. Examples of indirect addressing include approaches where a mote-address encodes an address of an agent that in turn produces the address of the mote (analogous to the Domain Name System in the Internet), or where the mote-address directly or indirectly encodes a route to a mote (analogous to explicit or implicit routable addresses.). Those having skill in the art will appreciate that adapting the teachings herein to indirect addressing may be done with a reasonable amount of experimentation, and that such adaptation is not expressly set forth herein for sake of clarity.

As noted herein, a content index may have a device identifier which in various implementations may include an implicit and/or explicit indicator used to reference the specific device at that mote. Those having skill in the art will appreciate that ways in which such may be achieved include the use of a structured name. Those having skill in the art will appreciate that in some implementations mote-local devices may also have global addresses, which may be substituted or allowed to "stand in" for mote addresses.

II. Transmission of Mote-Associated Index Data

A. Structure(s) and/or System(s)

Figure 3:
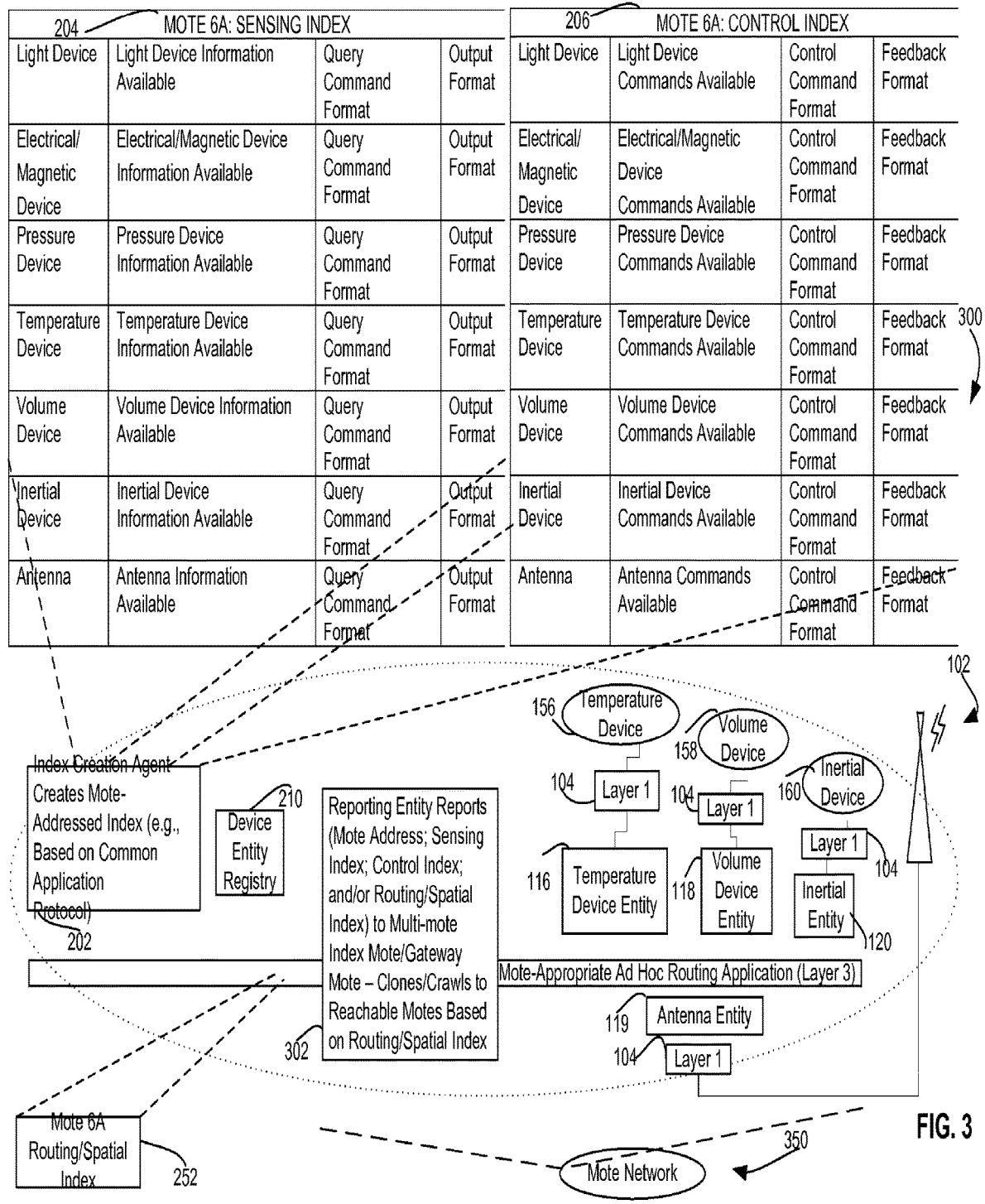
FIG. 3 depicts an exploded view of mote 300 forming a part of mote-appropriate network 350 that may serve as a context for introducing one or more processes and/or devices described herein.

With reference now to FIG. 3, depicted is an exploded view of mote 300 forming a part of mote-appropriate network 350 that may serve as a context for introducing one or more processes and/or devices described herein. Mote 300 is illustrated as similar to mote 200 (FIG. 2), but with the addition of reporting entity 302. In some implementations, reporting entity 302 is a computer program—resident in mote 300—that executes on a processor of mote 300 and that transmits all or a part of mote-addressed sensing index 204, mote-addressed control index 206, and/or mote-addressed routing/spatial index 252 to another entity (e.g., through antenna 102 to a multi-mote index creation agent such as shown/described in relation to FIGS. 5A-5B or through a mote-network to a designated gateway such as shown/described in relation to FIGS. 7, 9, and/or 10). In some implementations, reporting entity 302 is pre-installed on mote 300 prior to mote 300 being added to a mote-appropriate network, while in other implementations reporting entity 302 crawls and/or is transmitted to mote 300 from another location (e.g., a reporting entity at another mote or another networked computer (not shown) clones itself and sends that clone to mote 300). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 300 of FIG. 3 can serve as a context in which one or more processes and/or devices may be illustrated. In one exemplary process, reporting entity 302 transmits at least a part of a content index to another entity either resident within or outside of mote network 350 (e.g., through antenna 102 to a multi-mote index creation agent such as shown/described in relation to FIGS. 5A-5B or through a mote-network to a designated gateway-proximate mote as shown/described in relation to FIGS. 7, 9 and 10). In some implementations, reporting entity 302 transmits in response to a received schedule (e.g., received from multi-mote index creation agent 502 of FIGS. 5A-5B or federated index creation agent 914 of FIG. 9 or 10). In some implementations, reporting entity 302 transmits in response to a derived schedule. In another specific implementation, the schedule is derived in response to one or more optimized queries. In some implementations, the schedule is derived in response to one or more stored queries (e.g., previously received or generated queries).

Figure 9:
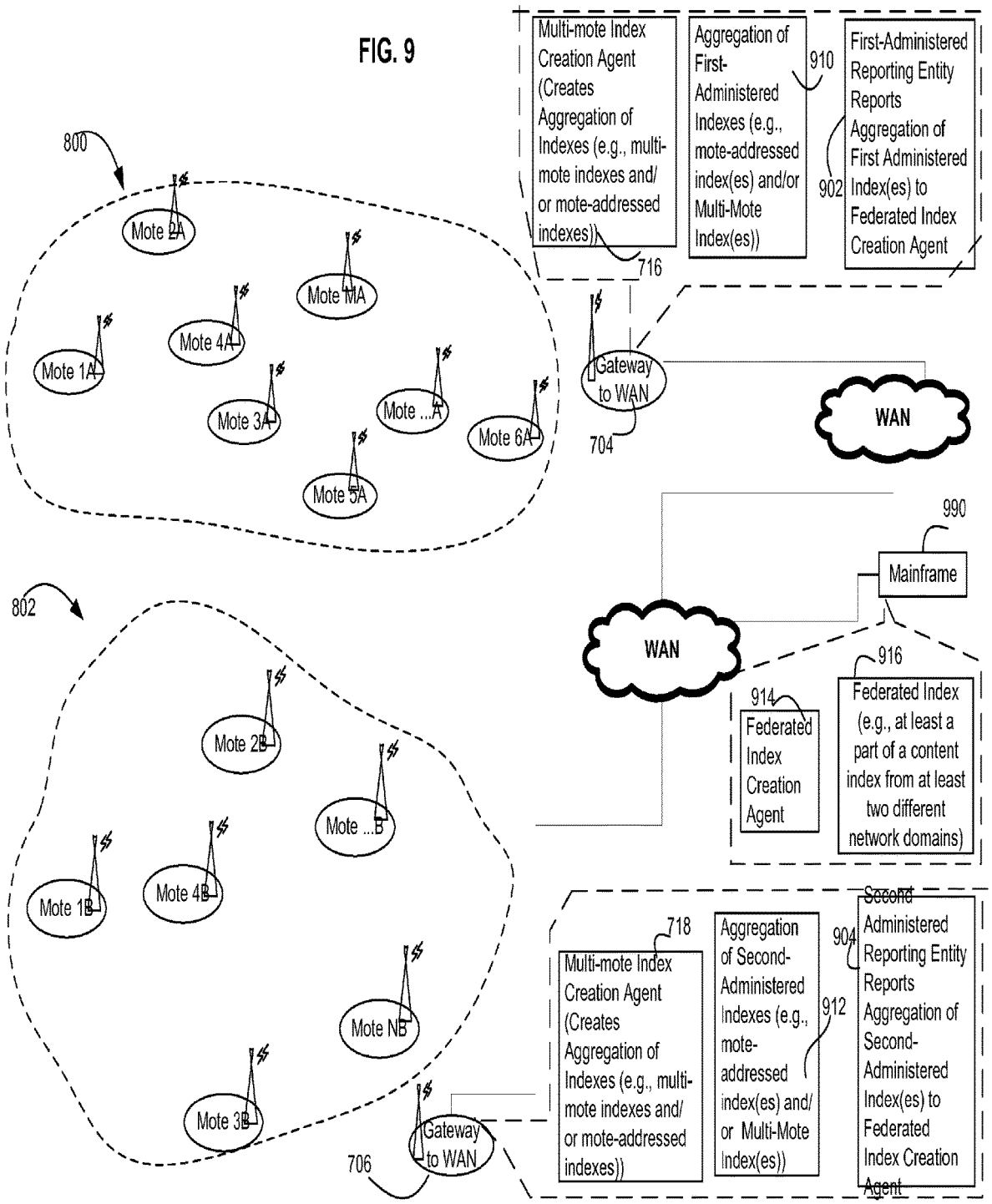
FIG. 9 shows a high-level diagram of first-administered set 800 of motes and second-administered set 802 of motes modified in accordance with teachings of the subject matter described herein.
Figure 10:
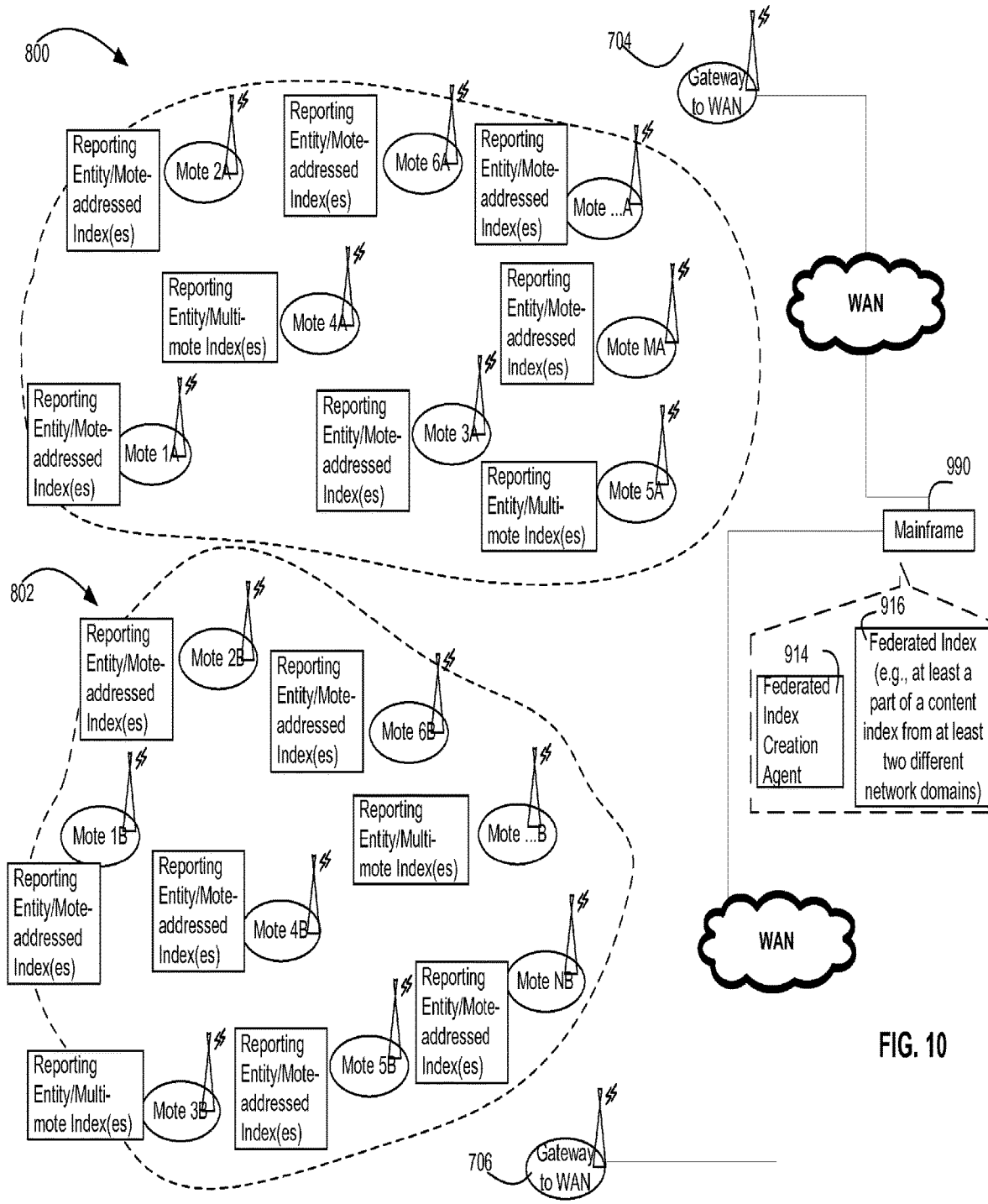
FIG. 10 shows the high-level diagram of FIG. 9, modified to show first-administered set 800 of motes and second-administered set 802 of motes wherein each mote is illustrated as having index(es) (e.g., mote-addressed and/or multi-mote) and an associated reporting entity.

In some implementations, reporting entity 302 transmits in response to a received query (e.g., received from multi-mote index creation agent of FIGS. 5A-5B or federated index creation agent of FIG. 9 or 10). In various implementations, reporting entity 302 transmits using either or both public key and private key encryption techniques. In various other implementations, reporting entity 302 decodes previously encrypted data, using either or both public key and private key encryption techniques, prior to the transmitting.

Figure 4:
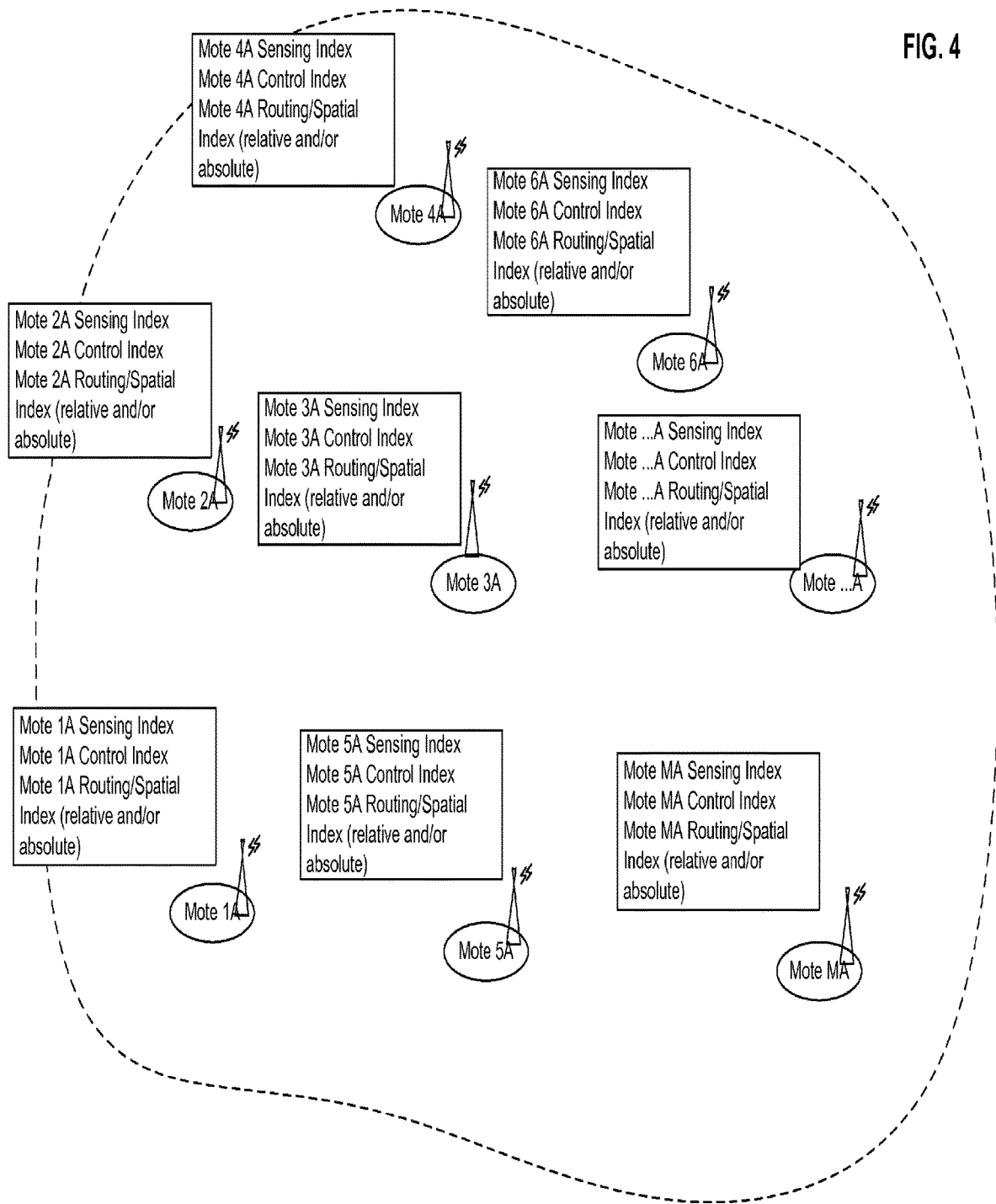
FIG. 4 shows a high-level diagram of a network having a first set of motes addressed 1A through MA (M is an integer greater than 1; A is the letter A and in some instances is used herein to help distinguish differently administered networks as in FIGS. 8, 9, and 10), which may form a context for illustrating one or more processes and/or devices described herein.
Figure 5A:
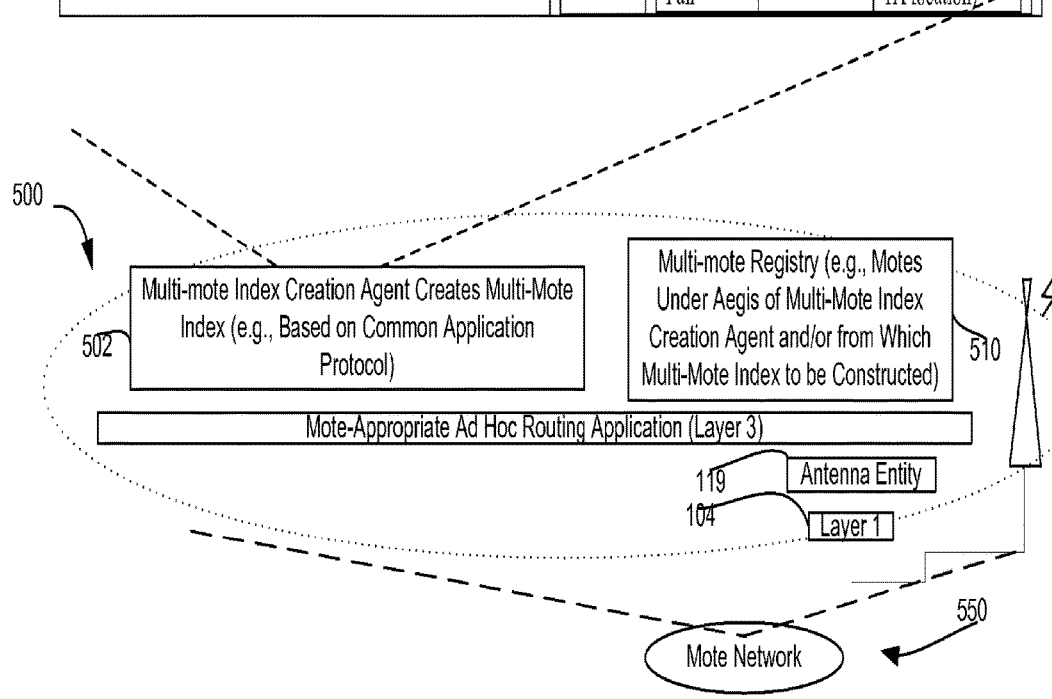

Referring now to FIG. 4, shown is a high-level diagram of a network having a first set of motes addressed 1A through MA (M is an integer greater than 1; A is the letter A and in some instances is used herein to help distinguish differently administered networks as in FIGS. 8, 9, and 10), which may form a context for illustrating one or more processes and/or devices described herein. Each mote is shown as having a mote-addressed content index that includes a sensing index, a control index, and/or a routing/spatial index respectively associated with the sensing functions at each such mote, and/or control functions at each such mote, and/or the spatial locations (relative and/or absolute) of motes that can be reached by direct transmission from each such mote. In some implementations, the motes' various indexes are created and/or function in fashions similar to indexes shown and described elsewhere herein (e.g., in relation to FIG. 3). In addition, although not explicitly shown, one or more of the motes of FIG. 4 may include index creation agents and/or reporting entities that are created and/or function in ways analogous to the creation and/or functioning of index creation agents and/or reporting entities as shown and described elsewhere herein (e.g., in relation to FIGS. 2 and/or 3). In some implementations, the reporting entities at each mote transmit all or a part of their mote-addressed content indexes (e.g., mote-addressed sensing indexes, mote-addressed control indexes, and/or mote-addressed routing/spatial indexes) to one or more entities (e.g., multi-mote index creation agent 502 such as shown/described in relation to FIGS. 5A-5B or multi-mote index creation agent 716 such as shown/described in relation to FIGS. 7, 9 and 10). In some implementations, such transmissions are done in response to a schedule, and in other implementations such transmissions are done in response to queries from the one or more entities. Such transmissions may be in response to received schedules, in response to schedules derived at least in part from optimized queries, in response to schedules derived at least in part from received queries, and/or in response to received queries such as described here and/or elsewhere herein.

III. Aggregating Mote-Associated Index Data

A. Structure(s) and/or System(s)

With reference now to FIGS. 5A-5B, depicted is an exploded view of mote 500 forming a part of mote-appropriate network 550 that may serve as a context for introducing one or more processes and/or devices described herein. Mote 500 is illustrated as similar to mote 300 (FIG. 3), but with the addition of multi-mote index creation agent 502, multi-mote content index 504, and multi-mote registry 510 (e.g., a registry of motes under the aegis of multi-mote index creation agent 502 and/or from which multi-mote content index 504 is to be constructed). Multi-mote content index 504 typically contains at least a part of content indexes from at least two differently-addressed motes. As an example of the foregoing, multi-mote content index 504 is shown containing sensing mote-addressed indexes, mote-addressed control indexes, and mote-addressed routing/spatial indexes for two differently addressed motes: a mote having mote-network address of 1A and a mote having a mote-network address of 3A. In some implementations, the sensing indexes, control indexes, and/or routing/spatial indexes function more or less analogously to mote-addressed sensing index 204, mote-addressed control index 206, and/or mote-addressed routing/spatial index 252 of mote 200 (e.g., as shown and described in relation to FIG. 2). In some implementations, multi-mote index creation agent 502 is a computer program—resident in mote 500—that executes on a processor of mote 500 and that constructs and stores multi-mote content index 504 in memory of mote 500. In some implementations, multi-mote index creation agent 502 is pre-installed on mote 500 prior to mote 500 being added to a mote-appropriate network, while in other implementations multi-mote index creation agent 502 crawls and/or is transmitted to mote 500 from another location (e.g., a multi-mote index creation agent at another mote or another networked computer (not shown) clones itself and sends that clone to mote 500). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 500 of FIGS. 5A-5B can serve as a context in which one or more processes and/or devices may be illustrated. In one exemplary process, once multi-mote index creation agent 502 has become active at mote 500, multi-mote index creation agent 502 obtains a listing of motes from which multi-mote content index 504 is to be constructed (e.g., a listing of motes making up a part of mote network 550). In some implementations, multi-mote index creation agent 502 obtains the listing of motes from which multi-mote content index 504 is to be constructed by communicating with multi-mote registry 510 to learn what mote-network addresses multi-mote index creation agent 502 is to consult to create multi-mote content index 504. In some implementations, various index creation agents at various respective motes (e.g., the index creation agents at the motes of FIG. 4) register their mote addresses with multi-mote registry 510, while in other implementations an administrator (e.g., either at or remote from mote 500) registers the mote-addresses in multi-mote registry 510. In some implementations, a system administrator places various motes under the aegis of particular multi-mote index creation agents based on single or combined criteria such as spatial locations, bandwidths, qualities of service of data communication links, and/or contents of data captured at various particular nodes. In other implementations, multi-mote index creation agent 502 is pre-loaded with knowledge of the listing of motes from which multi-mote content index 504 is to be constructed. In yet other implementations, the listing of motes from which multi-mote content index 504 is to be constructed is obtained from various motes that inform multi-mote index creation agent 502 that such various motes are to be included in the listing. Those having skill in the art will appreciate that other mechanisms for obtaining the listing, consistent with the teachings herein, may be substituted.

In some implementations, once multi-mote index creation agent 502 becomes aware of the mote-addresses for which it (multi-mote index creation agent 502) is responsible, multi-mote index creation agent 502 communicates with the various respective reporting entities at the various motes for which multi-mote index creation agent 502 is responsible and receives all or part of various respective mote-addressed content indexes (e.g., at least a part of one or more sensing indexes, one or more control indexes, and/or one or more routing/spatial indexes such as shown and described elsewhere). Thereafter, multi-mote index creation agent 502 uses the various reported mote-addressed content indexes to construct and/or save multi-mote content index 504 by aggregating at least a part of mote-addressed content indexes from two separately addressed and/or actually separate motes. For example, multi-mote content index 504 is shown as an aggregate of sensing, control, and routing/spatial indexes for motes having mote-network addresses of 1A and 3A, although typically multi-mote content indexes will index more than just two motes.

In some implementations, multi-mote index creation agent 502 receives all or part of various respective mote-addressed content indexes from various respective reporting entities at various motes which transmit in response to a schedule (e.g., once every 18 minutes). In some implementations, the schedule may be received, pre-stored, and/or derived (e.g., such as shown/described in relation to other transmissions described elsewhere herein). In addition, while the present application describes multi-mote index creation agent 502 receiving all or part of various respective mote-addressed content indexes from the various respective reporting entities at the various motes (e.g., mote 1A and/or mote 3A), those having ordinary skill in the art will appreciate that in other implementations multi-mote index creation agent 502 receives all or part of such indexes from one or more motes representing the first set of motes.

In various implementations discussed herein, multi-mote index creation agent 502 receives mote-addressed content indexes transmitted by reporting entities of various motes from which multi-mote index creation agent 502 creates multi-mote content index 504. In other implementations, multi-mote index creation agent 502 receives one or more previously-created multi-mote content indexes transmitted by multi-mote reporting entities at various motes from which multi-mote index creation agent 502 creates multi-mote content index 504. That is, in some implementations, multi-mote index creation agent 502 creates multi-mote content index 504, at least in part, from a previously generated aggregate of mote-addressed content indexes (e.g., from a previously generated multi-mote content index). In some implementations, such received multi-mote content indexes have been created by other multi-mote index creation agents resident at other motes throughout a mote network (e.g., a mote network such as shown in FIG. 4). Subsequent to receiving such previously created multi-mote content indexes, multi-mote index creation agent 502 then aggregates the multi-mote content indexes to form another multi-mote content index. In yet other implementations, multi-mote index creation agent 502 aggregates both mote-addressed content indexes and multi-mote content indexes respectively received from various reporting entities to create a multi-mote content index. The inventors point out that in some applications motes are low-power and/or low bandwidth devices, and thus in some implementations the systems and processes described herein allow many minutes (e.g., hours, days, or even weeks) for herein described agents and processes to migrate to and establish themselves at various nodes (e.g., by transferring their instructions in a piecewise fashion over time). The same may also hold true for transmission of information among nodes.

IV. Transmission of Aggregated Mote-Associated Index Data

A. Structure(s), and/or System(s)

Figure 6A:
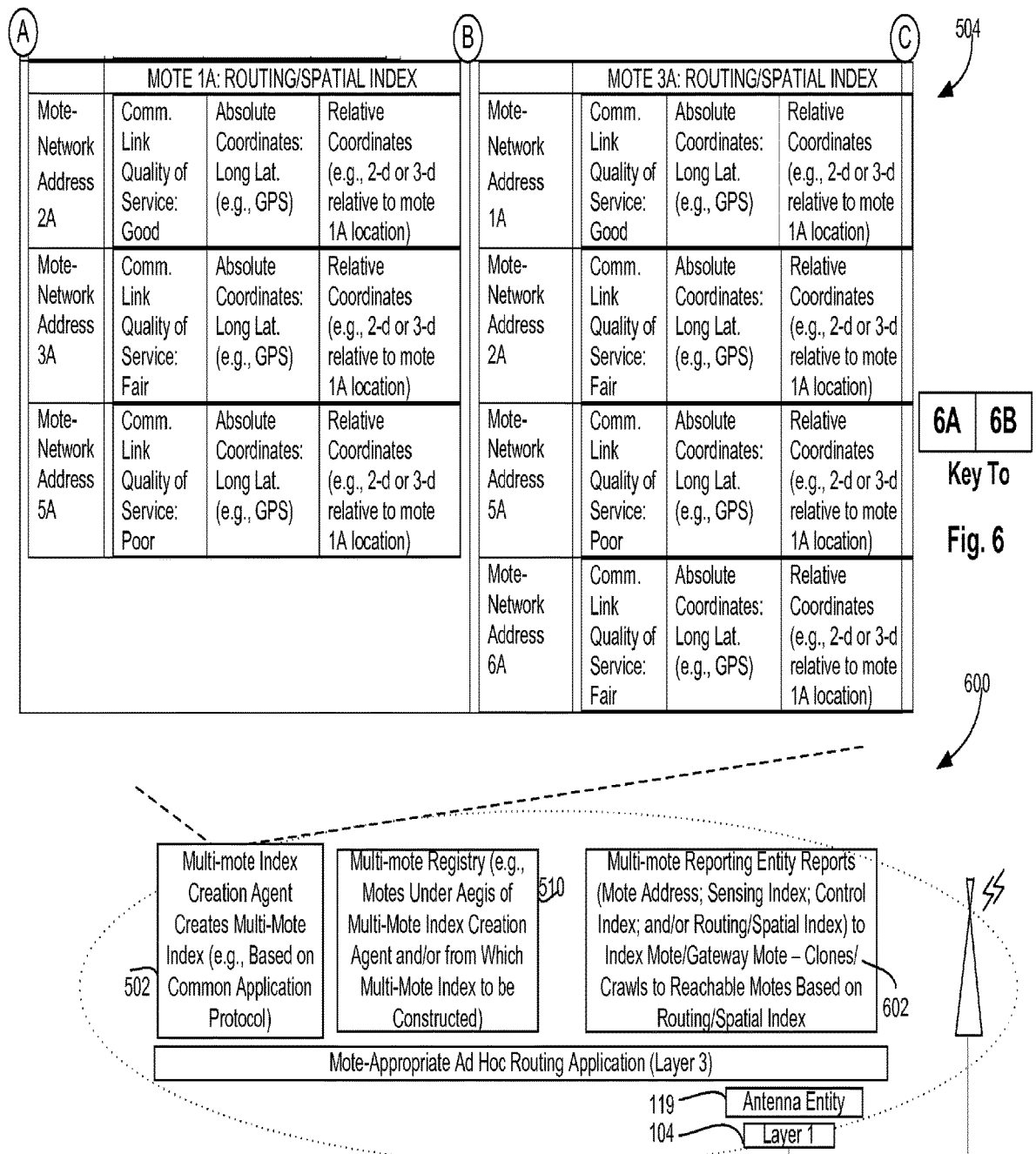
FIGS. 6A-6B of FIG. 6 depict an exploded view of mote 600 forming a part of mote-appropriate network 550 (FIGS. 5A-5B) that may serve as a context for introducing one or more processes and/or devices described herein.
Figure 6B:
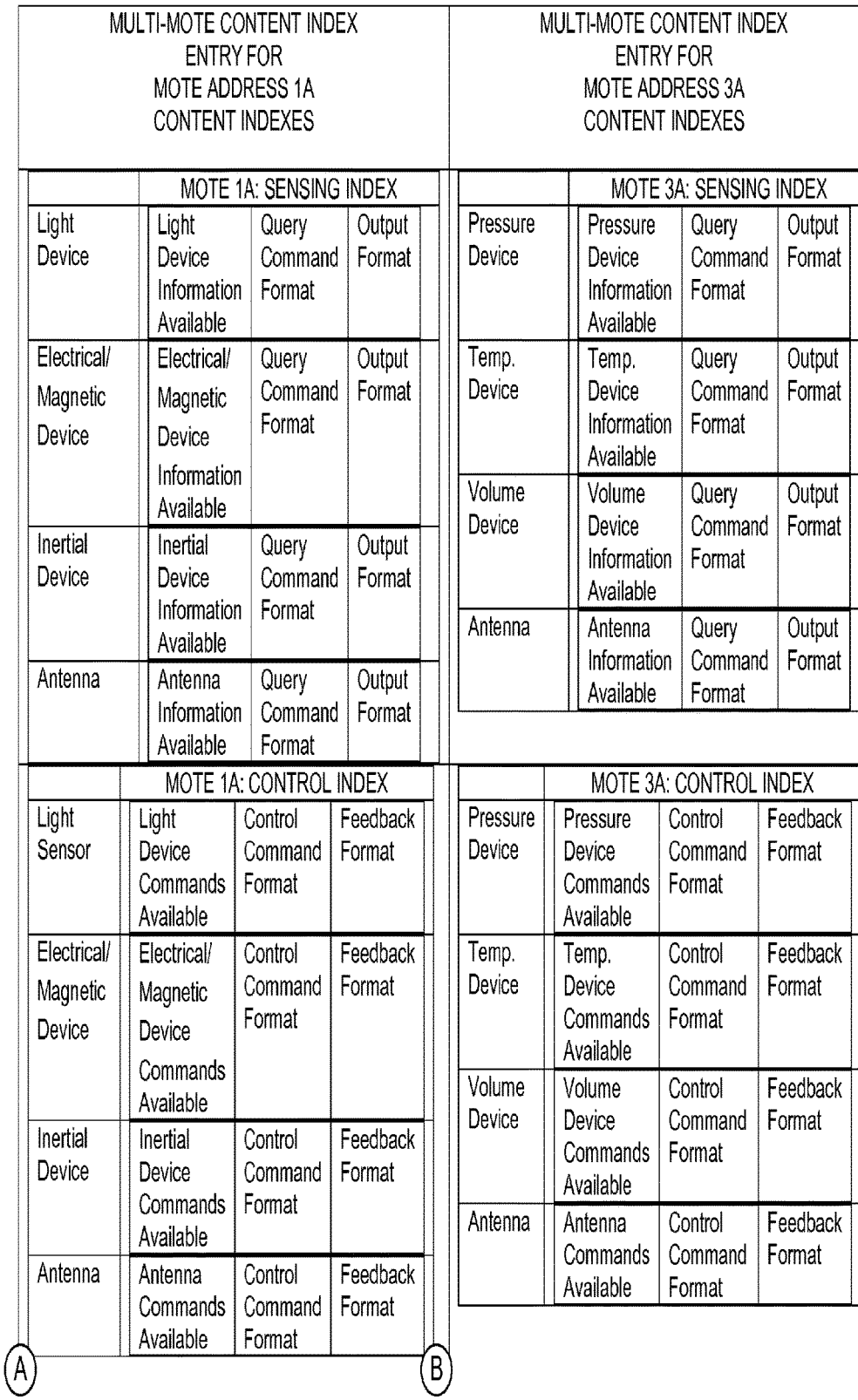

With reference now to FIGS. 6A-6B, depicted is an exploded view of mote 600 forming a part of mote-appropriate network 550 (FIGS. 5A-5B) that may serve as a context for introducing one or more processes and/or devices described herein. Mote 600 is illustrated as similar to mote 500 (FIGS. 5A-5B), but with the addition of multi-mote reporting entity 602. In some implementations, multi-mote reporting entity 602 is a computer program—resident in mote 600—that executes on a processor of mote 600. In some implementations, multi-mote reporting entity 602 is a computer program that is pre-installed on mote 600 prior to mote 600 being added to a mote-appropriate network, while in other implementations multi-mote reporting entity 602 is a computer program that crawls and/or is transmitted to mote 600 from another location (e.g., a reporting entity at another mote or another networked computer (not shown) clones itself and sends that clone to mote 600). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

Figure 7:
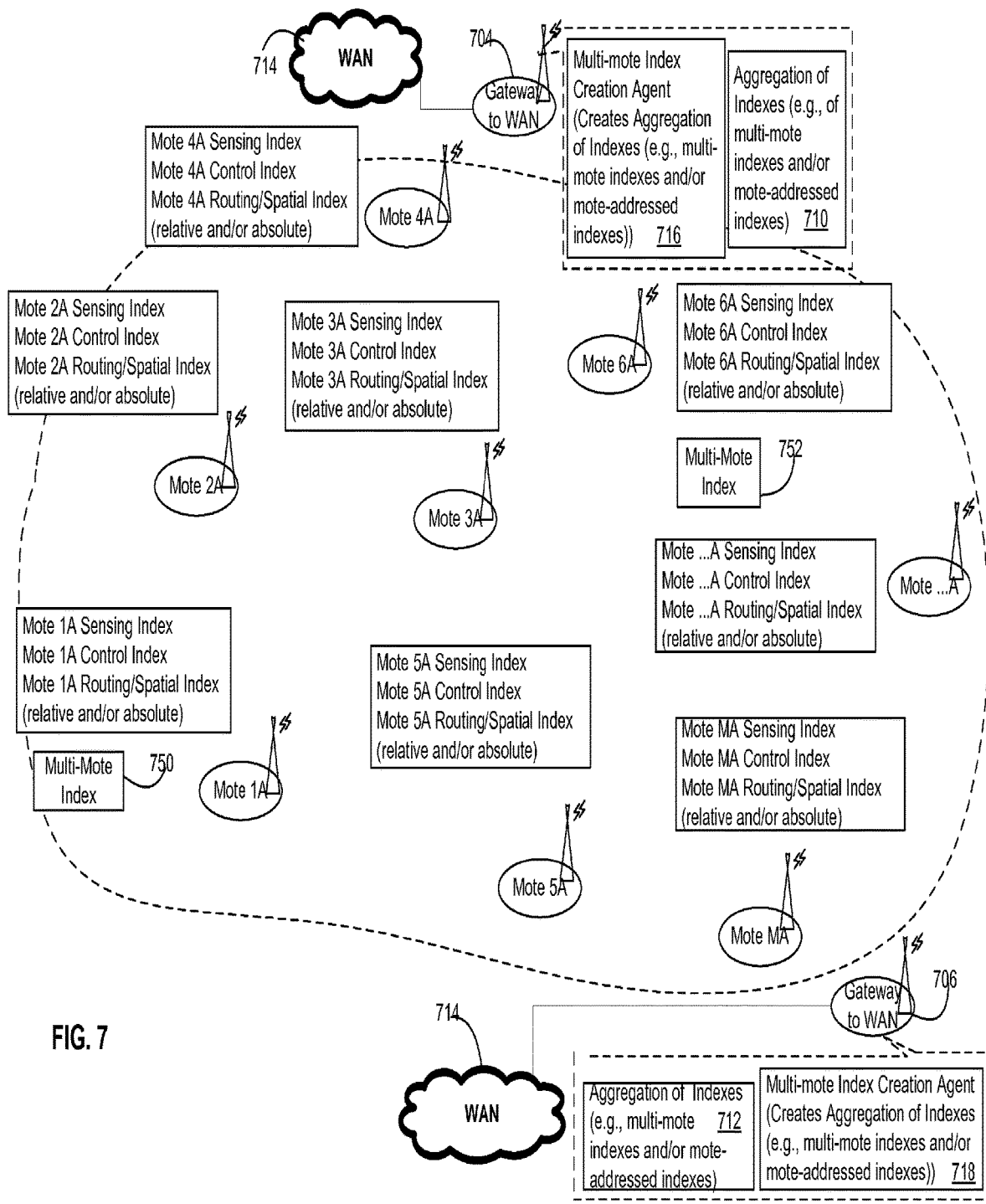
FIG. 7 shows a high-level diagram of an exploded view of a mote-appropriate network that depicts a first set of motes addressed 1A through MA (M is an integer greater than 1; A is the letter A and in some instances is used herein to help distinguish differently administered networks as in FIGS. 8, 9, and 10), which may form an environment for process(es) and/or device(s) described herein.

Referring now to FIG. 7, shown is a high-level diagram of an exploded view of a mote-appropriate network that depicts a first set of motes addressed 1A through MA (M is an integer greater than 1; A is the letter A and in some instances is used herein to help distinguish differently administered networks as in FIGS. 8, 9, and 10), which may form an environment for process(es) and/or device(s) described herein. Each mote is shown as having a mote-addressed content index that includes a sensing index, a control index, and/or a routing/spatial index respectively associated with the sensing functions of devices at each such mote, and/or control functions of devices at each such mote, and/or the spatial locations (relative and/or absolute) of motes that can be reached by direct transmission from each such mote. In some implementations, the motes' various indexes are created and/or function in fashions similar to mote-addressed indexes shown and described herein (e.g., in relation to FIGS. 2, 3, and/or FIG. 4). In some implementations, the motes' various indexes are created and/or function in fashions similar to multi-mote content indexes shown and described herein. For example, mote 1A (i.e., mote having mote-network address 1A) and mote 6A (i.e., mote having mote-network address 6A) are shown having multi-mote content indexes 750 and 752 respectively. The multi-mote content indexes are created and/or function in ways analogous to those shown and/or described elsewhere herein.

Mote 4A and mote MA are shown in FIG. 7 as proximate to gateways 704, 706 onto WAN 714 (e.g., the Internet). Multi-mote index creation agents 716, 718 are depicted as executing on the more powerful computational systems of gateways 704, 706 (e.g., mini and/or mainframe computer systems) to create aggregations 710, 712 of indexes. Those having ordinary skill in the art will appreciate that aggregations 710, 712 of indexes may be composed of multi-mote content indexes and/or individual mote-addressed content indexes. Those having ordinary skill in the art will appreciate that aggregations of multi-mote content indexes in themselves may be considered aggregates of one or more individual mote-addressed content indexes and thus types of multi-mote content indexes. Those having ordinary skill in the art will appreciate that multi-mote content indexes in themselves may be considered aggregates of one or more individual mote-addressed content indexes and thus types of aggregations of content indexes.

Although not expressly shown, those having ordinary skill in the art will appreciate that some or all of the motes shown in FIG. 7 typically have reporting entities that function analogously to other reporting entities described herein (e.g., multi-mote reporting entity 602 and/or reporting entity 302). In some implementations, such reporting entities are computer programs that execute on processors of the motes wherein such reporting entities are resident and that transmit all or a part of indexes at their motes (e.g., mote-addressed indexes and/or multi-mote content indexes) to other entities (e.g., multi-mote index creation agents at designated mote addresses and/or designated gateway-proximate motes). In some implementations, reporting entities are pre-installed on motes prior to such motes' insertion to a mote-appropriate network, while in other implementations such reporting entities crawl and/or are transmitted to their respective motes from other locations (e.g., a reporting entity at another mote or another networked computer (not shown) clones itself and sends that clone to another mote). In addition, in some implementations one or more of the reporting entities is given access to the content indexes of the motes and thereafter use such access to report on the content of the motes. The multi-mote content indexes and/or mote-addressed content indexes may be as shown and/or described both here and elsewhere herein, and such elsewhere described material is typically not repeated here for sake of clarity.

In some implementations, various reporting entities at various motes transmit in response to a schedule (e.g., once every 24 hours). In one specific example implementation, a reporting entity transmits in response to a received schedule (e.g., received from multi-mote index creation agent 502 of FIGS. 5A-5B and/or federated index creation agent 914 of FIGS. 9 and/or 10). In another specific example implementation, a reporting entity transmits in response to a derived schedule. In another specific implementation, the schedule is derived in response to one or more optimized queries. In yet other implementations, the schedule is derived in response to one or more stored queries (e.g., previously received or generated queries).

In other implementations, the reporting entities transmit in response to received queries (e.g., received from multi-mote index creation agents or federated index creation agents). In various implementations, the reporting entities transmit using either or both public key and private key encryption techniques. In various other implementations, the reporting entities decode previously encrypted data, using either or both public key and private key encryption techniques, prior to the transmitting.

B. Process(es) and/or Scheme(s)

With reference now again to FIGS. 5A-5B, FIGS. 6A-6B, and FIG. 7, the depicted views may serve as a context for introducing one or more processes and/or devices described herein. Some exemplary processes include the operation of transmitting at least a part of an aggregate of one or more mote-addressed content indexes of a first set of motes. In one instance, multi-mote reporting entity 602 transmits at least a part of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of transmitting at least a part of one or more multi-mote content indexes of the first set of motes. In one instance, multi-mote reporting entity 602 transmits at least a part of at least one of a mote-addressed sensing index or a mote-addressed control index of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of transmitting at least a part of a mote-addressed routing/spatial index. In one instance, multi-mote reporting entity 602 transmits at least a part of a mote-addressed routing/spatial index of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting with a reporting entity. In one instance, multi-mote reporting entity 602 is a logical process at mote 600 that transmits a part of an aggregate of one or more mote-addressed content indexes (e.g., multi-mote indexes and/or aggregations of other indexes such as mote-addressed and multi-mote indexes). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of obtaining access to the one or more mote-addressed content indexes of the first set of motes. In one instance, multi-mote reporting entity 602 is granted the access by an entity such as a system administrator. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting in response to a schedule. In one instance, multi-mote reporting entity 602 transmits at least a part of multi-mote content index 504 in response to a schedule (e.g., once every 24 hours).

Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of receiving the schedule. In one instance, multi-mote reporting entity 602 transmits at least a part of multi-mote content index 504 in response to a received schedule (e.g., received from multi-mote index creation agent 718 and/or a federated index creation agent 914 of FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of deriving the schedule. In one instance, multi-mote reporting entity 602 transmits at least a part of multi-mote content index 504 in response to a derived schedule (e.g., derived in response to an optimized query and/or one or more stored queries). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting in response to a query. In one instance, multi-mote reporting entity 602 transmits at least a part of multi-mote content index 504 in response to a received query (e.g., received from a multi-mote index creation agent or a federated index creation agent). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of encrypting utilizing at least one of a private or a public key. In one instance, multi-mote reporting entity 602 transmits at least a part of multi-mote content index 504 using either or both public key and private key encryption techniques. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of decoding at least a part of one or more mote-addressed content indexes utilizing at least one of a public key or a private key. In one instance, multi-mote reporting entity 602 decodes previously encrypted data, using either or both public key and private key encryption techniques, prior to the transmitting of at least a part of multi-mote content index 504. Those skilled in the art will appreciate that the foregoing specific exemplary processes are representative of more general processes taught elsewhere herein, such as in the claims filed herewith and/or elsewhere in the present application.

V. Federating Mote-Associated Index Data

A. Structure(s) and/or System(s)

Figure 8:
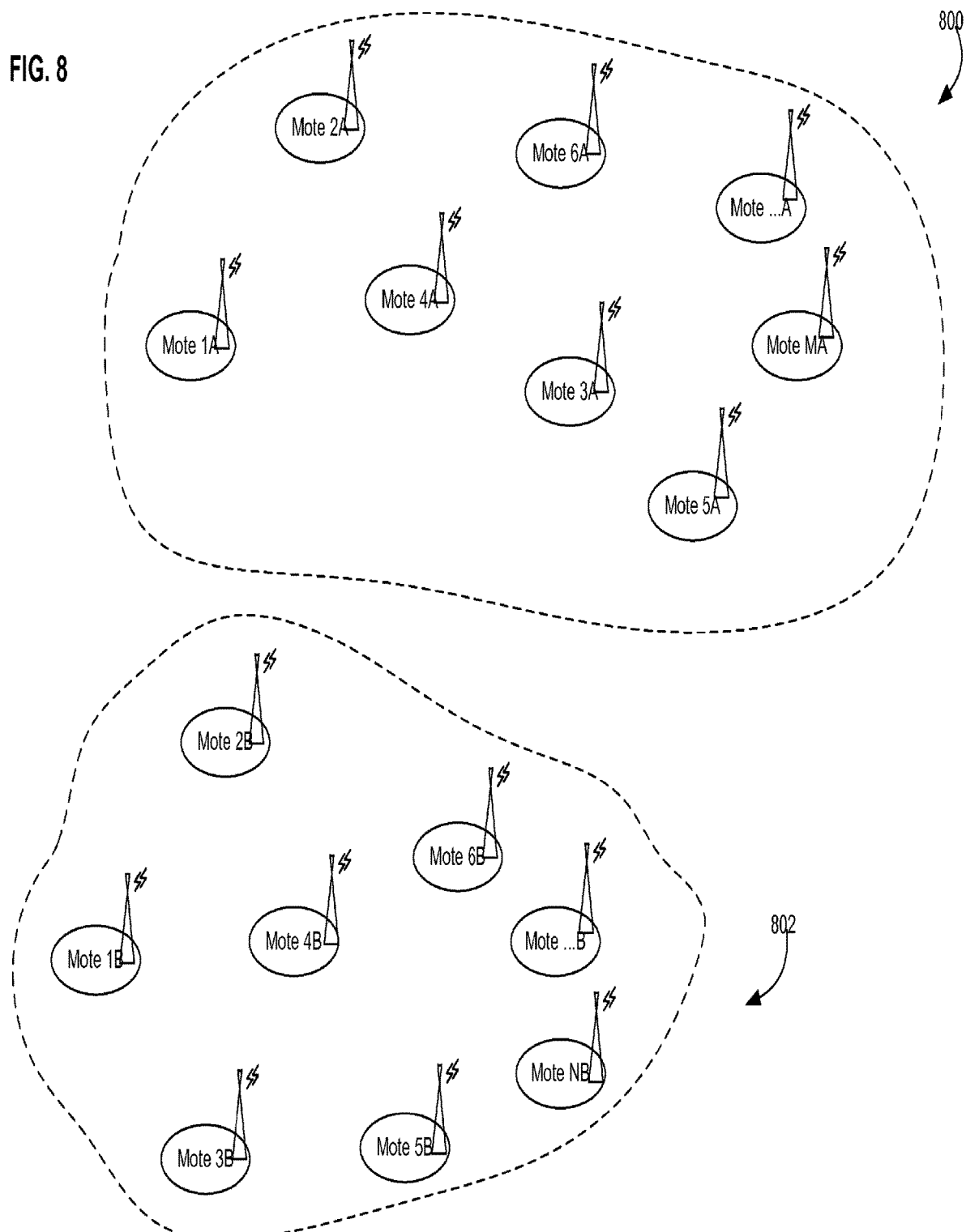
FIG. 8 shows a high-level diagram of first-administered set 800 of motes addressed 1A through MA, and second-administered set 802 of motes addressed 1B through NB (M and N are integers greater than 1; A and B are letters used herein to help distinguish differently administered networks as in FIGS. 8, 9, and 10) that may form an environment for process(es) and/or device(s) described herein.

Referring now to FIG. 8, shown is a high-level diagram of first-administered set 800 of motes addressed 1A through MA, and second-administered set 802 of motes addressed 1B through NB (M and N are integers greater than 1; A and B are letters used herein to help distinguish differently administered networks as in FIGS. 8, 9, and 10) that may form an environment for process(es) and/or device(s) described herein. In some implementations, first-administered set 800 of motes constitutes all or part of a network under a first administrator and second-administered set 802 of motes constitutes all or part of a network under a second administrator, where the first and/or second administrators tend not to have any significant knowledge of the internal operations of networks they don't administer. Examples in which this may be the case are where first-administered set 800 and second-administered set 802 are owned by different business entities, and where first-administered set 800 and second-administered set 802 have been constructed for two separate purposes (e.g., one set to monitor crops and the other set to monitor building systems, and thus the systems were not designed to interact with each other). In some implementations, first-administered set 800 of motes constitutes all or part of a network under a first administrator and second-administered set 802 of motes constitutes all or part of a network under a second administrator, where either or both of the first administrator and the second administrator has some knowledge of the networks they don't administer, but the networks are administered separately for any of a variety of reasons such as security, current employment, permissions, job function distinction, organizational affiliation, workload management, physical location, network disconnection, bandwidth or connectivity differences, etc. In some implementations, first-administered set 800 of motes constitutes all or part of a network under a first transient administration and second-administered set 802 of motes constitutes all or part of a network under a second transient administration, where either or both the first and second transient administrations are those such as might exist when a network partitions or a signal is lost.

The inventors have noticed that in some instances it could be advantageous for one or more systems to use resources from first-administered set 800 of motes and second-administered set 802 of motes. The inventors have devised one or more processes and/or devices that allow systems to use resources in such a fashion.

With reference now to FIG. 9, shown is a high-level diagram of first-administered set 800 of motes and second-administered set 802 of motes modified in accordance with teachings of subject matter described herein. Shown respectively proximate to first-administered set 800 of motes and second-administered set 802 of motes are gateways 704, 706 onto WAN 714. Gateways 704, 706 are respectively shown as having resident within them multi-mote index creation agents 716, 718 and aggregations 910, 912 of first-administered set 800 of motes and second-administered set 802 of motes. The gateways, multi-mote index creation agents, and aggregations are created and/or function substantially analogously to the gateways, index creation agents, and aggregations of indexes described elsewhere herein (e.g., in relation to FIGS. 6 and/or 7), and are not explicitly described here for sake of clarity. For example, aggregation 910 of first-administered indexes and aggregation 912 of second-administered indexes can be composed of either or both mote-addressed and/or multi-mote content indexes and in themselves can be considered instances of multi-mote content indexes. Furthermore, although not expressly shown in FIG. 9 for sake of clarity, it is to be understood that in general most motes will have one or more index creation agents (e.g., multi-mote or other type), indexes (e.g., multi-mote or other type), and/or reporting entities (e.g., multi-mote or other type) resident within or proximate to them (see, e.g., FIG. 10). In some implementations, the functioning and/or creation of such indexes, agents, and/or entities is under the control of federated index creation agent 914. In some implementations, federated index creation agent 914, on an as-needed basis, disperses and/or activates various index creation agents and/or their associated reporting entities (e.g., as shown and described in relation to FIGS. 2, 3, and/or 4), and/or various multi-mote index creation agents and/or their associated reporting entities (e.g., as shown and described in relation to FIGS. 5A-5B, 6A-6B, and/or 7) throughout first-administered set 800 of motes and second-administered set 802 of motes. In some implementations, such dispersals and/or activations are done on an as-needed basis, while in other implementations such dispersals and activations are pre-programmed. In yet other implementations, the agents, indexes, and/or entities are pre-programmed.

Further shown in FIG. 9 are federated index creation agent 914 and federated index 916 resident within mainframe computer system 990, which in some implementations are dispersed, created, and/or activated in fashions similar to other index creation agents and indexes described herein. In some implementations, federated index creation agent 914 generates federated index 916 by obtaining at least a part of one or more indexes (e.g., multi-mote or mote-addressed indexes) from both first-administered set 800 of motes and second-administered set 802 of motes. In some implementations, federated index 916 typically includes at least a part of a content index from two differently-administered mote networks, such as first-administered set 800 of motes and second-administered set 802 of motes In some implementations, federated index 916 has one or more entries denoting one or more respective administrative domains of one or more content index entries (e.g., see federated index 916 of FIGS. 11A-11B). In other implementations, federated index 916 has access information to one or more content indexes for an administered content index (e.g., in some implementations, this is actually in lieu of a content index). In other implementations, federated index 916 has information pertaining to a currency of at least one entry of an administered content index. In other implementations, federated index 916 has information pertaining to an expiration of at least one entry of an administered content index. In other implementations, federated index 916 has metadata pertaining to an administrative domain, wherein the metadata includes at least one of an ownership indicator, an access right indicator, an index refresh indicator, or a predefined policy indicator. In other implementations, federated index 916 has an administrative domain-specific query string generated for or supplied by an administrative domain to produce an updated content index for that domain.

Continuing to refer to FIG. 9, aggregation 910 of first-administered index and aggregation 912 of second-administered index (e.g., instances of multi-mote content indexes) are shown as respectively interfacing with first-administered reporting entity 902 and second-administered reporting entity 904. First-administered reporting entity 902 and/or second-administered reporting entity 904 typically are dispersed, created, and/or activated in fashions analogous to the dispersal, creation, and/or activation of other reporting entities as described elsewhere herein (e.g., in relation to FIGS. 3 and/or 6), and hence such dispersals, creations, and/or activations are not explicitly described here for sake of clarity.

In some implementations, first-administered reporting entity 902 and/or second-administered reporting entity 904 transmit all/part of their respective multi-mote content indexes to federated index creation agent 914, from which federated index creation agent creates federated index 916. First-administered reporting entity 902 and/or second-administered reporting entity 904 transmit in manners analogous to reporting entities discussed elsewhere herein. For example, transmitting in response to schedules received, schedules derived, and/or queries received from federated index creation agent 914, and/or transmitting using either or both public key and private key encryption techniques and/or decoding previously encrypted data, using either or both public key and private key encryption techniques, prior to the transmitting.

In the discussion of FIG. 9, federated index creation agent 914 was described as obtaining portions of aggregations of first-administered and second-administered network indexes from which federated index 916 was constructed. In other implementations, federated index creation agent 914 obtains portions of first-administered and second-administered network indexes from various reporting entities dispersed throughout the first-administered and second-administered mote networks 802, 804 (e.g., multi-mote or other type reporting entities such as those described in relation to FIGS. 3, 6 and/or elsewhere herein). Such reporting entities and indexes are implicit in FIG. 9 (e.g., since the multi-mote creation agents 716, 718 would typically interact with such reporting entities to obtain indexes under the purview of such entities), but are explicitly shown and described in relation to FIG. 10. In other implementations, the various reporting entities dispersed throughout the networks report directly to federated index creation agent 914. One example of such implementations is shown and described in relation to FIG. 10.

Referring now to FIG. 10, shown is the high-level diagram of FIG. 9, modified to show first-administered set 800 of motes and second-administered set 802 of motes wherein each mote is illustrated as having index(es) (e.g., mote-addressed and/or multi-mote) and an associated reporting entity. The reporting entities may be of substantially any type described herein (e.g., multi-mote or other type) and the indexes may also be of substantially any type described herein (e.g., multi-mote or mote-addressed content indexes).

In some implementations, various reporting entities dispersed throughout first-administered set 800 of motes and second-administered set 802 of motes transmit all/part of their respective indexes (multi-mote or otherwise) to federated index creation agent 914, from which federated index creation agent creates federated index 916. The various reporting entities transmit in manners analogous to reporting entities discussed elsewhere herein. For example, transmitting in response to schedules received, schedules derived, and/or queries received from federated index creation agent 914, and/or transmitting using either or both public key and private key encryption techniques and/or decoding previously encrypted data, using either or both public key and private key encryption techniques, prior to the transmitting.

With reference now to FIGS. 11A-11B, shown is an exemplary exploded view of federated index 916. Federated index 916 is shown to contain aggregations of content indexes drawn from first-administered set 800 of motes and second-administered set 802 of motes. Shown is that federated index 916 contains aggregated sensing, control, and routing/spatial indexes for motes addressed 1A and 2A under the administration of a first network administrator. Depicted is that federated index 916 contains aggregated sensing, control, and routing/spatial indexes for motes addressed 3A and 4A under the administration of a second network administrator. Although aggregations for only two administered networks are shown, those having ordinary skill in the art will appreciate that in some implementations the number of administered networks indexed could be several. In addition, although each individual administrator-specific aggregation is shown containing entries for only three motes, those having skill in the art will appreciate that in most implementations the number of motes in the aggregations will run to the hundreds, thousands, and/or higher.

B. Process(es) and/or Scheme(s)

With reference now again to FIG. 7, FIG. 8, FIG. 9, FIG. 10, and/or FIGS. 11A-11B, the depicted views may serve as a context for introducing one or more processes and/or devices described herein. Some exemplary processes include the operations of obtaining at least a part of a first-administered content index from a first set of motes; obtaining at least a part of a second-administered content index from a second set of motes; and creating a federated index from at least a part of the first-administered content index and at least a part of the second-administered content index. Other more general exemplary processes of the foregoing specific exemplary processes are taught at least in the claims and/or elsewhere in the present application.

In some specific exemplary processes, the operation of obtaining at least a part of a first-administered content index from a first set of motes includes but is not limited to the operation of receiving at least a part of one or more multi-mote content indexes of the first set of motes. For example, federated index creation agent 914 receiving at least a part of the multi-mote content index of mote 6A (e.g., such as shown and described in relation to FIGS. 7, 8, 9, 10, and/or 11A-11B).

In some specific exemplary processes, the operation of receiving at least a part of one or more multi-mote content indexes of the first set of motes includes but is not limited to the operation of receiving at least a part of at least one of a mote-addressed sensing index or a mote-addressed control index from at least one aggregation of one or more first-administered indexes. For example, federated index creation agent 914 receiving at least a part of aggregation of first-administered index(es) 910 as transmitted by first-administered reporting entity 902 for first-administered set 800 of motes (e.g., as shown and/or described in relation to FIGS. 7, 8, 9, 10 and/or 11A-11B).

In some specific exemplary processes, the operation of receiving at least a part of one or more multi-mote content indexes of the first set of motes includes but is not limited to the operation of receiving at least a part of a mote-addressed routing/spatial index from at least one aggregation of one or more first-administered indexes. For example, federated index creation agent 914 receiving at least a part of aggregation of first-administered index(es) 910 as transmitted by first-administered reporting entity 902 for first-administered set 800 of motes (e.g., as shown and/or described in relation to FIGS. 7, 8, 9, 10 and/or 11A-11B).

In some specific exemplary processes, the operation of receiving at least a part of one or more multi-mote content indexes of the first set of motes includes but is not limited to the operation of receiving at least a part of at least one of a mote-addressed sensing index or a mote-addressed control index from a multi-mote reporting entity at a mote of the first set of motes. For example, federated index creation agent 914 receiving at least a part of one or more multi-mote content indexes of first-administered set 800 of motes from one or more multi-mote content indexes' associated multi-mote reporting entities (e.g., such as shown and/or described in relation to the multi-mote content indexes and/or associated reporting entities of first-administered set 800 of motes of FIGS. 7, 8, 9, 10 and/or 11A-11B).

In some specific exemplary processes, the operation of receiving at least a part of one or more multi-mote content indexes of the first set of motes includes but is not limited to the operation of receiving at least a part of a mote-addressed routing/spatial index from a multi-mote reporting entity at a mote of the first set of motes. For example, federated index creation agent 914 receiving at least a part of a mote-addressed routing/spatial index from a multi-mote reporting entity at a mote of the first-administered set 800 of motes (e.g., such as shown and/or described in relation to the multi-mote content index of mote 6A of FIGS. 7, 8, 9, 10 and/or 11A-11B).

In some specific exemplary processes, the operation of obtaining at least a part of a first-administered content index from a first set of motes includes but is not limited to the operation of receiving at least a part of at least one of a mote-addressed sensing index or a mote-addressed control index from a reporting entity at a mote of the first set of motes. For example, federated index creation agent 914 receiving at least a part of a mote-addressed sensing index or a mote-addressed control index from one or more associated reporting entities at the motes of first-administered set 800 of motes (e.g., such as shown and/or described in relation the mote-addressed content indexes of motes 3A and/or 5A of FIGS. 7, 8, 9, 10 and/or 11A-11B).

In some specific exemplary processes, the operation of obtaining at least a part of a first-administered content index from a first set of motes includes but is not limited to the operation of receiving at least a part of a mote-addressed routing/spatial index from a reporting entity at a mote of the first set of motes. For example, federated index creation agent 914 receiving at least a part of a mote-addressed routing/spatial index from one or more associated reporting entities at the motes of first-administered set 800 of motes (e.g., such as shown and/or described in relation to the mote-addressed content indexes of motes 3A and/or 5A of FIGS. 7, 8, 9, 10 and/or 11A-11B).

In some specific exemplary processes, the operation of obtaining at least a part of a second-administered content index from a second set of motes includes but is not limited to the operation of receiving at least a part of one or more multi-mote content indexes of the second set of motes. For example, federated index creation agent 914 receiving at least a part of the multi-mote content index associated with a mote of second-administered set 802 of motes (e.g., such as shown and/or described in relation to FIGS. 7, 8, 9, 10, and/or 11A-11B).

In some specific exemplary processes, the operation of receiving at least a part of one or more multi-mote content indexes of the second set of motes includes but is not limited to the operation of receiving at least a part of at least one of a mote-addressed sensing index or a mote-addressed control index from at least one aggregation of one or more second-administered indexes. For example, federated index creation agent 914 receiving at least a part of aggregation of second-administered index(es) 912 as transmitted by second-administered reporting entity 904 for second-administered set 802 of motes (e.g., as shown and/or described in relation to FIGS. 7, 8, 9, 10 and/or 11A-11).

In some specific exemplary processes, the operation of receiving at least a part of one or more multi-mote content indexes of the second set of motes includes but is not limited to the operation of receiving at least a part of a mote-addressed routing/spatial index from at least one aggregation of one or more second-administered indexes. For example, federated index creation agent 914 receiving at least a part of aggregation of second-administered index(es) 912 transmitted by second-administered reporting entity 904 for second-administered set 802 of motes (e.g., as shown and described in relation to FIGS. 7, 8, 9, 10 and/or 11A-11B).

In some specific exemplary processes, the operation of receiving at least a part of one or more multi-mote content indexes of the second set of motes includes but is not limited to the operation of receiving at least a part of at least one of a mote-addressed sensing index or a mote-addressed control index from a multi-mote reporting entity at a mote of the second set of motes. For example, federated index creation agent 914 receiving at least a part of one or more multi-mote content indexes of second-administered set 802 of motes from one or more multi-mote content indexes' associated multi-mote reporting entities (e.g., such as shown and described in relation to the multi-mote content indexes and/or reporting entities of second-administered set 802 of motes of FIGS. 7, 8, 9, 10 and/or 11A-11B).

In some specific exemplary processes, the operation of receiving at least a part of one or more multi-mote content indexes of the second set of motes includes but is not limited to the operation of receiving at least a part of a mote-addressed routing/spatial index from a multi-mote reporting entity at a mote of the second set of motes. For example, federated index creation agent 914 receiving at least a part of a mote-addressed routing/spatial index from a multi-mote reporting entity at a mote of the second-administered set 802 of motes from an associated multi-mote reporting entity (e.g., such as shown and described in relation to the multi-mote content indexes and/or reporting entities of second-administered set 802 of motes of FIGS. 7, 8, 9, 10 and/or 11A-11B).

In some specific exemplary processes, the operation of obtaining at least a part of a second-administered content index from a second set of motes includes but is not limited to the operation of receiving at least a part of at least one of a mote-addressed sensing index or a mote-addressed control index from a reporting entity at a mote of the second set of motes. For example, federated index creation agent 914 receiving at least a part of a mote-addressed sensing index or a mote-addressed control index from one or more associated reporting entities at the motes of second-administered set 802 of motes (e.g., such as shown and described in relation the mote-addressed content indexes and associated reporting entities of second-administered set 802 of motes of FIGS. 7, 8, 9, 10 and/or 11A-11B).

In some specific exemplary processes, the operation of obtaining at least a part of a second-administered content index from a second set of motes includes but is not limited to the operation of receiving at least a part of a mote-addressed routing/spatial index from a reporting entity at a mote of the second set of motes. For example, federated index creation agent 914 receiving at least a part of a mote-addressed routing/spatial index from one or more associated reporting entities at the motes of second-administered set 802 of motes (e.g., such as shown and described in relation the mote-addressed content indexes of second-administered set 802 of motes of FIGS. 7, 8, 9, 10, and/or 11A-11B).

In some specific exemplary processes, the operation of creating a federated index from at least a part of the first-administered content index and at least a part of the second-administered content index includes the operation of federated index creation agent 914 generating federated index 916 in response to one or more indexes (e.g., multi-mote and/or mote-addressed indexes) obtained from both the first-administered set 800 of motes and the second-administered set 802 of motes. In some implementations, federated index creation agent 914 creates federated index 916 to include at least a part of a content index from two differently-administered mote networks, such as first administered set 800 of motes and second administered set 802 of motes (see, e.g., federated index 916 of FIGS. 11A-11B). In some implementations, federated index creation agent 914 creates federated index 916 to include one or more entries denoting one or more respective administrative domains of one or more content index entries (e.g., see federated index 916 of FIGS. 11A-11B). In other implementations, federated index creation agent 914 creates federated index 916 to include access information to one or more content indexes for an administered content index (e.g., in some implementations, this is actually in lieu of a content index). In other implementations, federated index creation agent 914 creates federated index 916 to include information pertaining to a currency of at least one entry of an administered content index. In other implementations, federated index creation agent 914 creates federated index 916 to include information pertaining to an expiration of at least one entry of an administered content index. In other implementations, federated index creation agent 914 creates federated index 916 to include metadata pertaining to an administrative domain, wherein the metadata includes at least one of an ownership indicator, an access right indicator, an index refresh indicator, or a predefined policy indicator. In other implementations, federated index creation agent 914 creates federated index 916 to include an administrative domain-specific query string generated for or supplied by an administrative domain to produce an updated content index for that domain.

In some specific exemplary processes, the operation of creating a federated index from at least a part of the first-administered content index and at least a part of the second-administered content index includes but is not limited to the operations of creating the federated index from at least a part of one or more multi-mote content indexes of the first set of motes; creating the federated index from at least a part of at least one of a mote-addressed sensing index, a mote-addressed control index, or a mote-addressed routing index/spatial index of the first set of motes; creating the federated index from at least a part of one or more multi-mote content indexes of the second set of motes; and/or creating the federated index from at least a part of at least one of a mote-addressed sensing index, a mote-addressed control index, or a mote-addressed routing index/spatial index of the second set of motes. For example, federated index creation agent 914 creating at least a part of federated index 916 in response to portions of multi-mote content indexes (e.g., multi-mote indexes and/or aggregations of indexes) received from reporting entities associated with first administered set 800 of motes and/or second-administered set 802 of motes (e.g., such as shown and described in relation to FIGS. 7, 8, 9, 10 and/or 11A-11B).

With reference now again to FIG. 7, FIG. 8, FIG. 9, FIG. 10, and/or FIGS. 11A-11B, the depicted views may yet again serve as a context for introducing one or more processes and/or devices described herein. Some specific exemplary processes include the operations of creating one or more first-administered content indexes for a first set of motes; obtaining at least a part of the one or more first administered content indexes of the first set of motes; creating one or more second administered content indexes for a second set of motes; obtaining at least a part of the second-administered content indexes of the second set of motes; and creating a federated index from at least a part of the one or more first-administered content indexes and at least a part of the one or more second-administered content indexes.

In some specific exemplary processes, the operations of creating one or more first-administered content indexes for a first set of motes and creating one or more second-administered content indexes for a second set of motes function substantially analogously as the processes described in creating mote-addressed content indexes, mote-addressed indexes, and aggregations of indexes as set forth elsewhere herein (e.g., such as shown and/or described under Roman Numeral headings I ("MOTE-ASSOCIATED INDEX CREATION"), III ("AGGREGATING MOTE-ASSOCIATED INDEX DATA"), and V ("FEDERATING MOTE-ASSOCIATED INDEX DATA")). Accordingly, the specific exemplary processes of the operations of creating one or more first-administered content indexes for a first set of motes and creating one or more second-administered content indexes for a second set of motes are not explicitly redescribed here for sake of clarity, in that such specific exemplary processes will be apparent to one of skill in the art in light of the disclosure herein (e.g., as shown and described under Roman Numeral headings I, III, and V).

In some specific exemplary processes, the operations of obtaining at least a part of the one or more first-administered content indexes of the first set of motes; obtaining at least a part of the second-administered content indexes of the second set of motes; and creating a federated index from at least a part of the one or more first-administered content indexes and at least a part of the one or more second-administered content indexes function substantially analogously as to like processes described elsewhere herein (e.g., as shown and described under Roman Numeral heading V ("FEDERATING MOTE-ASSOCIATED INDEX DATA")).

Accordingly, the specific exemplary processes of the operations of obtaining at least a part of the one or more first-administered content indexes of the first set of motes; obtaining at least a part of the second-administered content indexes of the second set of motes; and creating a federated index from at least a part of the one or more first-administered content indexes and at least a part of the one or more second-administered content indexes are not explicitly redescribed here for sake of clarity, in that such specific exemplary processes will be apparent to one of skill in the art in light of the disclosure herein (e.g., as shown and described under Roman Numeral heading V).

VI. Using Mote-Associated Indexes

Figure 12:
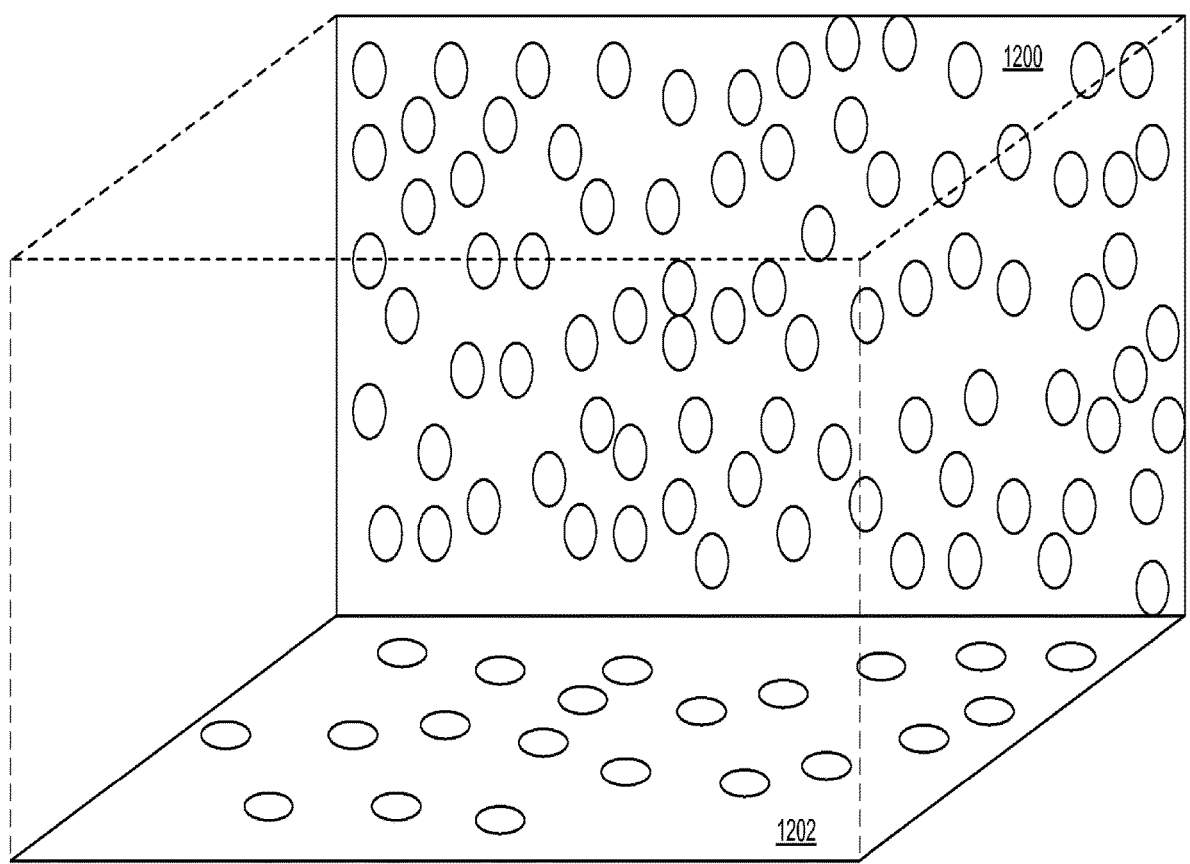
FIG. 12 depicts a perspective cut-away view of a hallway that may form an environment of processes and/or devices described herein.

Referring now to FIG. 12, depicted is a perspective cut-away view of a hallway that may form an environment of processes and/or devices described herein. Wall 1200 and floor 1202 are illustrated as having motes (depicted as circles and/or ovals).

Typically, the motes may be as described elsewhere herein (e.g., mote 200, 300, 500, and/or 600, etc.). In some instances, the motes are applied to wall 1200 and/or floor 1202 with an adhesive. In other instances, the motes are formed into 1200 and/or floor 1202 during fabrication. In other instances, a covering for the wall (e.g., wallpaper and/or paint) contains motes that are applied to 1200 and/or floor 1202.

Figure 13:
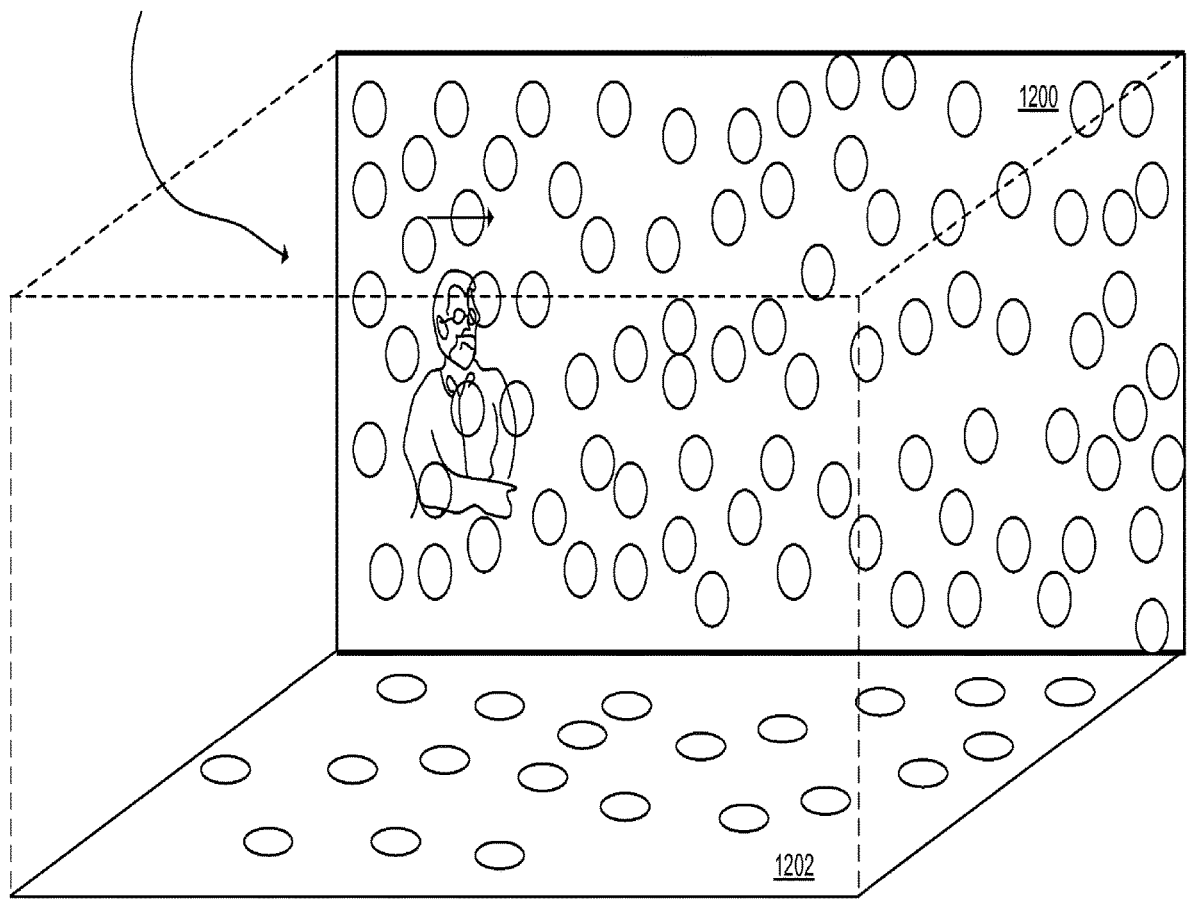
FIGS. 13, 14 and 15 show three-timed sequenced views of a person transiting wall 1200 and floor 1202 of the hallway of FIG. 12.
Figure 14:
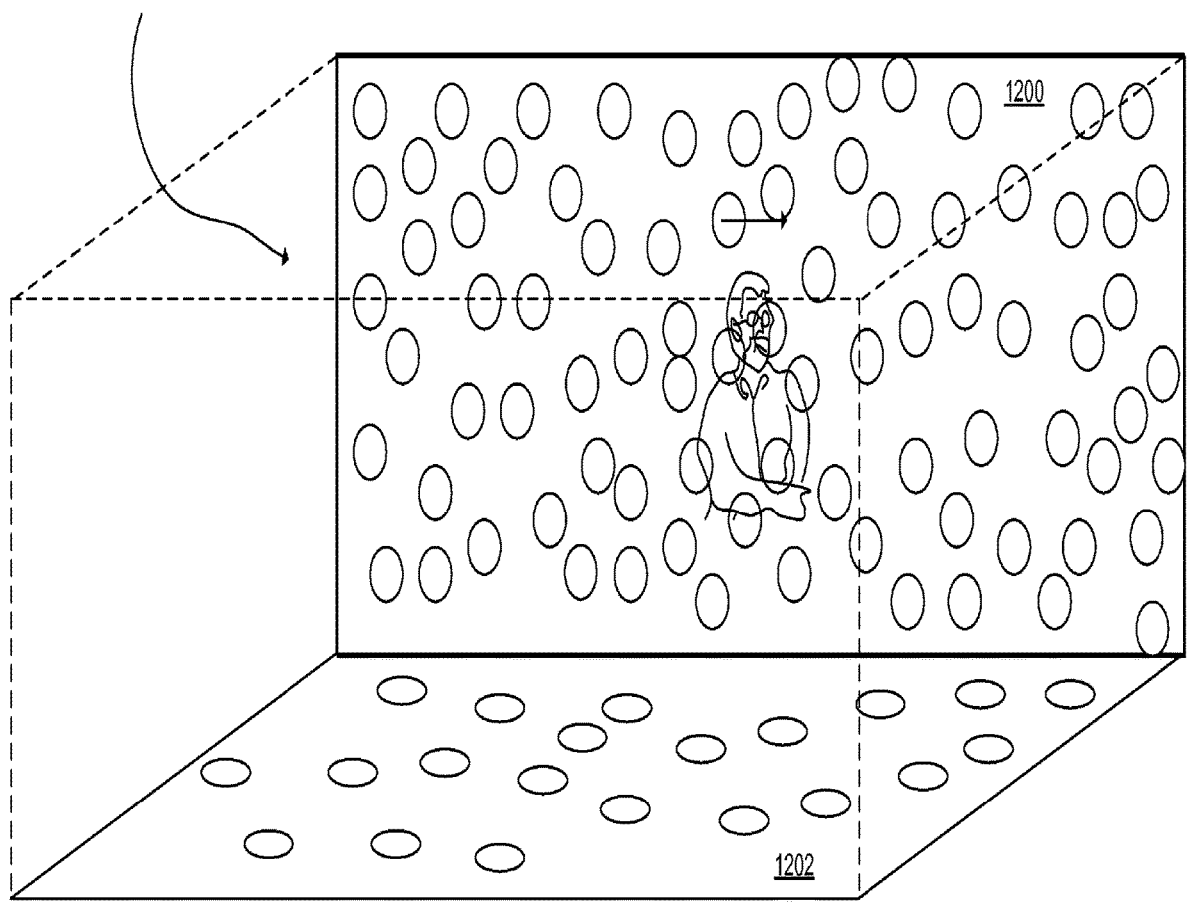
Figure 15:
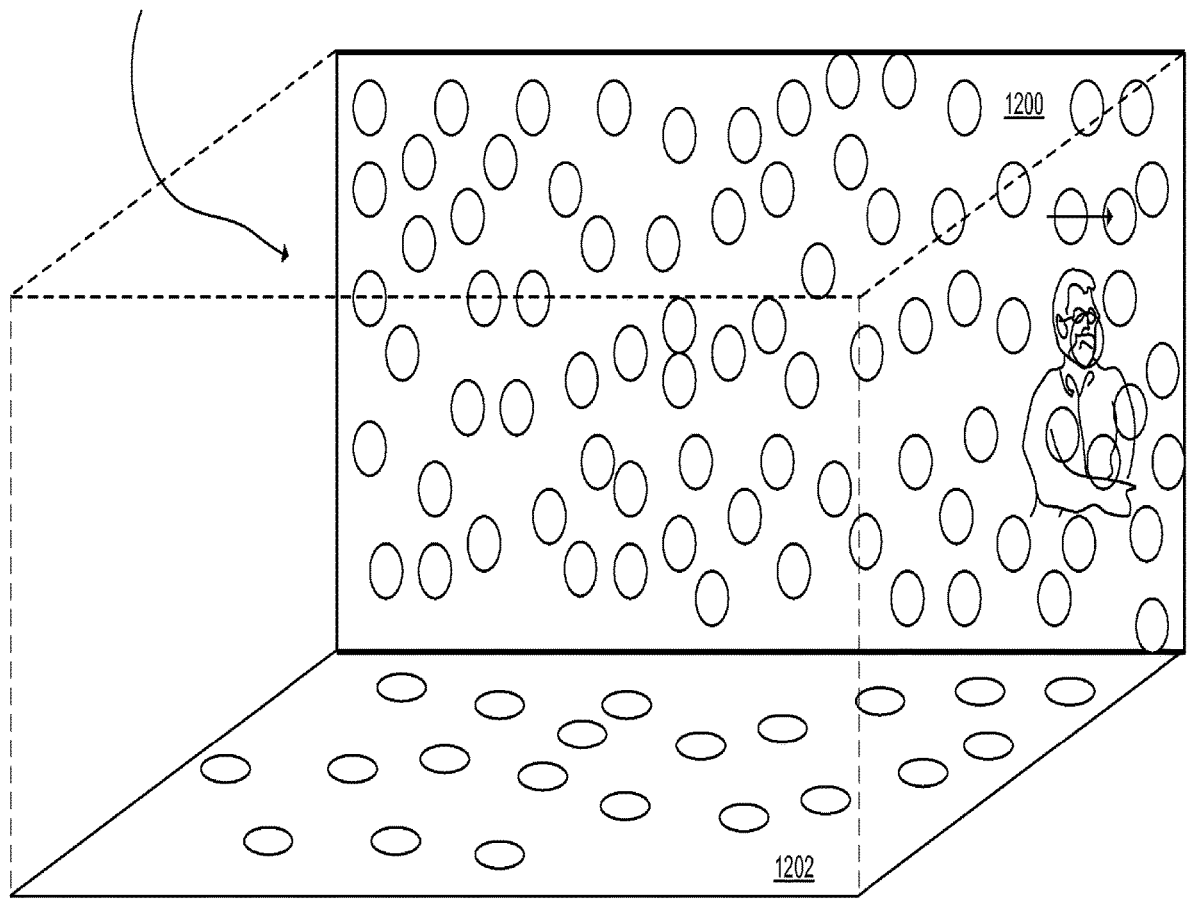

With reference now to FIGS. 13, 14, and 15, shown are three time-sequenced views of a person transiting wall 1200 and floor 1202 of the hallway of FIG. 12. FIG. 13 shows the position of the person at time=t_1. FIG. 14 shows the position of the person at time=t_2. FIG. 15 shows the position of the person at time=t_3.

Figure 16:
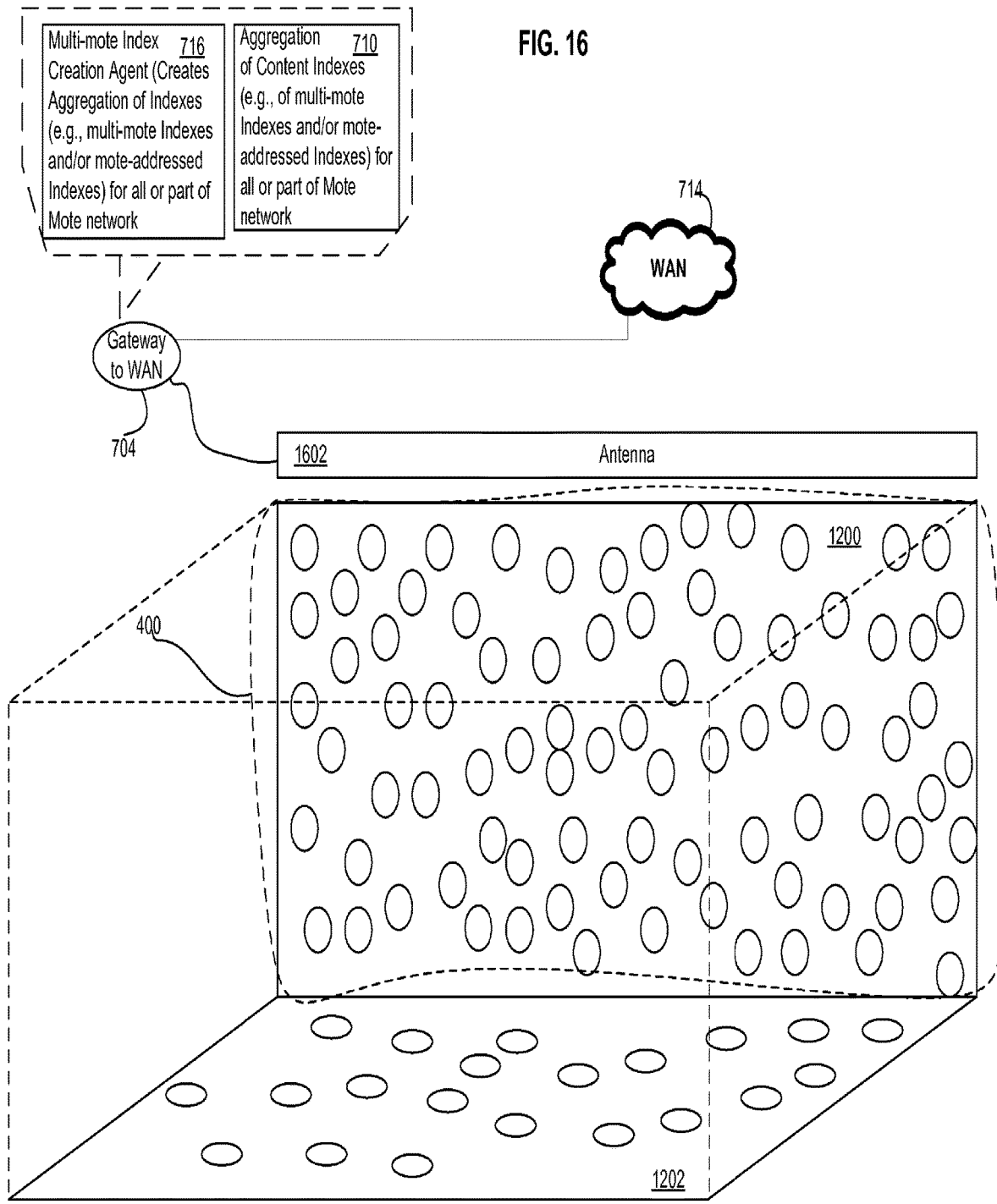
FIG. 16 depicts a perspective view of the hallway of FIG. 12, modified in accord with aspects of the subject matter described herein.

Referring now to FIG. 16, depicted is a perspective view of the hallway of FIG. 12, modified in accord with aspects of the subject matter described herein.

Illustrated is that the motes of wall 1200 may be treated as a first set 400 of motes that function and/or are structured in fashions analogous to first set 400 of motes shown/described elsewhere herein (e.g., in relation to FIGS. 4-7)

and/or as shown/described here. Accordingly, antenna 1602 is shown proximate to wall 1200 and feeding gateway 704 onto WAN 714. Multi-mote index creation agent 716 is depicted as executing on the more powerful computational systems of gateway 704 (e.g., a mini and/or mainframe computer system) to create aggregation 710 of content indexes.

Gateway 704, multi-mote index creation agent 716, and aggregation 710 of content indexes function and/or are structured analogously as described elsewhere herein, and are not expressly re-described here for sake of clarity.

Figure 17:
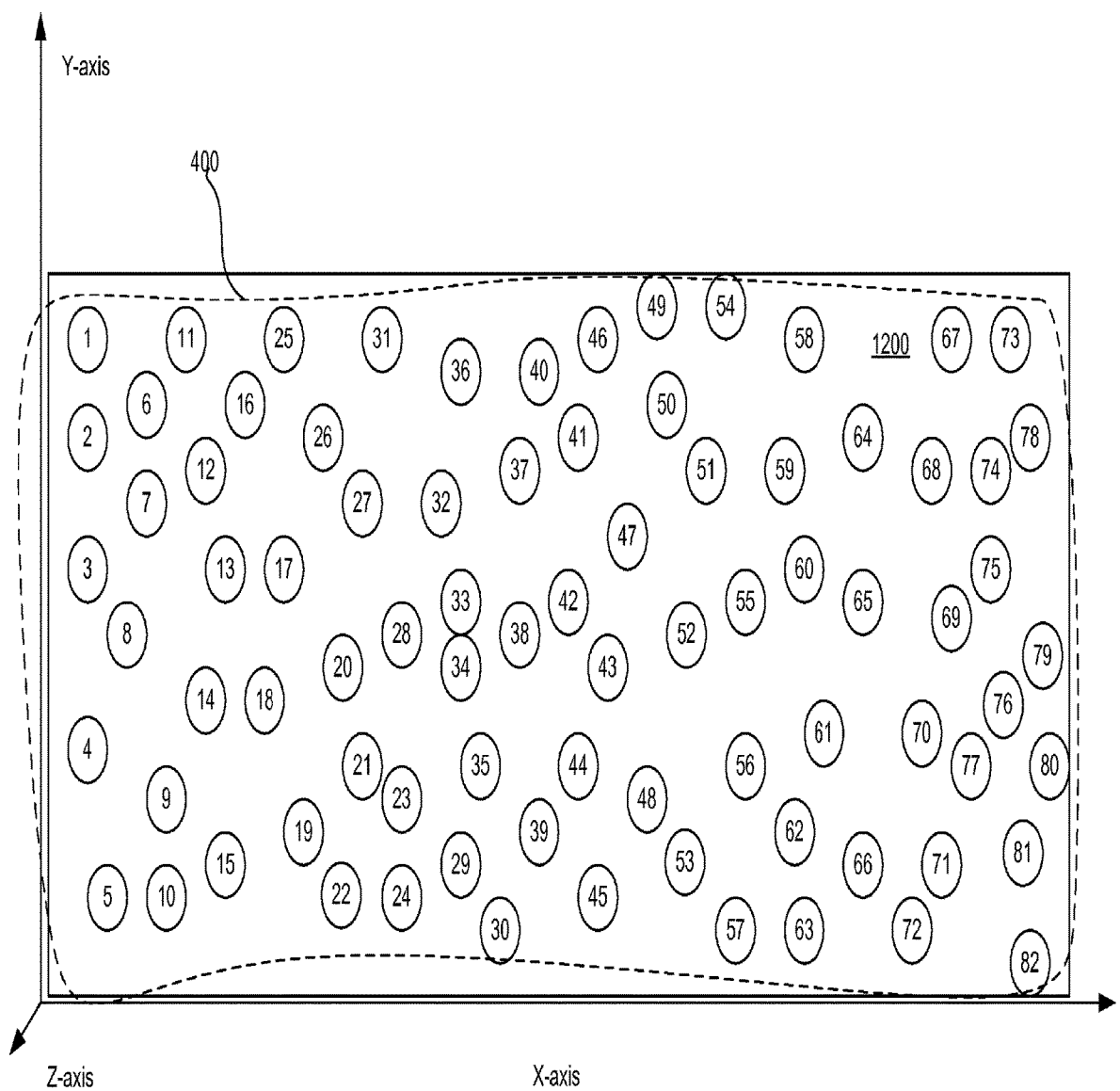
FIG. 17 illustrates that a first set 400 of the physical motes of wall 1200 may be treated as mapped into a conceptual x-y coordinate system.

With reference now to FIG. 17, illustrated is that first set 400 of the physical motes of wall 1200 may be treated as mapped into a conceptual x-y coordinate system.

The mapping into the conceptual x-y coordinate system may be used to illustrate how a multi-mote content index or aggregation of content indexes can be used to advantage. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachers herein.

Figure 18:
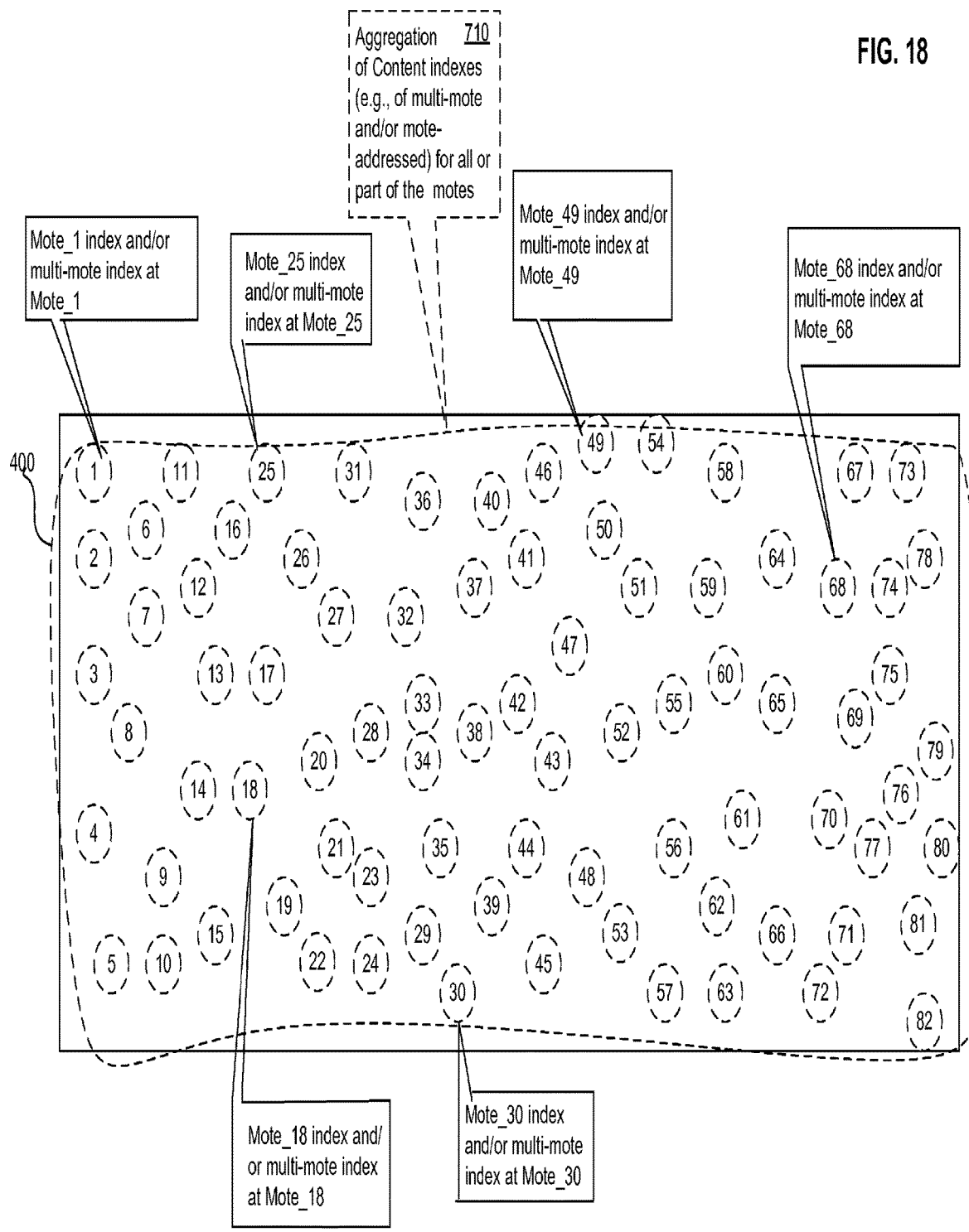
FIG. 18 shows a partially schematic diagram that pictographically illustrates the coordinating of the conceptual mapping of the motes of wall 1200 with the indexes of first set 400 of the motes of wall 1200.

Referring now to FIG. 18, shown is a partially schematic diagram that pictographically illustrates the coordinating of the conceptual mapping of the motes of wall 1200 with the indexes of first set 400 of the motes of wall 1200. Specifically, depicted in FIG. 18 is that the mapping of the physical motes as shown in FIG. 17 can be abstracted into mote content indexes. (This abstraction is illustrated in FIG. 18 by the dashed lines indicating the motes.) The mote content indexes can be used to "stand in" for or "represent" capabilities of various motes within the first set 400 of motes, and can be managed and/or searched using high speed computer systems.

Those skilled in the art will appreciate that there are many techniques suitable for managing/searching mote content indexes of first set 400 of motes. Examples of such techniques are database techniques such as those associated with Structured Query Language (SQL) systems.

Figure 19:
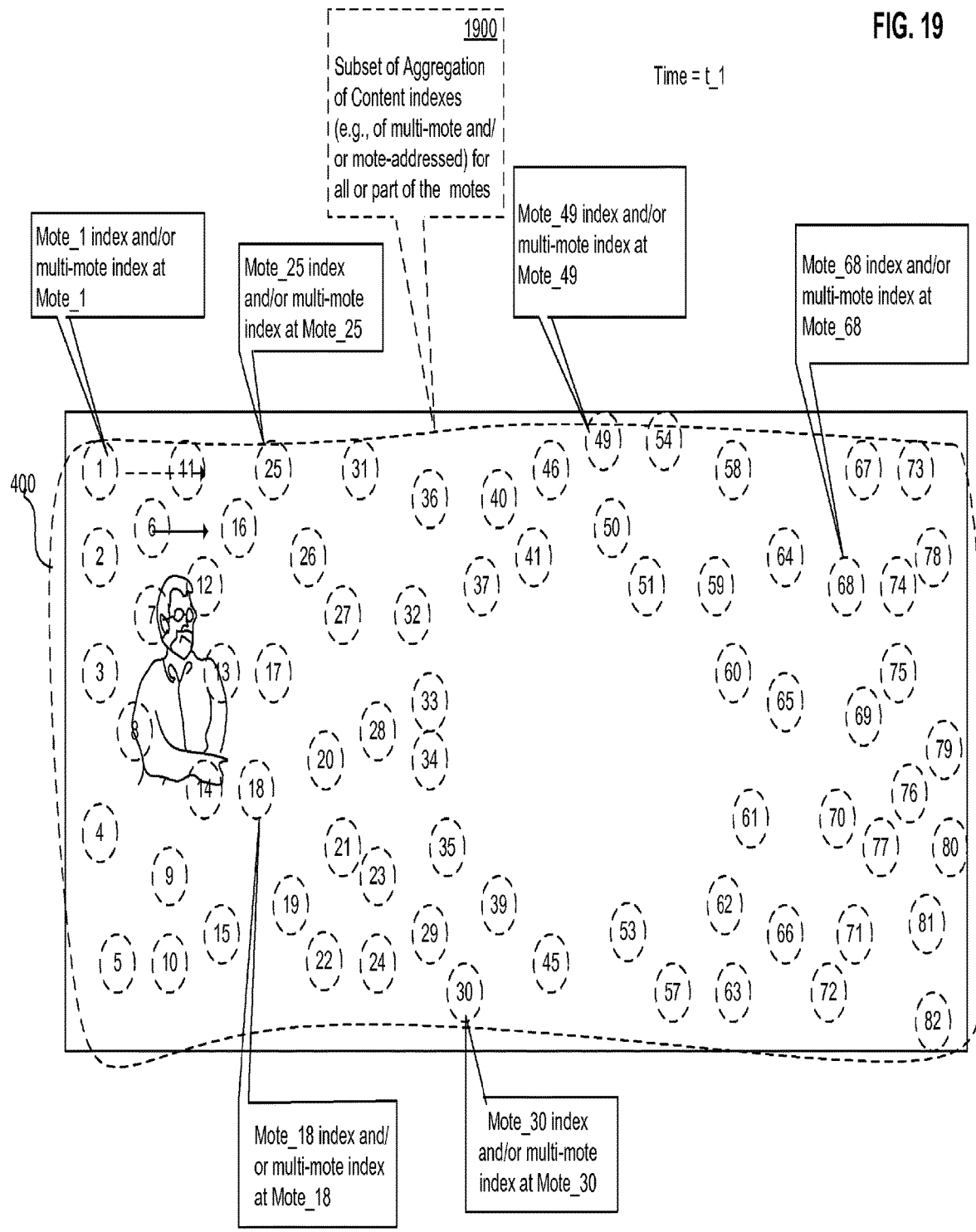
FIGS. 19, 20 and 21 show time-stamped versions of subset 1900 of aggregation 710 associated with the state of first set 400 of motes.
Figure 20:
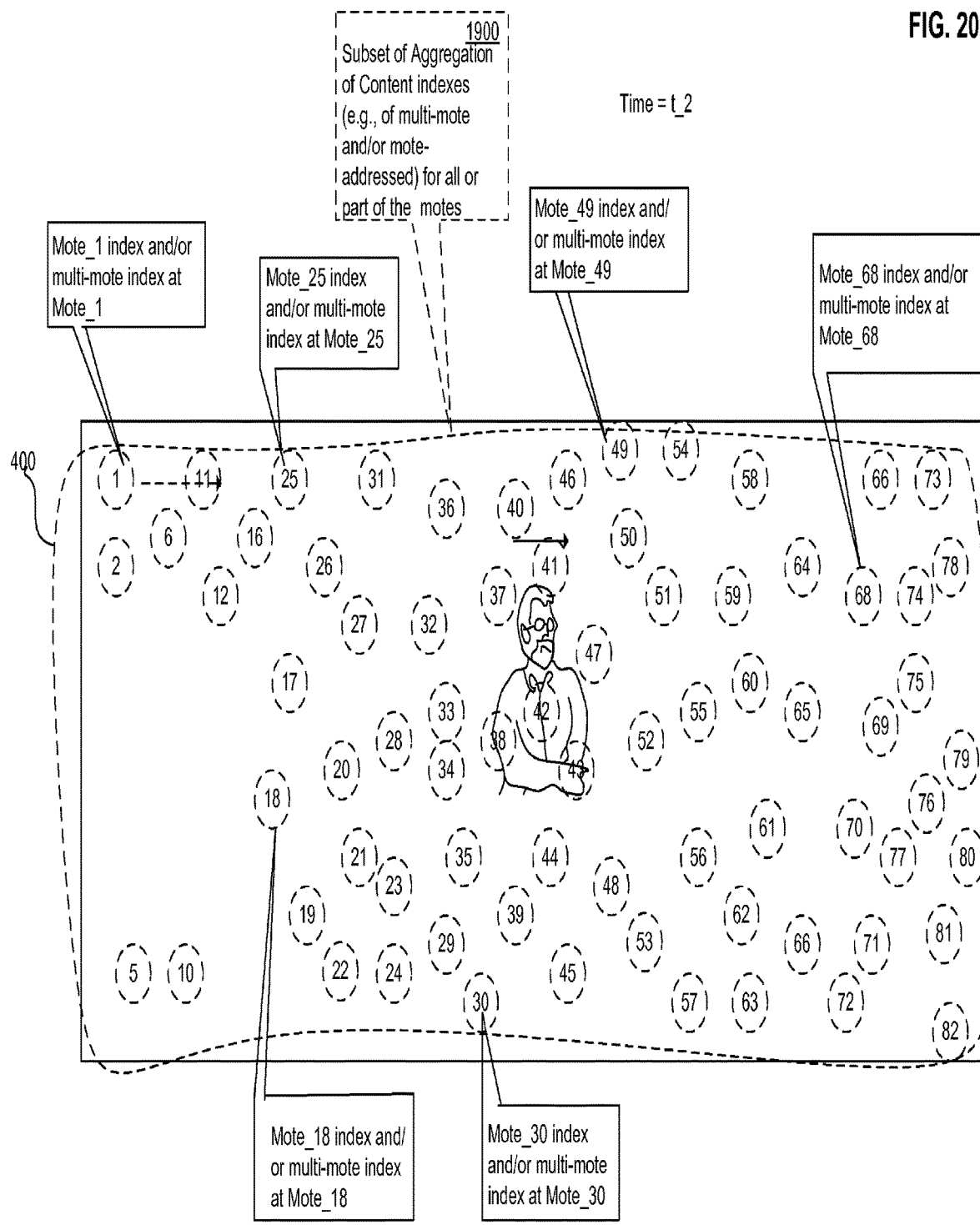
Figure 21:
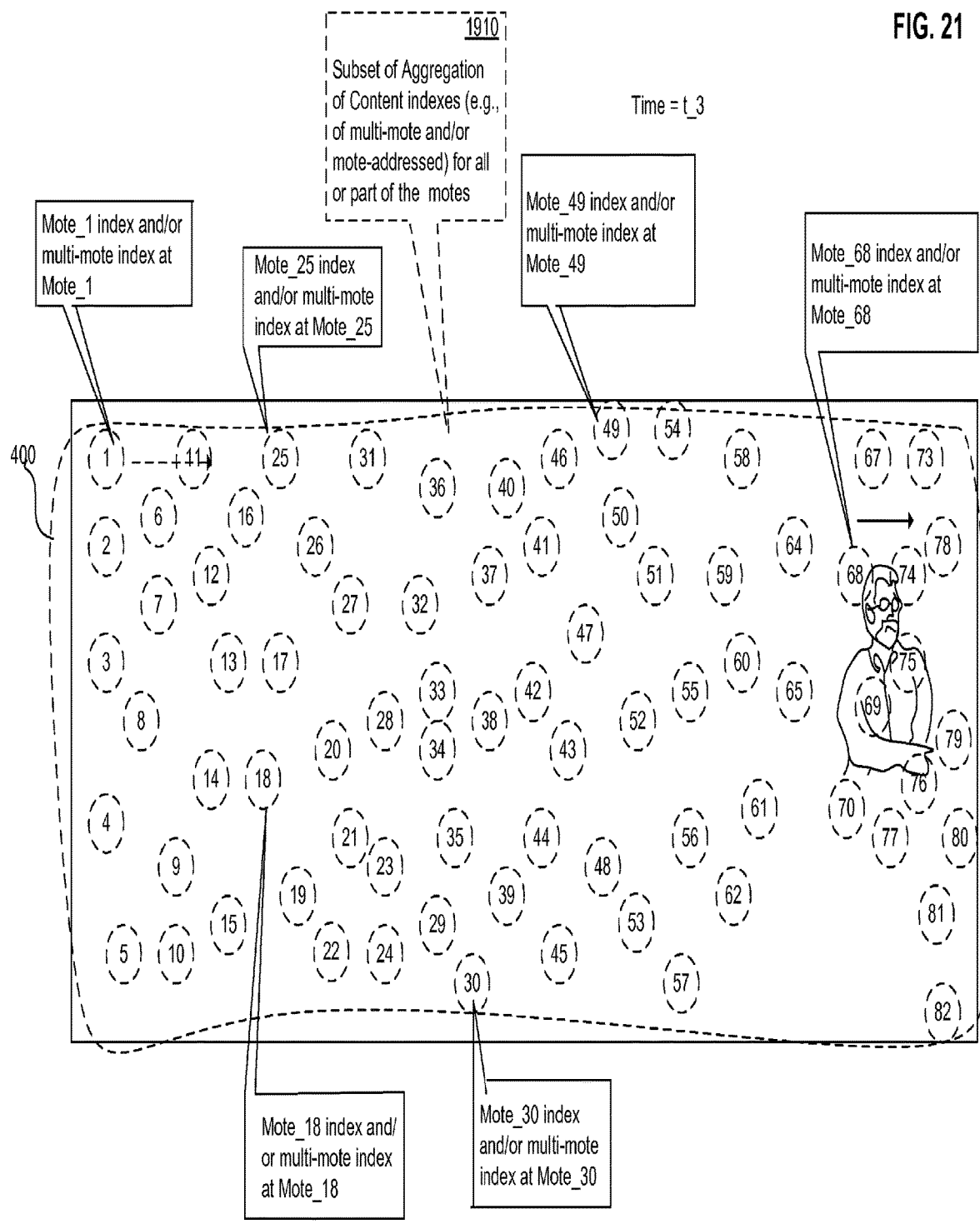

With reference now to FIGS. 19, 20, and 21 shown are time-stamped versions of subset 1900 of aggregation 710 associated with the state of first set 400 of motes. With reference now to FIG. 19, and assuming for sake of illustration that the input-defined mote-appropriate task is infrared image detection, depicted is subset 1900 of aggregation 710 at time=t_1 that shows those motes whose indexes indicate that they are capable of detecting a visible light image of the person transiting wall 1200 at time=t_1. Referring now to FIG. 20, illustrated is subset 1900 of aggregation 710 at time=t_2 that shows those motes whose indexes indicate that they are capable of detecting a visible light image of the person transiting wall 1200 at time=t_2. With reference now to FIG. 21, shown is subset 1900 of aggregation 710 at time=t_3 that shows those motes whose indexes indicate that they are capable of detecting a visible light image of the person transiting wall 1200 at time=t_3. As can be seen, subset 1900 contains indications of different motes at the different times; those skilled in the art will also recognize that in some implementations the number/location of motes will remain relatively constant over time. Those having skill in the art will appreciate that in practice subset 1900 of aggregation 710 will generally be in the form of nested data structures and that the pictographic representations of how the person would "appear" in FIGS. 19, 20, and 21 are used herein for sake of clarity.

As described elsewhere herein (e.g., in relation to FIGS. 1 and 2), motes can include any number of devices whose information capabilities can be captured in aggregates of content indexes (e.g., aggregation 710 of content indexes). Accordingly, aggregation 710 allows flexible and powerful searching techniques, a few of which will now be described.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 22:
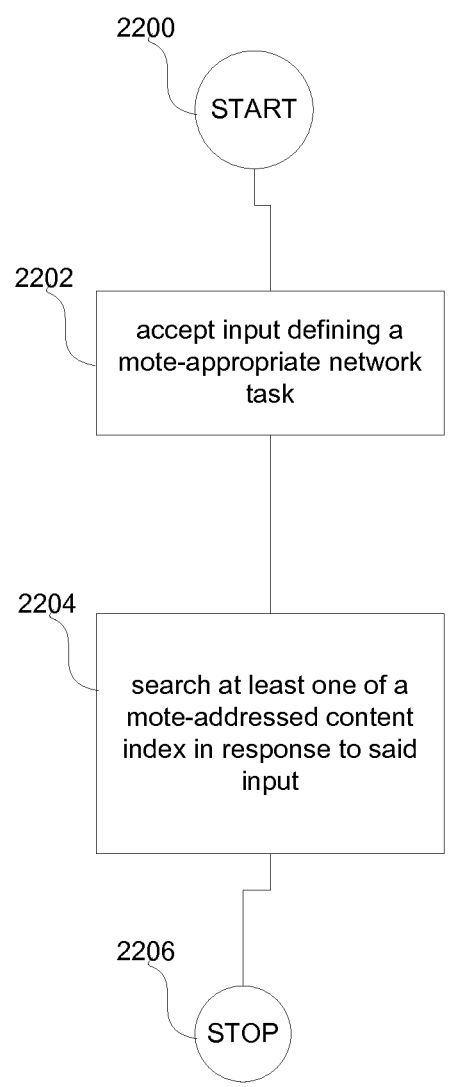
FIG. 22 depicts a high-level logic flowchart of a process.

Referring now to FIG. 22, depicted is a high-level logic flowchart of a process.

Method step 2200 shows the start of the process. Method step 2202 depicts accepting input defining a mote-appropriate network task. Method step 2204 depicts searching at least one mote-addressed content index in response to said input. Method step 2206 shows the end of the process.

Figure 23:
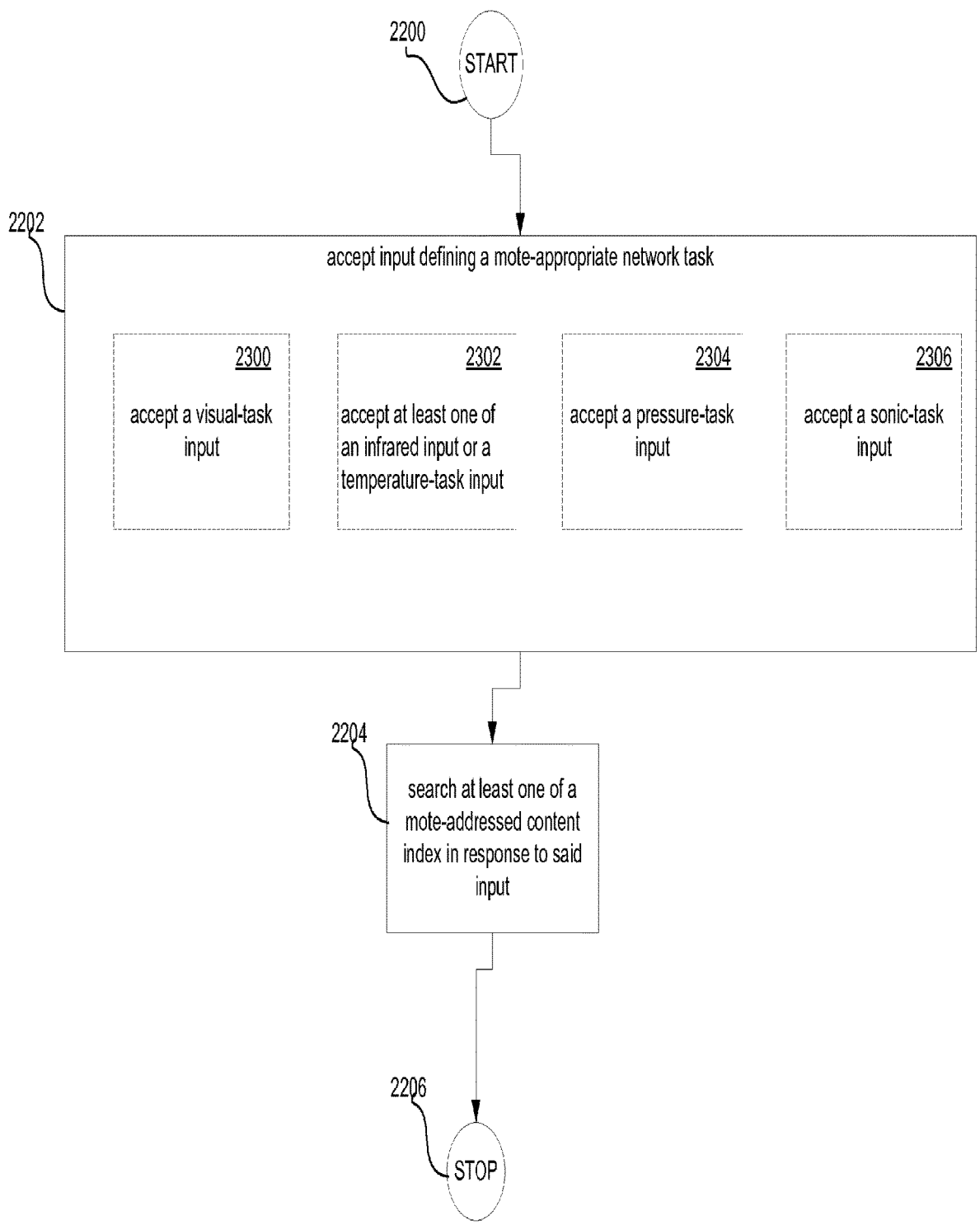
FIG. 23 illustrates a high-level logic flowchart depicting several alternate implementations of the high-level logic flowchart of FIG. 22.

With reference now to FIG. 23, illustrated is a high-level logic flowchart depicting several alternate implementations of the high-level logic flowchart of FIG. 22. Depicted is that in one alternate implementation, method step 2202 includes method step 2300. Method step 2300 shows accepting a visual-task input. Specific example implementations of method step 2300 are as shown/described in relation to substantially analogous method step 3600 of FIG. 36, and are not expressly described here for sake of clarity.

Continuing to refer to FIG. 23, illustrated is a high-level logic flowchart depicting several alternate implementations of the high-level logic flowchart of FIG. 22. Depicted is that in one alternate implementation, method step 2202 includes method step 2302. Method step 2302 shows accepting at least one of an infrared-task input or a temperature-task input. Specific example implementations of method step 2302 are as shown/described in relation to substantially analogous method step 3602 of FIG. 36.

With reference now again to FIG. 23, illustrated is a high-level logic flowchart depicting several alternate implementations of the high-level logic flowchart of FIG. 22. Depicted is that in one alternate implementation, method step 2202 includes method step 2304. Method step 2304 shows accepting a pressure-task input. Specific example implementations of method step 2304 are as shown/described in relation to substantially analogous method step 3604 of FIG. 36, and are not expressly described here for sake of clarity.

With reference now again to FIG. 23, illustrated is a high-level logic flowchart depicting several alternate implementations of the high-level logic flowchart of FIG. 22. Depicted is that in one alternate implementation, method step 2202 includes method step 2306. Method step 2306 shows accepting a sonic-task input. Specific example implementations of method step 2306 are as shown/described in relation to substantially analogous method step 3606 of FIG. 36, and are not expressly described here for sake of clarity.

Figure 24:
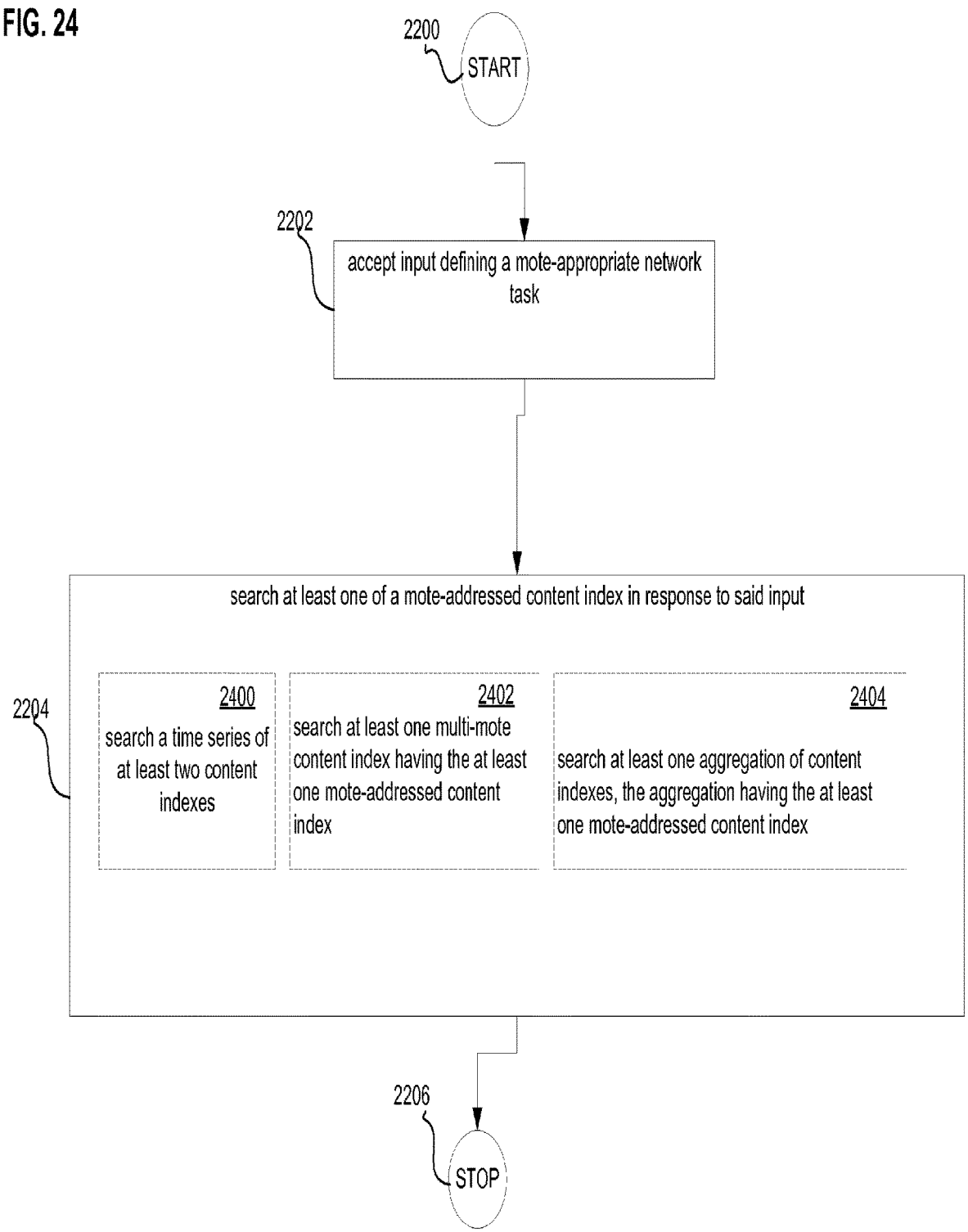
FIG. 24 illustrates a high-level logic flowchart depicting several alternate implementations of the high-level logic flowchart of FIG. 22.

Referring now to FIG. 24, illustrated is a high-level logic flowchart depicting several alternate implementations of the high-level logic flowchart of FIG. 22.

Depicted is that in one alternate implementation, method step 2204 includes method step 2400. Method step 2400 shows searching a time series of at least two content indexes.

In various exemplary implementations, electrical circuitry successively searches a time series of content indexes for motes capable of gathering various defined types of information related to various specified mote-appropriate network tasks. In some specific implementations such as those used in security, electrical circuitry (e.g., electrical circuitry forming a processor configured by a program to perform various tasks) searches a time series of content indexes for motes capable of capturing information related to a specified mote-appropriate network task (e.g., searching one or more content indexes of subset 1900 of aggregation 710 at time=t_1 (FIG. 19), at time=t_2 (FIG. 20), and at time=t_3 (FIG. 21) for one or more motes capable of tracking a person's progress through the hallway such as shown and/or described in relation to FIGS. 13, 14, and 15). In some implementations such as those used in criminal investigations, electrical circuitry searches a time series of federated indexes for motes having a capability(ies) to detect particular pattern of sound over time (e.g., searching the time series for motes capable of detecting a pattern of sound a gunshot would make in subset 1900 of aggregation 710 at time=t_1 (FIG. 19), at time=t_2 (FIG. 20), and at time=t_3 (FIG. 21) if a gun were to be fired in the hallway of FIG. 12). Those skilled in the art will appreciate that many other searches may be performed, dependent upon the accepted input defining the mote-appropriate search of method step 2202.

Continuing to refer to FIG. 24, depicted is that in one alternate implementation method step 2204 includes method step 2402. Method step 2402 shows searching at least one multi-mote content index having the at least one mote-addressed content index. In various exemplary implementations, electrical circuitry searches at least one multi-mote content index having the at least one mote-addressed content index. In some specific implementations such as those used in security, electrical circuitry searches one or more multi-mote content indexes, over time, in response to the defined mote-appropriate network task (e.g., electrical circuitry searching one or more multi-mote content indexes for indications of motes having capabilities to monitor a patient's heart for sounds indicative of arrhythmia). In some implementations such as those used in aviation maintenance, electrical circuitry searches one or more multi-mote content indexes, over time, in response to a defined mote-appropriate network task (e.g., electrical circuitry searching one or more multi-mote content indexes for indications of motes having capabilities monitor a defined area of aviation equipment, such as a jet engine, for sounds indicative of motor failure, in response to a search requesting that the indexes be so searched). Those skilled in the art will appreciate that many other searches may be performed, dependent upon the accepted input defining the mote-appropriate network task of method step 2202.

Figure 25:
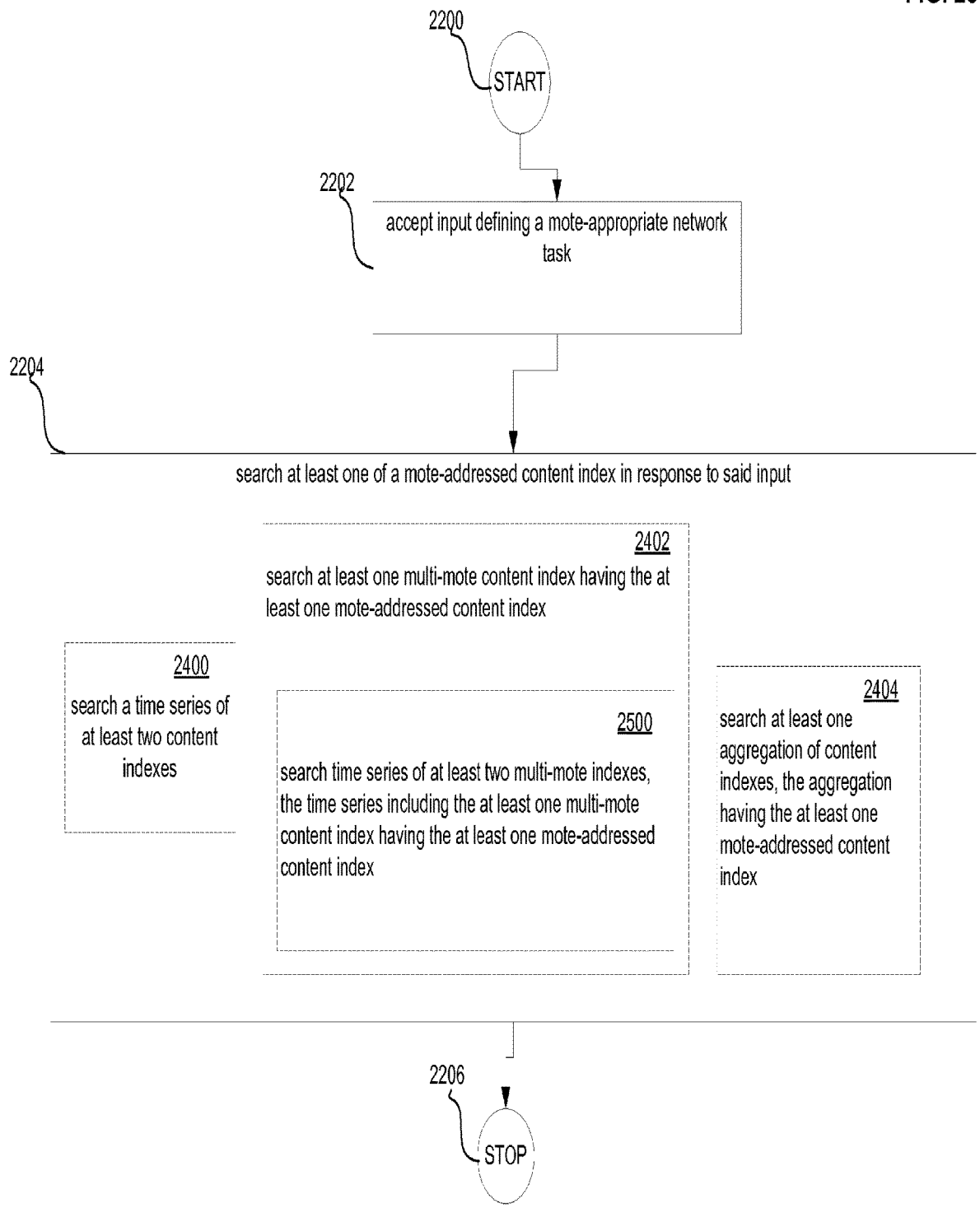
FIG. 25 shows a high-level logic flowchart depicting several alternate implementations of the high-level logic flowchart of FIG. 24.

With reference now to FIG. 25, shown is a high-level logic flowchart depicting several alternate implementations of the high-level logic flowchart of FIG. 24.

Depicted is that in one alternate implementation, method step 2402 includes method step 2500. Method step 2500 shows searching a time series of at least two multi-mote indexes, the time series including the at least one multi-mote content index having the at least one mote-addressed content index. In various exemplary implementations, electrical circuitry successively searches a time series of at least two multi-mote indexes, the time series including the at least one multi-mote content index having the at least one mote-addressed content index for motes capable of gathering various defined types of information appropriate to the mote-appropriate network task. In some specific implementations such as those used in security, electrical circuitry (e.g., electrical circuitry forming a processor configured by a program to perform various tasks) searches time series of at least two multi-mote indexes, the time series including the at least one multi-mote content index having the at least one mote-addressed content index for motes capable of capturing an image in visible light (e.g., searching one or more content indexes of subset 1900 of aggregation 710 at time=t_1 (FIG. 19), at time=t_2 (FIG. 20), and at time=t_3 (FIG. 21) in order to identify motes that have visible light capabilities appropriate to track a person's progress through the hallway such as shown and/or described in relation to FIGS. 13, 14, and 15). In some implementations such as those used in criminal investigations, electrical circuitry searches a time series of one or more multi-mote content indexes of federated content index 916 for motes capable of identifying a particular pattern or characteristic of sound over time (e.g., the pattern of sound or acoustic signature a gunshot would make in subset 1900 of aggregation 710 at time=t_1 (FIG. 19), at time=t_2 (FIG. 20), and at time=t_3 (FIG. 21) if a gun were to be fired in the hallway of FIG. 12). Those skilled in the art will appreciate that many other searches may be performed, dependent upon the accepted input defining the mote-appropriate network task of method step 2202.

Referring now again to FIG. 24, depicted is that in one alternate implementation method step 2204 includes method step 2404. Method step 2404 shows searching at least one aggregation of content indexes, the aggregation having the at least one mote-addressed content index. In various exemplary implementations, electrical circuitry searches the at least one aggregation of content indexes, the aggregation having the at least one mote-addressed content index. In some specific implementations such as those used in security, electrical circuitry (e.g., electrical circuitry forming a processor configured by a program to perform various tasks) searches the at least one aggregation of content indexes, the aggregation having the at least one mote-addressed content index, for motes capable of capturing an image in the visible light spectrum (e.g., searching subset 1900 of aggregation 710 of content indexes at time=t_1 (FIG. 19)) for one or more motes capable of determining if a person was in front of wall 1200 at some time=t_1 as shown and/or described in relation to FIG. 13). In some implementations such as those used in criminal investigations, electrical circuitry searches the at least one aggregation of content indexes, the aggregation having the at least one mote-addressed content index, for motes having capability(ies) to detect a particular sound at a particular time (e.g., a certain sound present in subset 1900 of aggregation 710 at time=t_1 (FIG. 19)). Those skilled in the art will appreciate that many other searches may be performed, dependent upon the accepted input defining the mote-appropriate search of method step 2202.

Figure 26:
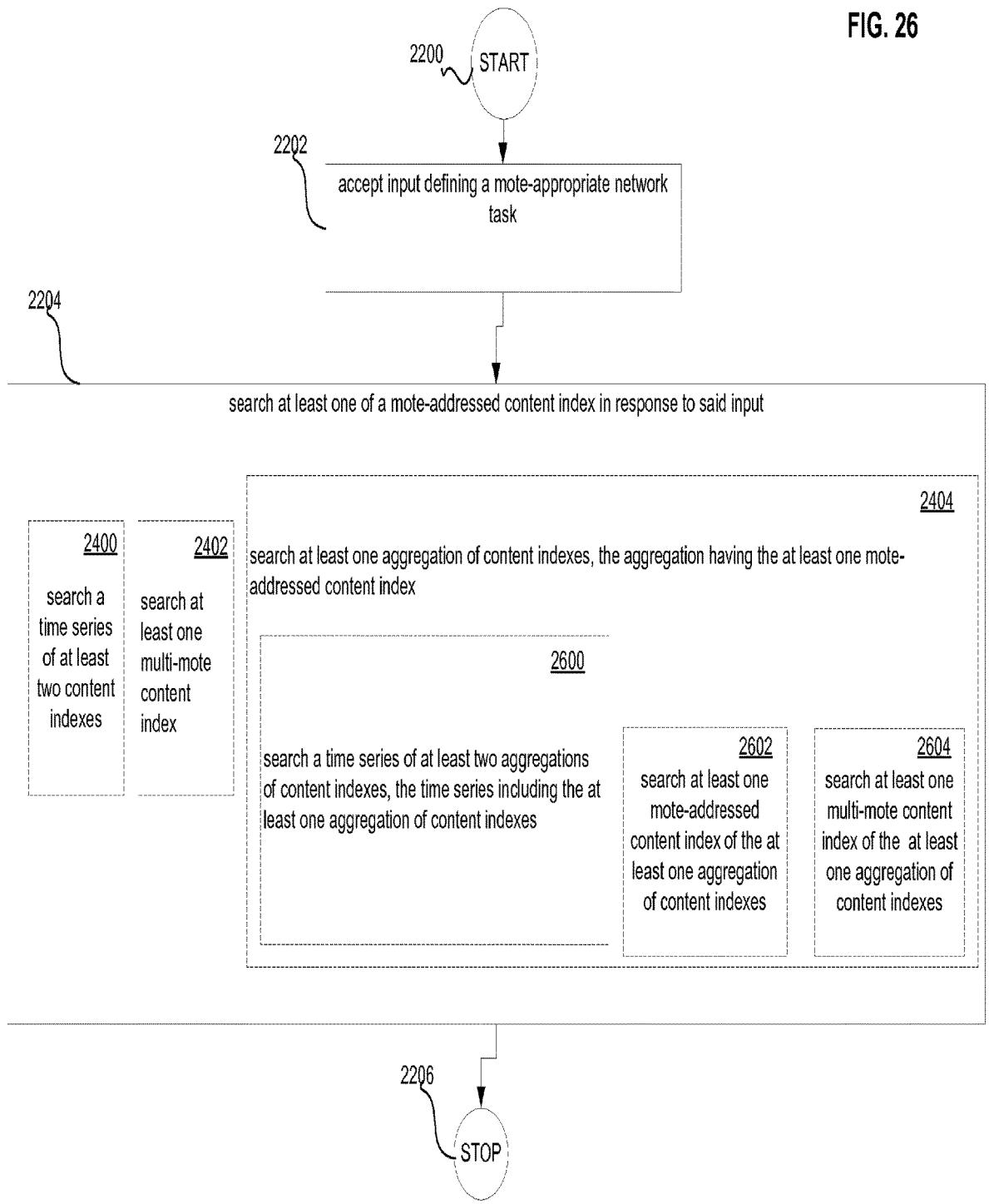
FIG. 26 shows a high-level logic flowchart depicting several alternate implementations of the high-level logic flowchart of FIG. 25.

With reference now to FIG. 26, shown is a high-level logic flowchart depicting several alternate implementations of the high-level logic flowchart of FIG. 25.

Depicted is that in one alternate implementation, method step 2404 includes method step 2600. Method step 2600 illustrates searching a time series of at least two aggregations of content indexes, the time series including the at least one aggregation of content indexes. In various exemplary implementations, electrical circuitry searches a time series of at least two aggregations of content indexes, the time series including the at least one aggregation of content indexes. In some specific implementations such as used in security, electrical circuitry (e.g., electrical circuitry forming a processor configured by a program to perform various tasks) searches the time series of at least two aggregations of content indexes, the time series including the at least one aggregation of content indexes, for motes capable of capturing an image in the visible light spectrum (e.g., searching one or more content indexes of subset 1900 of aggregation 710 at time=t_1 (FIG. 19), at time=t_2 (FIG. 20), and at time=t_3 (FIG. 21) for one or more motes capable of tracking a person's progress through the hallway such as shown and/or described in relation to FIGS. 13, 14, and 15). In some implementations such as those used in criminal investigations, electrical circuitry searches the time series of at least two aggregations of content indexes, the time series including the at least one aggregation of content indexes, for motes having capability(ies) to detect a particular sound at a particular time (e.g., searching subset 1900 of aggregation 710 at time=t_1 (FIG. 19), at time=t_2 (FIG. 20), and at time=t_3 (FIG. 21) for indications of motes capable of detecting the sound a gun would make if a gun were to be fired in the hallway of FIG. 12). Those skilled in the art will appreciate that many other searches may be performed, dependent upon the accepted input defining the mote-appropriate search of method step 2202.

Continuing to refer to FIG. 26, depicted is that in one alternate implementation, method step 2404 includes method step 2602. Method step 2602 illustrates searching at least one mote-addressed content index of the at least one aggregation of content indexes. In various exemplary implementations, electrical circuitry is used to effect the searching at least one mote-addressed content index of the at least one aggregation of content indexes. Those skilled in the art will appreciate that many other searches may be performed, dependent upon the accepted input defining the mote-appropriate search of method step 2202.

Continuing to refer to FIG. 26, depicted is that in one alternate implementation, method step 2404 includes method step 2604. Method step 2604 illustrates searching at least one multi-mote content index of the at least one aggregation of content indexes. In various exemplary implementations, electrical circuitry is used to effect the searching at least one multi-mote content index of the at least one aggregation of content indexes.

Those skilled in the art will appreciate that many other searches may be performed, dependent upon the accepted input defining the mote-appropriate search of method step 2202.

Those skilled in the art will appreciate that in some implementations, the searching described in relation to various processes herein (e.g., such as those shown/described in relation to FIGS. 22-26) is performed on mote-addressed content indexes, multi-mote content indexes, and/ or aggregations of content indexes loaded to computer systems external to a mote-appropriate network. For example, searching using computer systems such as shown/ described in relation to gateway 704, which can include, for example, one or more of a notebook computer system, minicomputer system, server computer system, and/or a mainframe computer system. Those skilled in the art will also appreciate that in other implementations the searching described in relation to various processes herein (e.g., such as those shown/described in relation to FIGS. 22-26) is performed in whole or in part on motes of a mote-appropriate network. Those skilled in the art will also recognize that the approaches described herein are not limited to accepting an input of a single kind and that the searching may be refined using a combination of inputs, such as a visual definition input combined with a sonic definition input. When combined, the searching logic may correlate the processes temporally or the searches may be combined independently of relative time references. Those skilled in the art will also appreciate that in other implementations the searching described in relation to various processes herein (e.g., such as those shown/described in relation to FIGS. 22-26) is performed in other computer systems consistent with the teachings herein.

VII. Using Federated Mote-Associated Indexes

Figure 27:
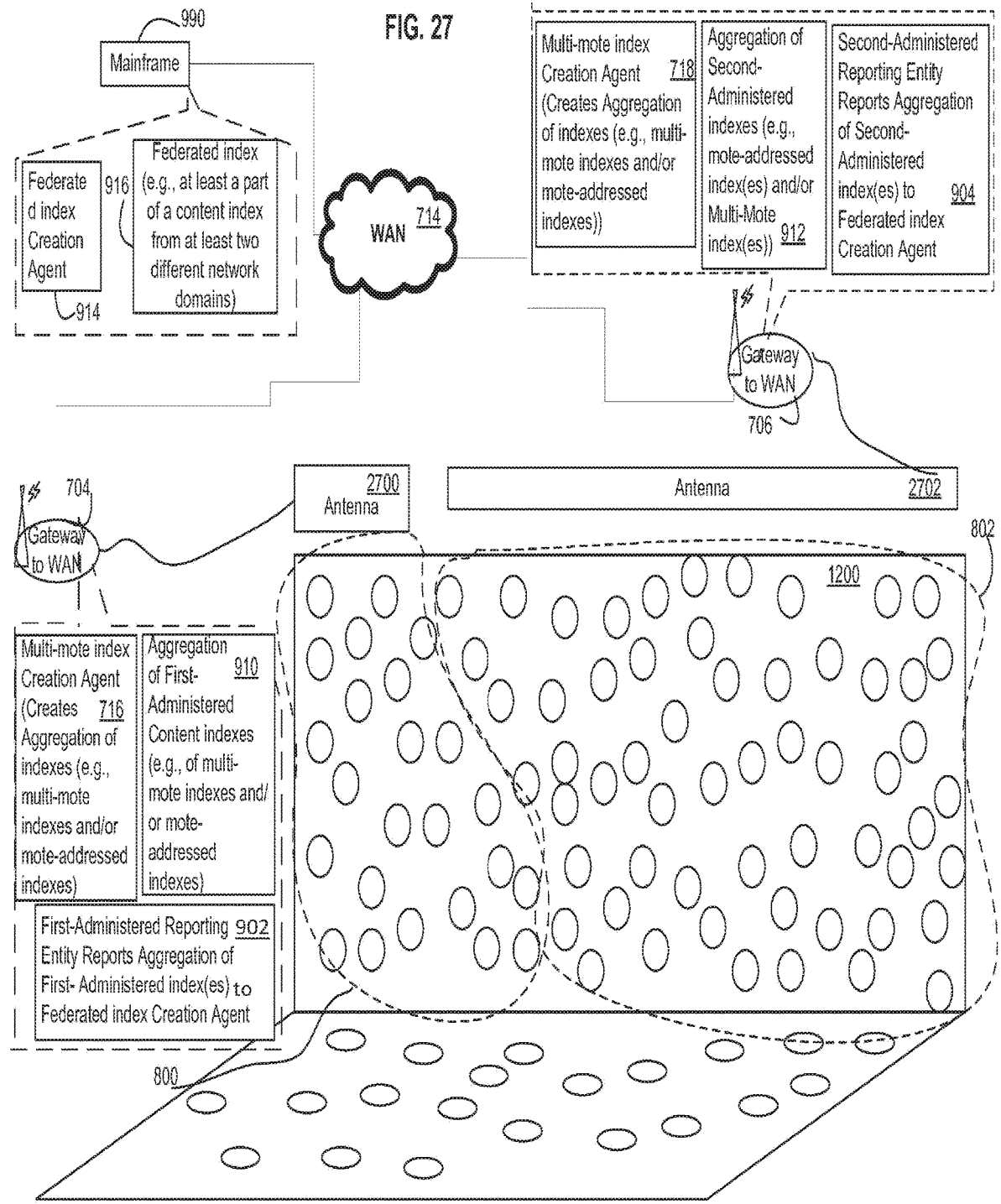
FIG. 27 illustrates the perspective cut-away view of the hallway of FIG. 12 modified in accord with aspects of the subject matter described herein.

With reference now to FIG. 27, illustrated is the perspective cut-away view of the hallway of FIG. 12 modified in accord with aspects of the subject matter described herein. Illustrated is that the motes of wall 1200 may be partitioned into first-administered set 800 of motes and second-administered set 802 of motes analogous to the first-administered set 800 of motes and second-administered set 802 of motes shown/described elsewhere herein (e.g., in relation to FIGS. 10-13). Antenna 2700 is shown proximate to first-administered set 800 of motes and shown feeding gateway 704 onto WAN 714. Multi-mote index creation agent 716 is depicted as executing on the more powerful computational system(s) of gateway 704 (e.g., a mini and/or a mainframe computer system) to create aggregation 910 of first-administered content indexes. First-administered reporting entity 902 is illustrated as executing on gateway 704. Gateway 704, multi-mote index creation agent 716, aggregation 910 of first-administered content indexes, and first-administered reporting entity 902 function and/or are structured in fashions analogous to those described here and/or elsewhere herein.

Antenna 2702 is shown proximate to second-administered set 802 of motes and feeding gateway 706 onto WAN 714. Multi-mote index creation agent 718 is depicted as executing on the more powerful computational system(s) of gateway 706 (e.g., a mini and/or a mainframe computer system) to create aggregation 912 of second-administered content indexes. Second-administered reporting entity 904 is illustrated as executing on gateway 706. Gateway 706, multi-mote index creation agent 718, aggregation 912 of second-administered content indexes, and second-administered reporting entity 904 function and/or are structured in fashions analogous to those described here and/or elsewhere herein.

In some implementations, frequency re-use techniques are utilized across first-administered set 800 of motes and second-administered set 802 of motes. For instance, first-administered set 800 of motes operating on or around a first carrier frequency and second-administered set 802 of motes operating on or around a second carrier frequency. Accordingly, in some implementations antenna 2700 is tuned to a carrier frequency of first-administered set 800 of motes and antenna 2702 is tuned to a carrier frequency of second-administered set 802 of motes. In other implementations, frequency re-use techniques are not used across first-administered set 800 of motes and second-administered set 802 of motes (e.g., the differently administered networks use different addressing spaces and/or proximities to provide for the separate network administrations).

Further shown in FIG. 27 are federated index creation agent 914 and federated content index 916 resident within mainframe computer system 990. Federated index creation agent 914, federated content index 916, and mainframe computer system 990 function and/or are structured in fashions analogous to those described here and/or elsewhere herein.

Figure 28:
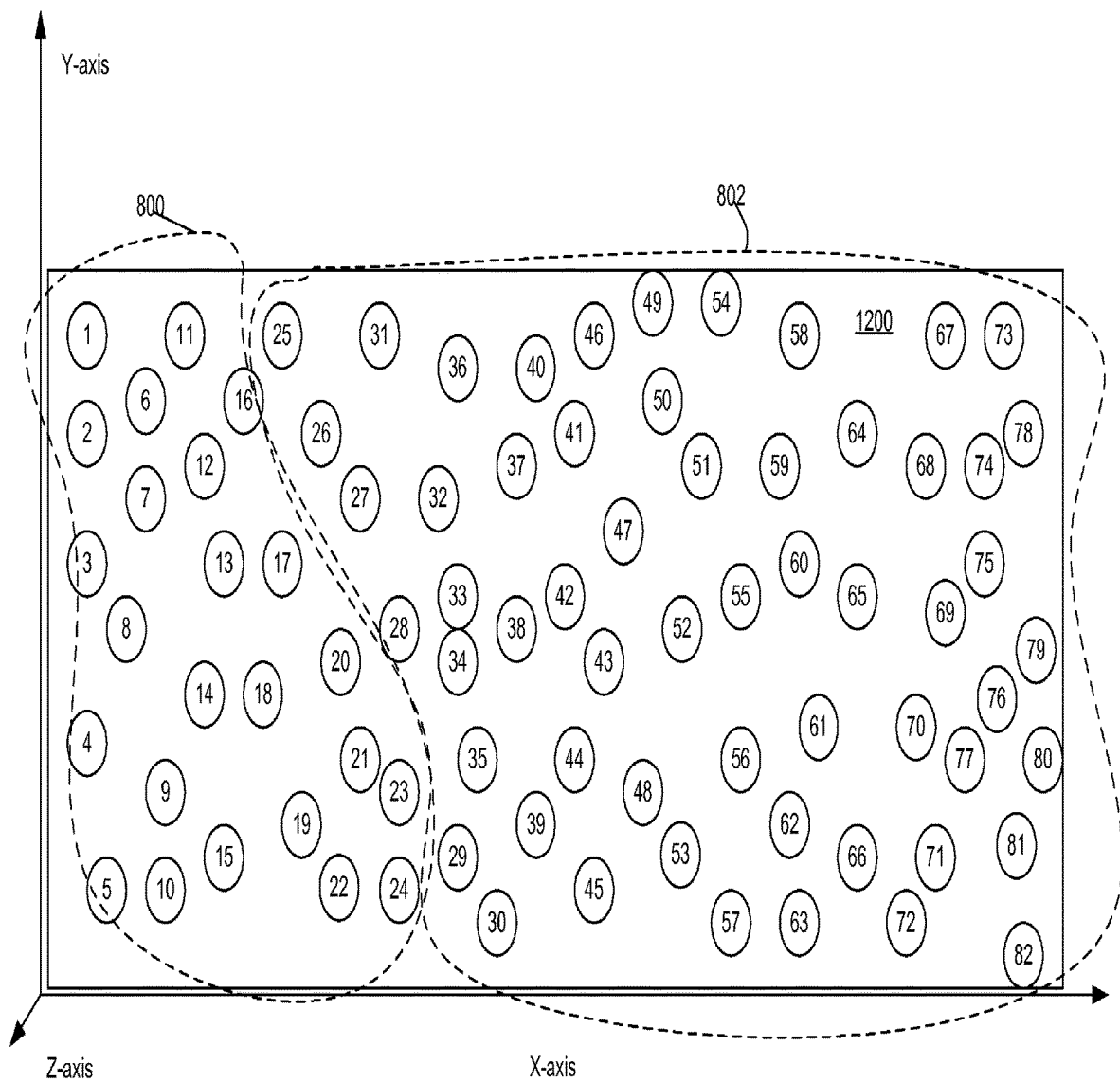
FIG. 28 shows that first-administered set 800 and second-administered set 802 of the physical motes of wall 1200 may be treated as mapped into a conceptual x-y coordinate system.

Referring now to FIG. 28, shown is that first-administered set 800 and second-administered set 802 of the physical motes of wall 1200 may be treated as mapped into a conceptual x-y coordinate system. The mapping into the conceptual x-y coordinate system may be used to illustrate how a multi-mote content index or aggregation of content indexes (e.g., such as those forming at least a part of federated content index 916) can be used to advantage. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachings herein.

Figure 29:
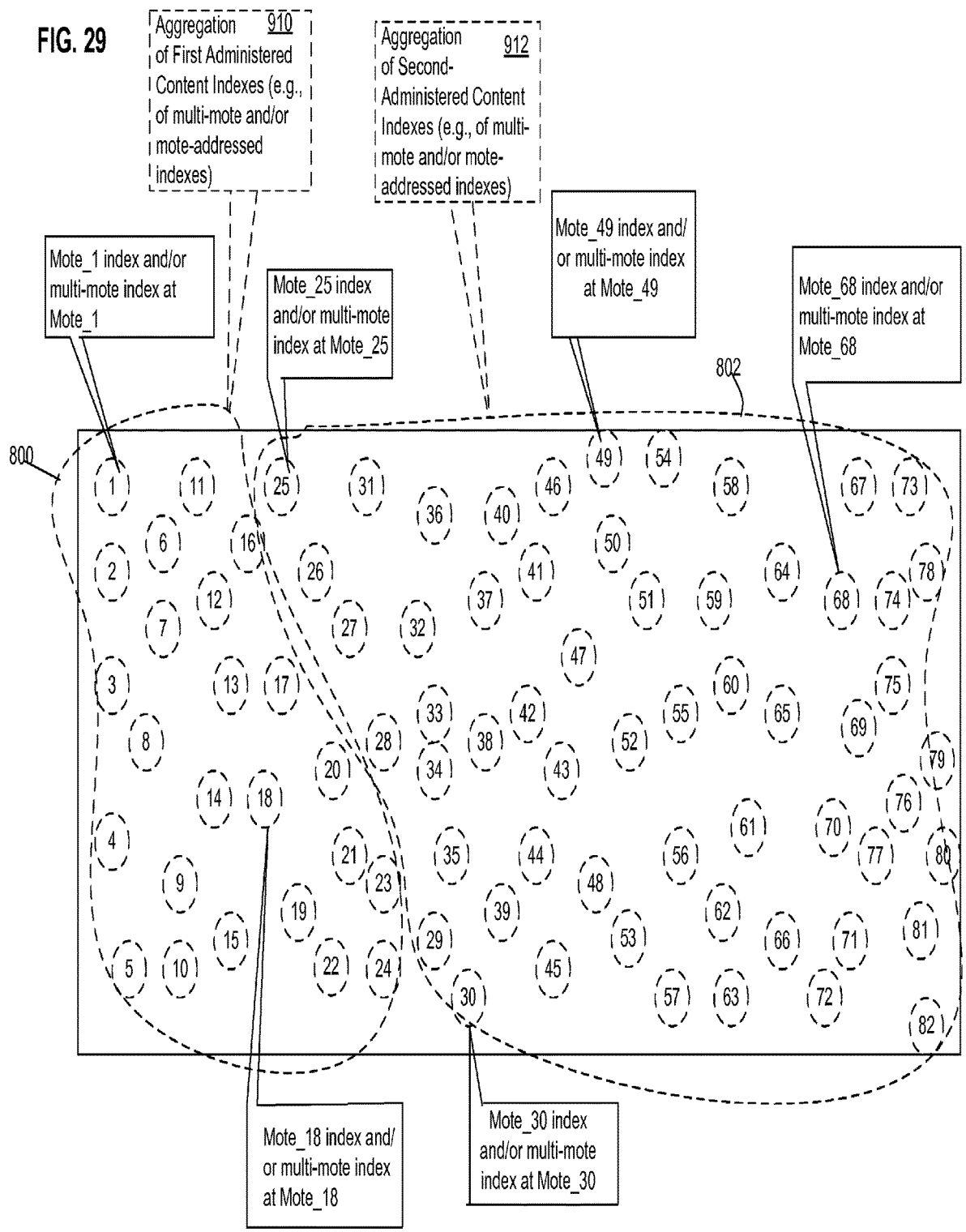
FIG. 29 shows a partially schematic diagram that pictographically illustrates the coordinating of the conceptual mapping of the motes of wall 1200 with indexes of first-administered set 800 and second-administered set 802 of the physical motes of wall 1200.

With reference now to FIG. 29, shown is a partially schematic diagram that pictographically illustrates the coordinating of the conceptual mapping of the motes of wall 1200 with indexes of first-administered set 800 and second-administered set 802 of the physical motes of wall 1200. (This abstraction is illustrated in FIG. 29 by the dashed lines indicating the motes.) Specifically, depicted in FIG. 29 is that the mapping of the physical motes shown in FIG. 28 can be abstracted into aggregation 910 of first-administered content indexes and create aggregation 912 of second-administered content indexes. So abstracted, the mote content indexes can be used to "stand in" for or "represent" first-administered set 800 and/or second-administered set 802 of the physical motes of wall 1200, and can be independently and/or jointly managed and/or searched using high speed computer systems.

Those skilled in the art will appreciate that there are many techniques suitable for managing/searching mote content indexes of first-administered set 800 and/or second-administered set 802 of the physical motes of wall 1200. Examples of such techniques are database techniques such as those associated with relational database and/or SQL systems.

As described following in relation to FIGS. 35-47, some process implementations include but are not limited to accepting input defining a mote-appropriate network task; searching at least one federated index in response to said accepted input; and presenting an indication of motes appropriate to the mote-appropriate network task. (Several specific implementations are shown/described below in relation to FIG. 35-47.) One advantage of such process implementations is that in instances where an entity defining the mote-appropriate task has relatively scant knowledge of motes in one or more mote-appropriate networks, such process implementations will allow the entity to discover network resources applicable to defined mote-appropriate tasks. For example, in an implementation where the mote-appropriate task is information capture using light, some process implementations would indicate which motes have visible-light capabilities (e.g., having light device 140 as described herein). In an implementation where the mote-appropriate task is information capture using electrical/magnetic quantities, some process implementations would indicate which motes have electrical/magnetic capabilities (e.g., electrical/magnetic device 140 as described herein). In an implementation where the mote-appropriate task is information capture using pressure, some process implementations would indicate which motes have pressure capabilities (e.g., pressure device 144 as described herein). In an implementation where the mote-appropriate task is information capture using temperature, some process implementations would indicate which motes have temperature capabilities (e.g., temperature device 156 as described herein). In an implementation where the mote-appropriate task is information capture using volume, some process implementations would indicate which motes have temperature capabilities (e.g., volume device 158 as described herein). In an implementation where the mote-appropriate task is information capture using inertial measures, some process implementations would indicate which motes have inertial capabilities (e.g., inertial device 160 as described herein). Those skilled in the art will appreciate that similar results would hold true for other types of information capture consonant with the teachings set forth herein.

Figure 30:
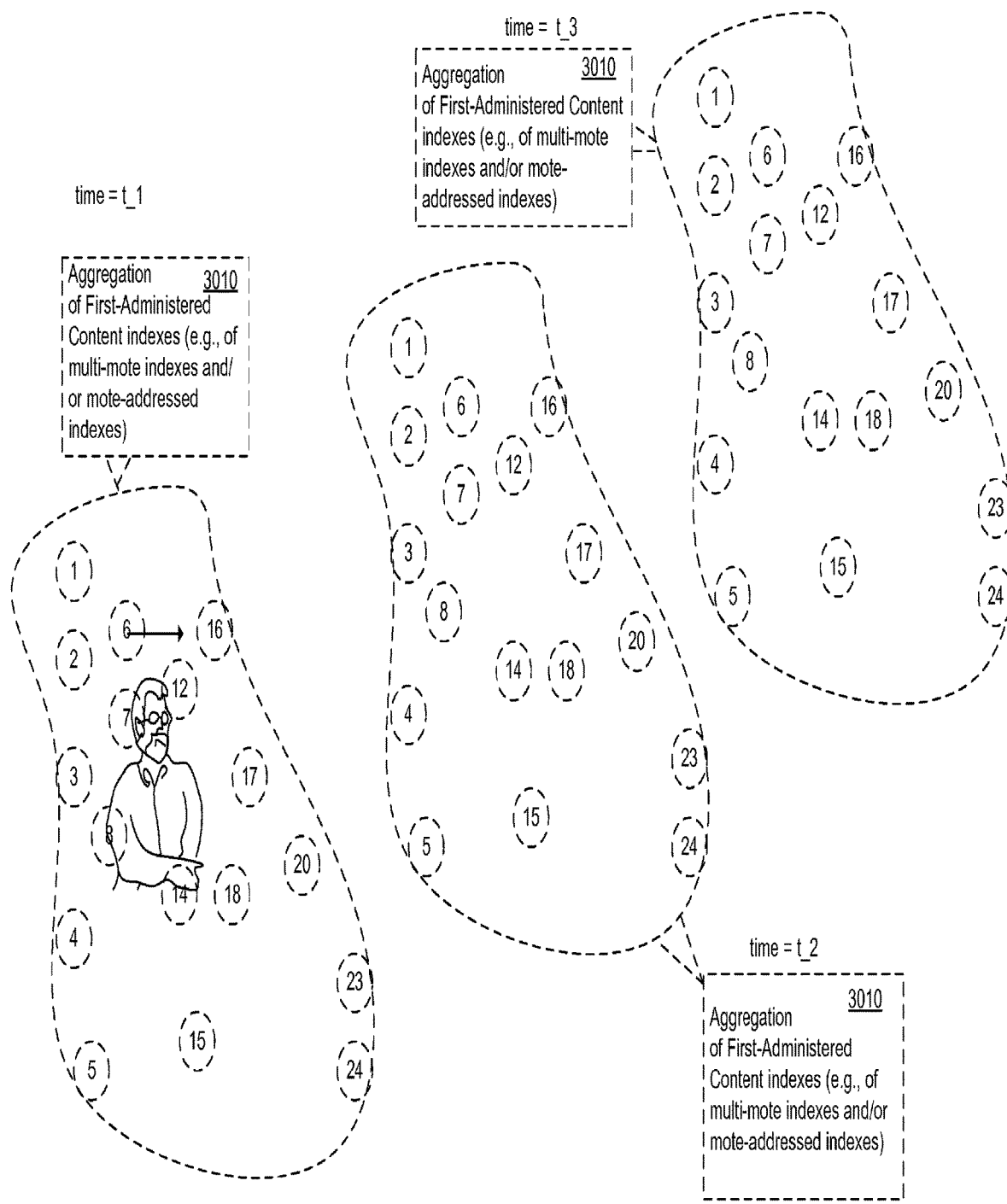
FIG. 30 shows time-stamped versions of subset 3010 of aggregation 910 of first-administered content indexes associated with the state of first-administered set 800 of motes, where subset 3010 represents motes indicated as appropriate to the input defining the mote-appropriate network task (e.g., image capture in infrared).

Referring now to FIG. 30 shown are time-stamped versions of subset 3010 of aggregation 910 of first-administered content indexes associated with the state of first-administered set 800 of motes, where subset 3010 represents motes indicated as appropriate to the input defining the mote-appropriate network task (e.g., image capture in infrared). Those skilled in the art will appreciate that subset 3010 is shown containing less than all the motes of aggregation 910, as will often be the case, since typically not all motes will have capabilities appropriate to the defined mote-appropriate network task; however, in some instances subset 3010 will contain all motes of aggregation 910. The left-lower portion of FIG. 30 depicts subset 3010 of aggregation 910 of first-administered content indexes at time=t_1 and indicates those motes that have capabilities appropriate to the defined mote-appropriate network task (e.g., are capable of detecting an infrared image of the person transiting wall 1200 at time=t_1). The middle-most portion of FIG. 30 illustrates subset 3010 of aggregation 910 of first-administered content indexes at time=t_2 and indicates those motes that have capabilities appropriate to the defined mote-appropriate network task (e.g., are capable of detecting an infrared image of the person transiting wall 1200 at time=t_2). The upper right portion of FIG. 30 shows subset 3010 of aggregation 910 of first-administered content indexes at time=t_3 and indicates those motes that have capabilities appropriate to the defined mote-appropriate network task (e.g., are capable of detecting an infrared image of the person transiting wall 1200 at time=t_3). Those having skill in the art will appreciate that in practice subset 3010 of aggregation 910 of first-administered content logs will generally be in the form of nested data structures and that the pictographic representations of how the person would be detected in FIG. 30 are used herein for sake of clarity. Those skilled in the art will also recognize that, in many instances, the number and/or locations of motes in subset 3010 will vary over time (e.g., not all infrared sensors might be available/active at all times), even though subset 3010 is shown as containing the same motes at times t_1, t_2, and t_3 for sake of clarity.

Figure 31:
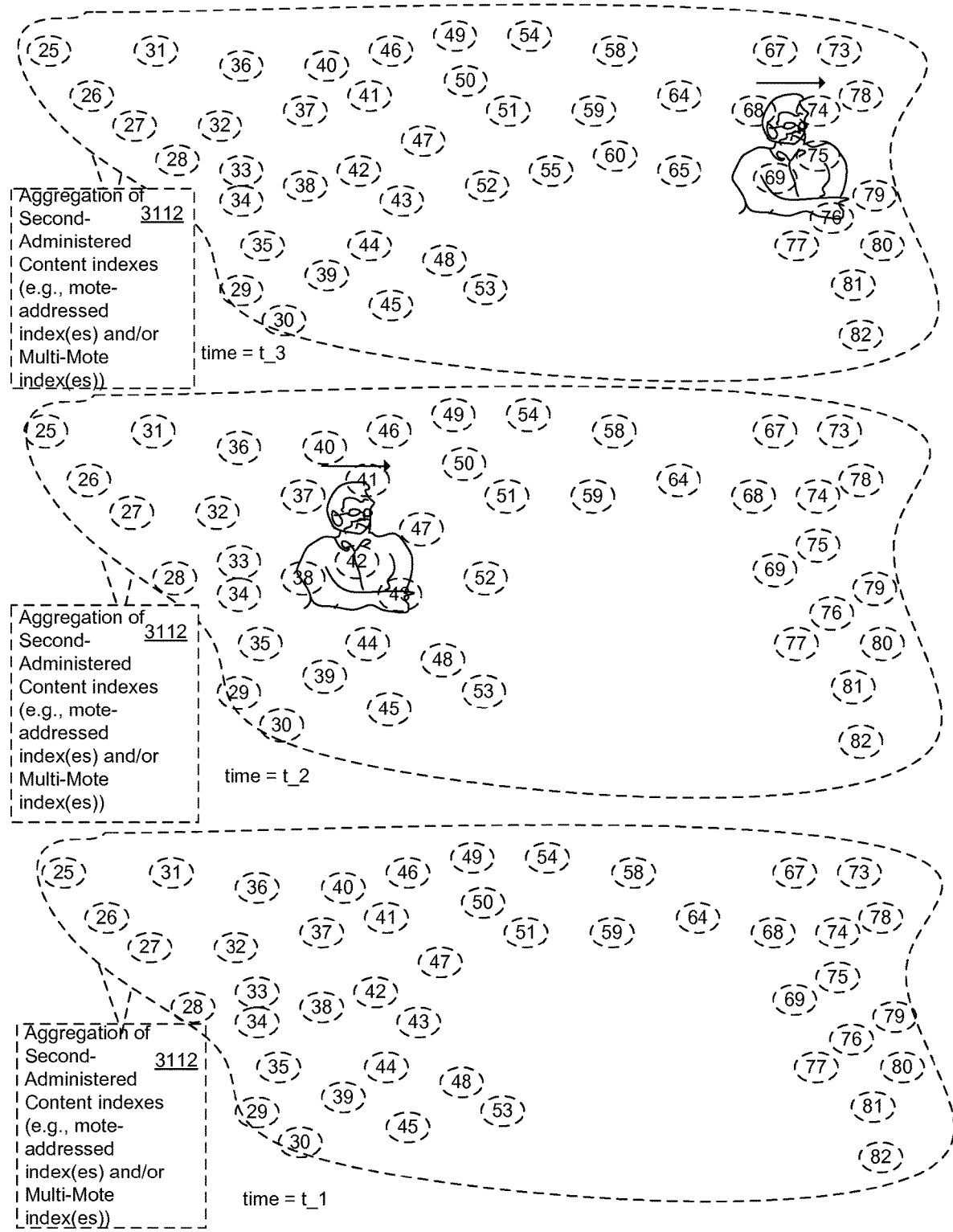
FIG. 31 depicts time-stamped versions of subset 3112 of aggregation 912 of second-administered content logs associated with the state of second-administered set 802 of motes, where subset 3112 represents motes indicated as appropriate to the input defining the mote-appropriate network task (e.g., image capture in infrared).

With reference now to FIG. 31, depicted are time-stamped versions of subset 3112 of aggregation 912 of second-administered content logs associated with the state of second-administered set 802 of motes, where subset 3112 represents motes indicated as appropriate to the input defining the mote-appropriate network task (e.g., image capture in infrared). Those skilled in the art will appreciate that subset 3112 is shown containing less than all the motes of aggregation 912, as will often be the case, since typically not all motes will have capabilities appropriate to the input-defined mote-appropriate network task; however, in some instances subset 3112 will contain all motes of aggregation 912. The left portion of FIG. 31 depicts subset 3112 of aggregation 912 of second-administered content indexes at time=t_1 and indicates those motes that have capabilities appropriate to the defined mote-appropriate network task (e.g., are capable of detecting an infrared image of the person transiting wall 1200 at time=t_1. The middle portion of FIG. 31 illustrates subset 3112 of aggregation 912 of second-administered content indexes at time=t_2 and indicates those motes that have capabilities appropriate to the defined mote-appropriate network task (e.g., are capable of detecting an infrared image of the person transiting wall 1200 at time=t_2. The upper portion of FIG. 31 shows subset 3112 aggregation 912 of second-administered content indexes at time=t_3 and indicates those motes that have capabilities appropriate to the defined mote-appropriate network task (e.g., are capable of detecting an infrared image of the person transiting wall 1200 at time=t_3. Those having skill in the art will appreciate that in practice subset 3112 aggregation 912 of second-administered content indexes will generally be in the form of nested data structures and that the pictographic representations of how the person would be detected in FIG. 31 are used herein for sake of clarity.

Referring now to FIG. 30 and FIG. 31, note that when the person is within the bounds of first-administered set 800 of motes—at time=t_1—the person does not "appear" in the content indexes representing subset 3112 of second-administered set 802 of motes (e.g., indexes of aggregation 912 of second-administered content indexes). Note also that when the person is within the bounds of second-administered set 802 of motes at times t_2 and t_3, the person does not "appear" in the content indexes representing subset 3010 of first-administered set 800 of motes (e.g., indexes of aggregation 910 of first-administered content indexes). Those having skill in the art will appreciate that this is indicative of reduced power and/or other reduced resource consumption. More specifically, in some implementations such as those described, since process allows knowledge of capabilities at various times, index searching and/or mote activation routines can avoid searching and/or communicating with those indexes and/or motes that are not available at times in question. Thus, one advantage of the techniques described herein is that they allow use of mote networks to track large and/or dense subject matter domains with less resource utilization (e.g., less power consumption such as that associated with less transmission, less reception, and/or less searching).

Figure 32:
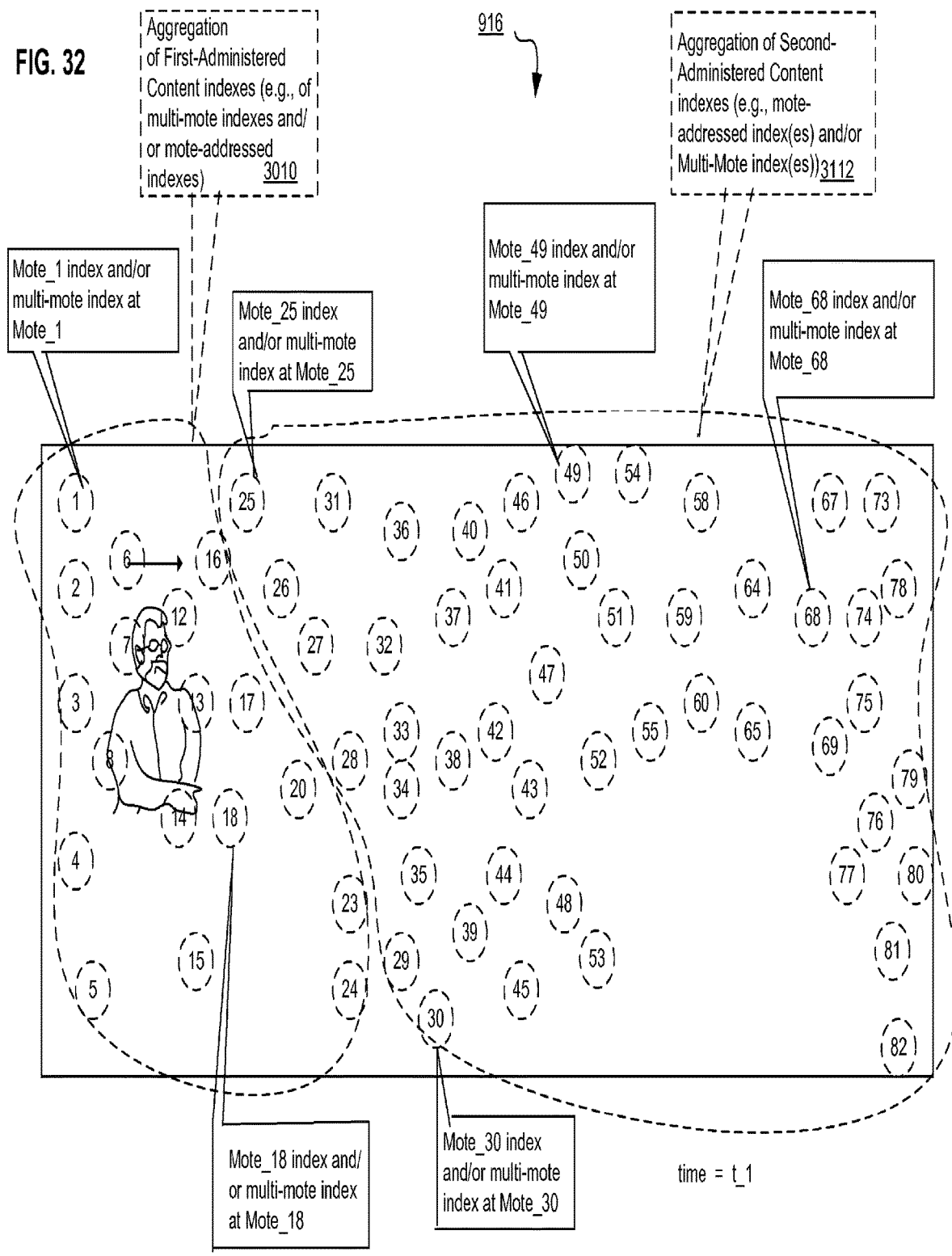
FIGS. 32, 33, and 34, illustrate different versions of federated content index 916 drawn on subset 3010 of first-administered set 800 of motes and subset 3112 of second-administered set 802 of motes.
Figure 33:
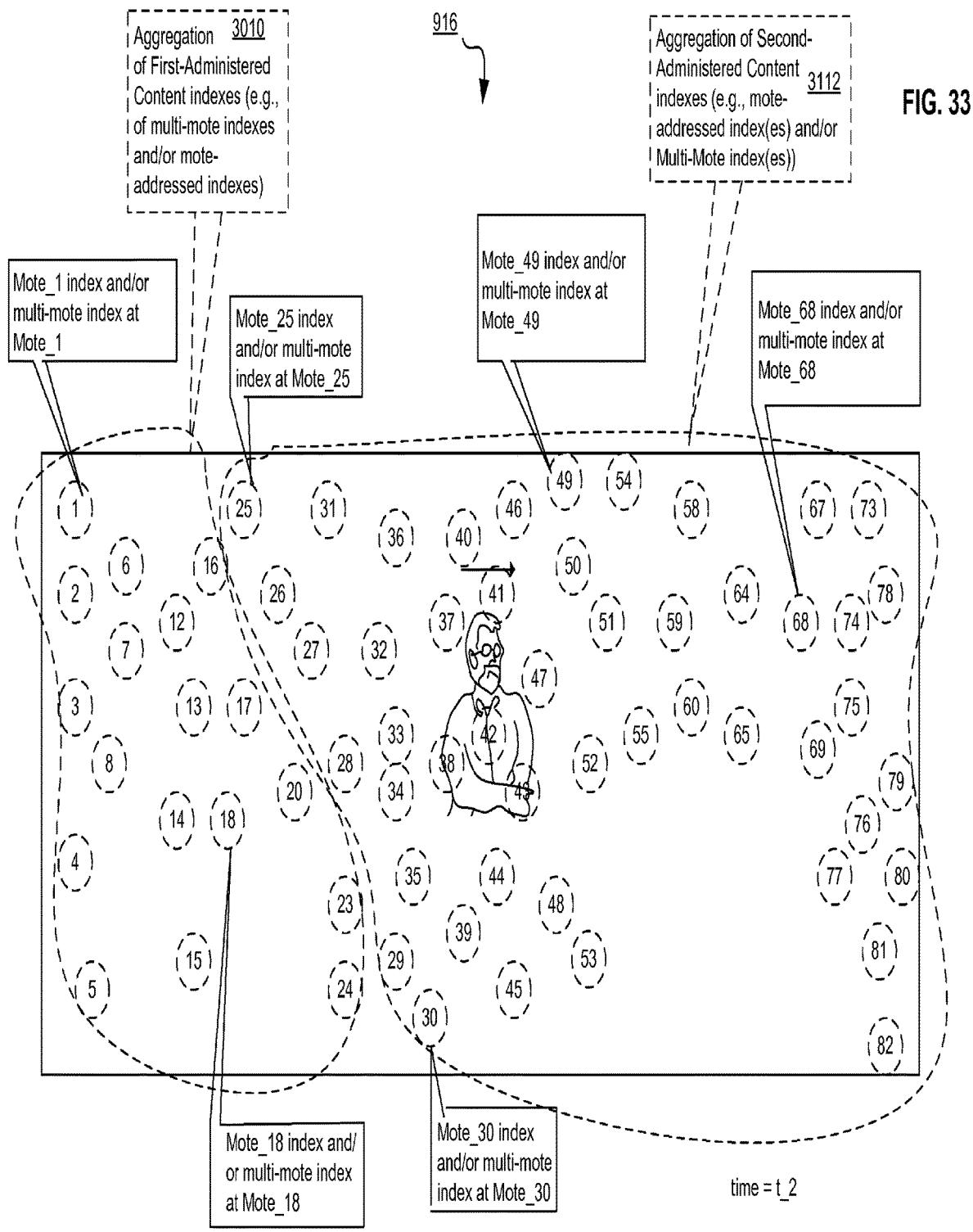
Figure 34:
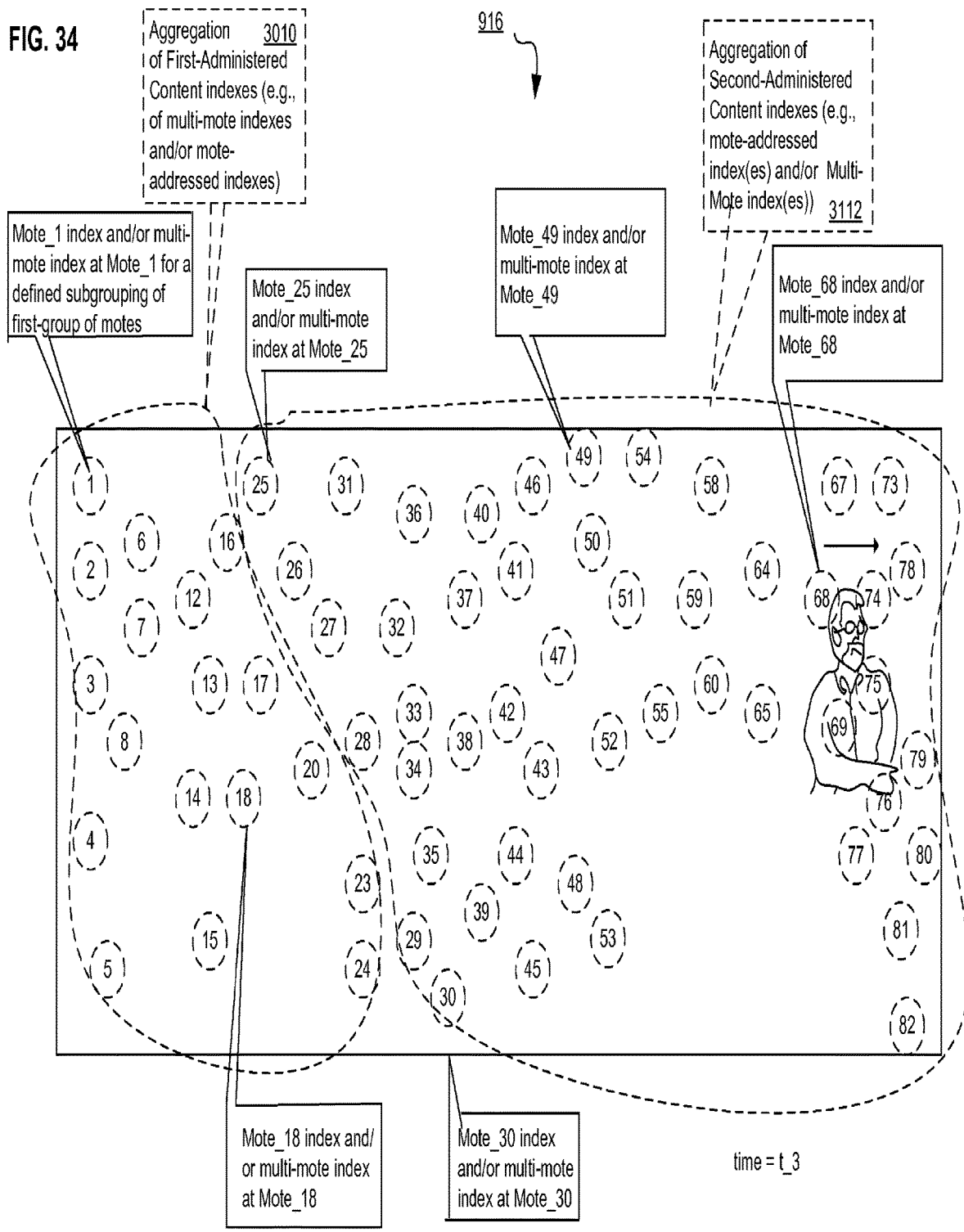

With reference now to FIGS. 32, 33, and 34, illustrated are different versions of federated content index 916 drawn on subset 3010 of first-administered set 800 of motes and subset 3112 of second-administered set 802 of motes. With reference now to FIG. 32, and assuming for sake of illustration that the input-defined mote-appropriate task is infrared image detection, depicted is federated content index 916 at time=t_1 that shows those motes that are capable of detecting an infrared image of the person transiting wall 1200 at time=t_1. Federated content index 916 at time=t_1 is shown composed of subset 3010 of aggregation 910 of first-administered content indexes at time=t_1 (FIG. 30) and subset 3112 of aggregation 912 of second-administered content indexes at time=t_1 (FIG. 31). Referring now to FIG. 33, depicted is federated content index 916 at time=t_2 that shows those motes that are capable of detecting an infrared image of the person transiting wall 1200 at time=t_2. Federated content index 916 at time=t_2 is shown composed of subset 3010 of aggregation 910 of first-administered content indexes at time=t_2 (FIG. 30) and subset 3112 of aggregation 912 of second-administered content indexes at time=t_2 (FIG. 31). Referring now to FIG. 33, depicted is federated content index 916 at time at time=t_3 that shows those motes that are capable of detecting an infrared image of the person transiting wall 1200 at time=t_3. Federated content index 916 at time=t_3 is shown composed of subset 3010 of aggregation 910 of first-administered content indexes at time=t_3 (FIG. 30) and subset 3112 of aggregation 912 of second-administered content indexes at time_t3 (FIG. 31). Those having skill in the art will appreciate that in practice federated content index 916 will generally be in the form of nested data structures and that the pictographic representations of how the person would "appear" in FIGS. 32, 33, and 34 are used herein for sake of clarity.

As described elsewhere herein, motes can include any number of devices whose capabilities can be captured in content indexes (e.g., federated content index 916).

Accordingly, federated content index 916 allows flexible and powerful searching techniques, a few of which will now be described.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 35:
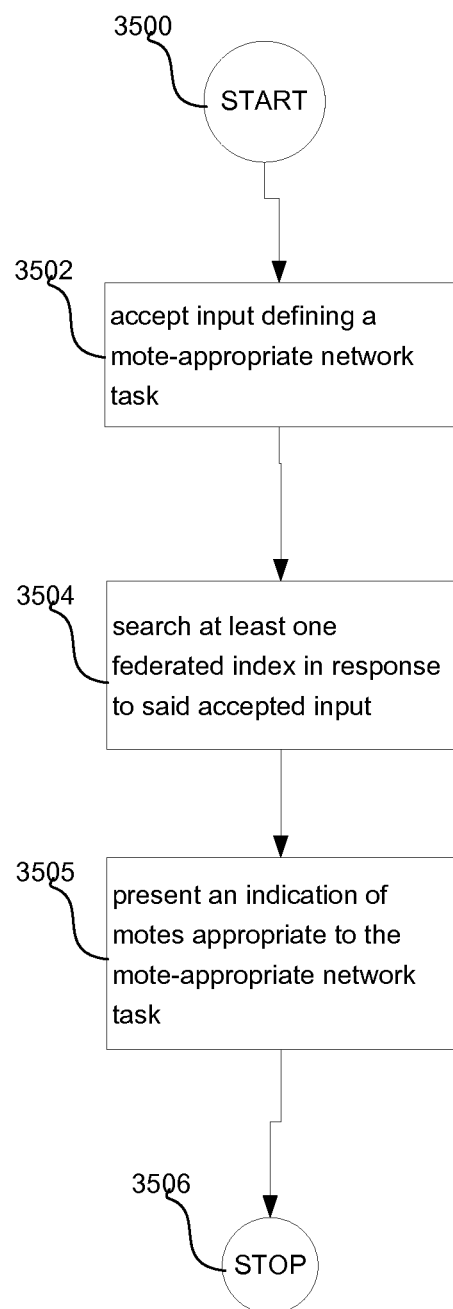
FIG. 35 depicts a high-level logic flowchart of a process.

Referring now to FIG. 35, depicted is a high-level logic flowchart of a process.

Method step 3500 shows the start of the process. Method step 3502 depicts accepting input defining a mote-appropriate network task. Method step 3504 depicts searching at least one federated index in response to said accepted input. Method step 3505 illustrates presenting an indication of motes appropriate to the mote-appropriate network task.

Method step 3506 shows the end of the process.

Figure 36:
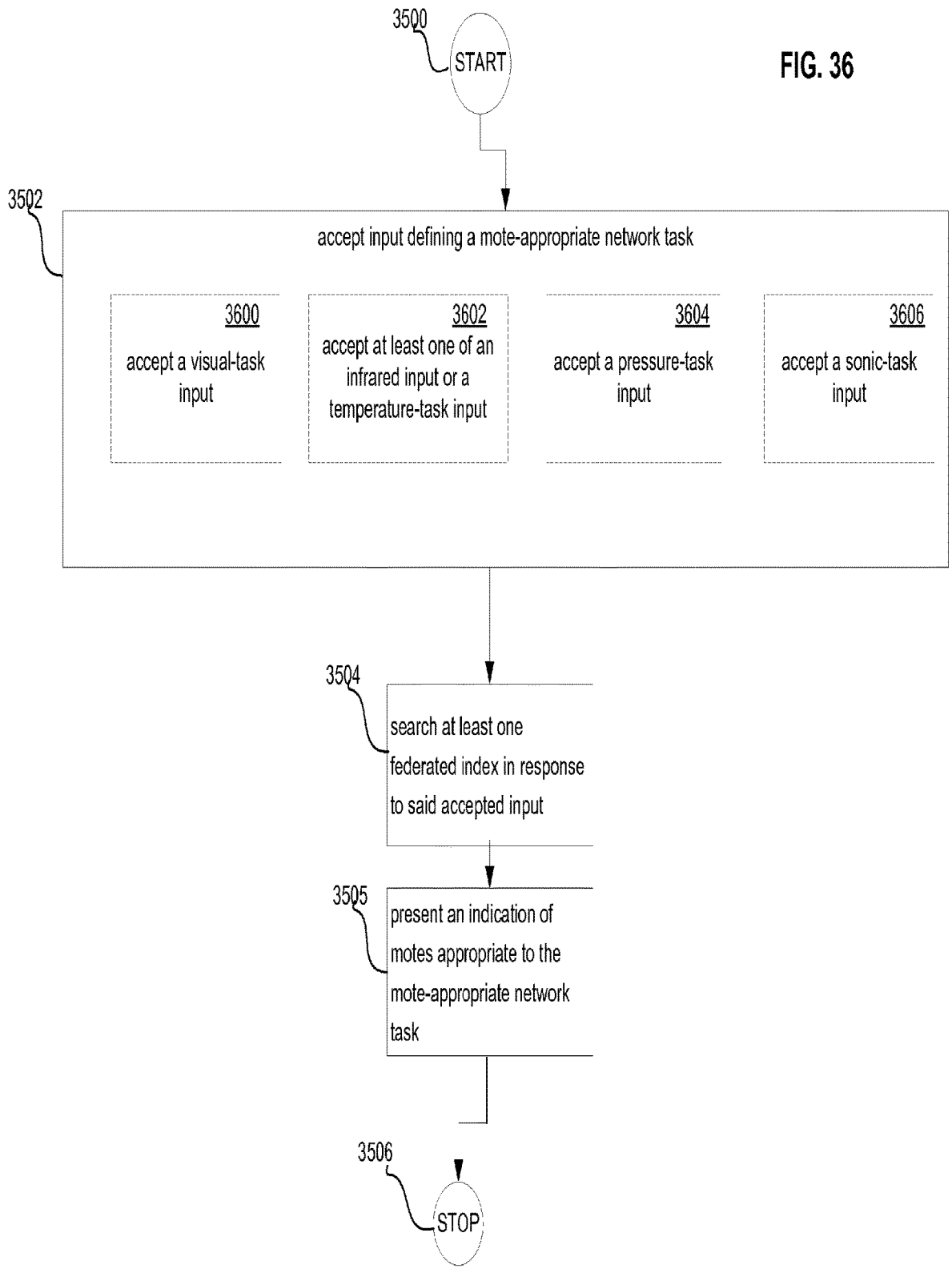
FIG. 36 illustrates a high-level logic flowchart depicting several alternate implementations of the high-level logic flowchart of FIG. 35.

With reference now to FIG. 36, illustrated is a high-level logic flowchart depicting several alternate implementations of the high-level logic flowchart of FIG. 35. Depicted is that in one alternate implementation, method step 3502 includes method step 3600. Method step 3600 shows accepting a visual-task input. In various exemplary implementations, electrical circuitry accepts the visual-task input. In some specific implementations such as those used in security, electrical circuitry (e.g., electrical circuitry configured to provide a graphical user interface (GUI)) accepts a task of searching for a visible-light image (e.g., a task of viewing at least a part of hallway 1200 in visible light). In some implementations such as those used in nursing homes, electrical circuitry (e.g., electrical circuitry configured to provide a graphical user interface (GUI)) accepts a task of searching for a particular shape (e.g., a line drawing of a prone person, such as might appear if a person were to fall onto the motes of floor 1202 of FIG. 12). In other implementations, the visual-task input may be more abstract, such as, for example, a request may be in the form of spatial frequency content, spectral components, or other aspects of a searched for object, event or set of objects.

Continuing to refer to FIG. 36, illustrated is a high-level logic flowchart depicting several alternate implementations of the high-level logic flowchart of FIG. 35. Depicted is that in one alternate implementation, method step 3502 includes method step 3602. Method step 3602 shows accepting at least one of an infrared-task input or a temperature-task input. In various exemplary implementations, electrical circuitry accepts the at least one of an infrared-task input or a temperature-task input. In some specific implementations such as those used in fire detection, electrical circuitry (e.g., electrical circuitry configured to provide a graphical user interface (GUI)) accepts a task of searching for an infrared signature or temperature (e.g., a task of tracking an infrared signature or temperature in a closet of a building indicative of a potential spontaneous combustion). In some implementations such as those used in agriculture, electrical circuitry (e.g., a touch screen of a computer system showing motes superimposed over particular plants or plant groupings) accepts a task of monitoring various plants or groups of plants for either or both an infrared signature or a temperature profile (e.g., such as might be controlled in a greenhouse environment).

With reference now again to FIG. 36, illustrated is a high-level logic flowchart depicting several alternate implementations of the high-level logic flowchart of FIG. 35. Depicted is that in one alternate implementation, method step 3502 includes method step 3604. Method step 3604 shows accepting a pressure-task input. In various exemplary implementations, electrical circuitry accepts the pressure-task input. In some specific implementations such as those used in medicine, electrical circuitry (e.g., electrical circuitry configured to provide a graphical user interface (GUI)) accepts a task of monitoring pressure at any one or more motes proximate to and/or in a patient's body (e.g., task of tracking pressure sensed by one or more motes interior to a cast on a limb of a patient). In some implementations such as those used in fluid systems management, electrical circuitry (e.g., an input panel exterior to a piping system) accepts a task of monitoring pressure (e.g., such as might be a task in applications where a system is to give an alert when motes interior to a piping system indicates that the pressure(s) either exceed or fall below one or more defined pressures (e.g., a lowest acceptable pressure in hydraulic lifting system in industrial equipment)).

With reference now again to FIG. 36, illustrated is a high-level logic flowchart depicting several alternate implementations of the high-level logic flowchart of FIG. 35. Depicted is that in one alternate implementation, method step 3502 includes method step 3606. Method step 3606 shows accepting a sonic-task input. In various exemplary implementations, electrical circuitry accepts the sonic-task input. In some specific implementations such as those used in administration, electrical circuitry (e.g., electrical circuitry configured to convert microphone input to a digital audio file and/or configured to accept digital audio directly) accepts a task of monitoring sonic data (e.g., such as might be the case in an implementation where it might be desired that a system determine whether a particular voice has been heard in hallway 1200 during some defined interval of time. In some implementations such as those used in data processing, electrical circuitry (e.g., electrical circuitry configured to accept digital audio directly) accepts a task of monitoring sonic information (e.g., such as might be a task in applications where a system is to perform an action when a certain sound pattern over time is detected (e.g., where a system is to order installation of new hard drives when a time series of audio indicates that a hard disk failure might be imminent).

Figure 37:
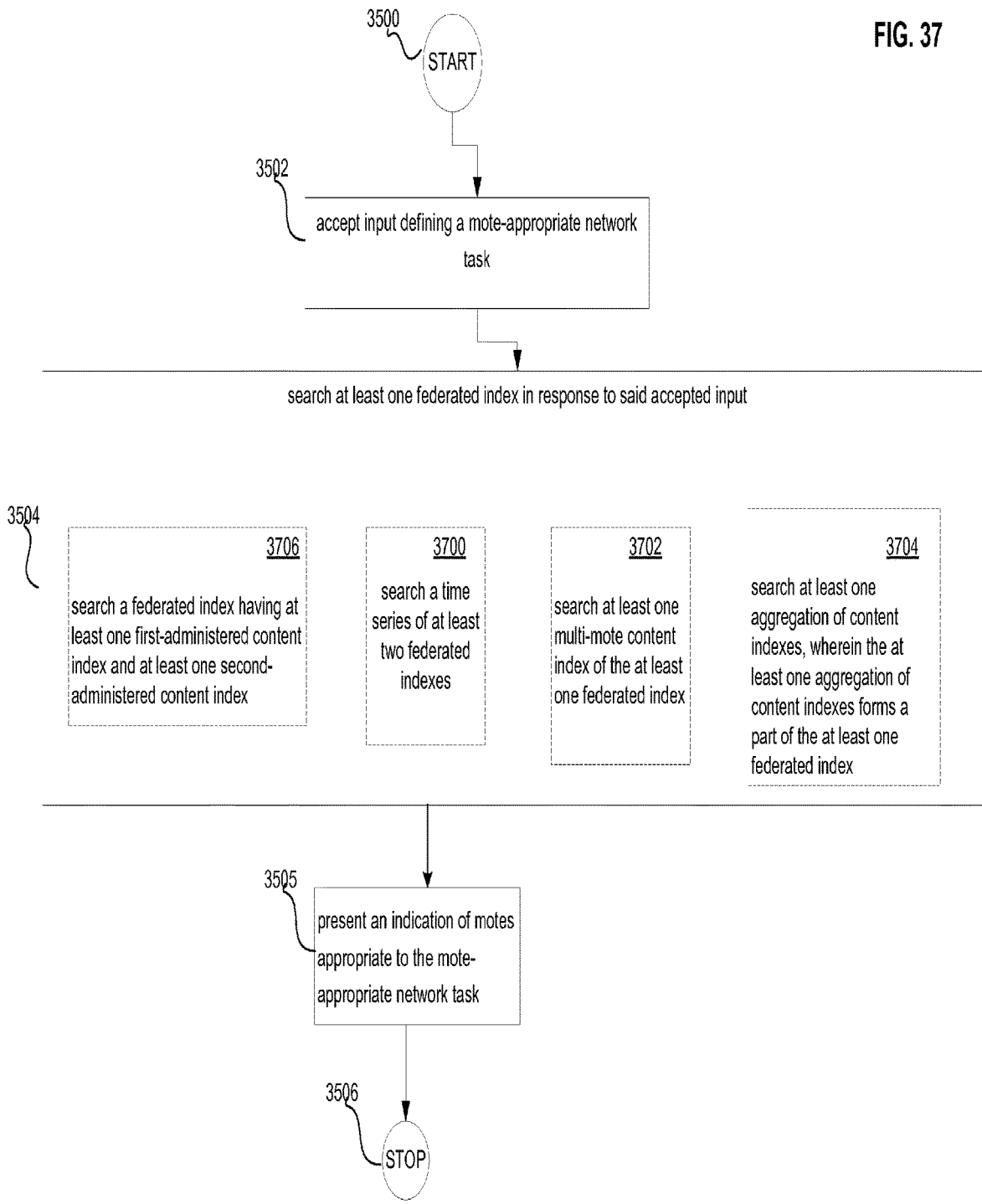
FIG. 37 illustrates a high-level logic flowchart depicting several alternate implementations of the high-level logic flowchart of FIG. 35.

Referring now to FIG. 37, illustrated is a high-level logic flowchart depicting several alternate implementations of the high-level logic flowchart of FIG. 35.

Depicted is that in one alternate implementation, method step 3504 includes method step 3706. Method step 3706 shows searching a federated index having at least one first-administered content index and at least one second-administered content index. In various exemplary implementations, electrical circuitry successively searches the at least one first-administered content index and at least one second-administered content index for motes having capabilities to provide various defined types of information necessary to fulfill the mote-appropriate network task of method step 3502. In some specific implementations such as those used in security, electrical circuitry (e.g., electrical circuitry forming a processor configured by a program to perform various tasks) searches for those motes having image and/or pixel capture capabilities (e.g., searching one or more content indexes of federated content index 916 at time=t_1 (FIG. 32), at time=t_2 (FIG. 33), and at time=t_3 (FIG. 34) for motes capable of tracking a person's progress—in visible light—through the hallway such as shown and/or described in relation to FIGS. 13, 14, and 15). In some implementations such as those used in criminal investigations, electrical circuitry searches for motes having capability(ies) to detect a particular pattern of sound over time (e.g., searching one or more content indexes of federated content index 916 for motes capable of detecting a pattern of sound a gunshot would make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate network task of method step 3502.

Figure 38:
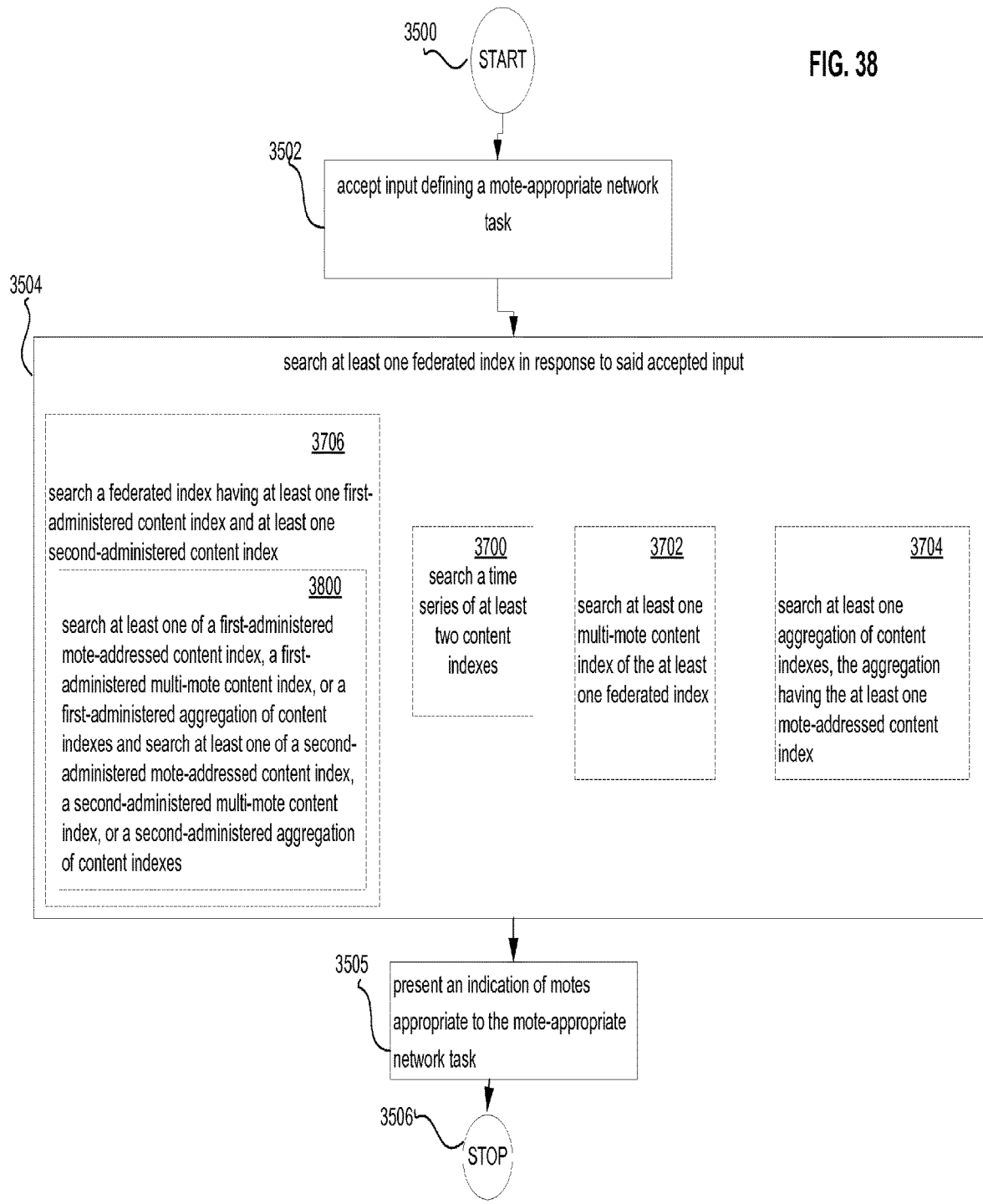
FIG. 38 shows a high-level logic flowchart depicting several alternate implementations of the high-level logic flowchart of FIG. 37.

With reference now to FIG. 38, shown is a high-level logic flowchart depicting several alternate implementations of the high-level logic flowchart of FIG. 37. Depicted is that in one alternate implementation, method step 3706 includes method step 3800.

Method step 3800 illustrates searching at least one of a first-administered mote-addressed content index, a first-administered multi-mote content index, or a first-administered aggregation of content indexes and searching at least one of a second-administered mote-addressed content index, a second-administered multi-mote content index, or a second-administered aggregation of content indexes. In various exemplary implementations, electrical circuitry searches the at least one of a first-administered mote-addressed content index, a first-administered multi-mote content index, or a first-administered aggregation of content indexes and at least one of a second-administered mote-addressed content index, a second-administered multi-mote content index, or a second-administered aggregation of content indexes for various defined types of information. Those skilled in the art will appreciate that many other searches may be performed, dependent upon the accepted input defining the mote-appropriate search of method step 3502.

Continuing to refer to FIG. 37, depicted is a high-level logic flowchart illustrating several alternate implementations of the high-level logic flowchart of FIG. 35. Depicted is that in one alternate implementation, method step 3504 includes method step 3700. Method step 3700 shows searching a time series of at least two federated indexes. In various exemplary implementations, electrical circuitry successively searches a time series of federated indexes for motes capable of gathering various defined types of information related to various specified mote-appropriate network tasks. In some specific implementations such as those used in security, electrical circuitry (e.g., electrical circuitry forming a processor configured by a program to perform various tasks) searches a time series of federated indexes for motes capable of capturing image information in the visible light spectrum (e.g., searching one or more content indexes of federated index 916 at time=t_1 (FIG. 32), federated index 916 at time=t_2 (FIG. 33), and federated index 916 at time=t_3 (FIG. 34) for one or more motes capable of tracking a person's progress through the hallway such as shown and/or described in relation to FIGS. 13,14, and 15). In some implementations such as those used in criminal investigations, electrical circuitry searches a time series of federated indexes for motes having capability(ies) to detect a particular pattern or characteristic of sound over time (e.g., searching the time series for motes capable of detecting a pattern of sound or an acoustic signature a gunshot might make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate task of method step 3502.

Continuing to refer to FIG. 37, illustrated is that in one alternate implementation method step 3504 includes method step 3702. Method step 3702 shows searching at least one multi-mote content index of the at least one federated index. In various exemplary implementations, electrical circuitry searches at least one multi-mote content index of the at least one federated index. In some specific implementations such as those used in security, electrical circuitry searches one or more multi-mote content indexes, over time, in response to the defined mote-appropriate network task (e.g., electrical circuitry searching one or more multi-mote content indexes for indications of motes having capabilities to monitor a patient's heart for sounds indicative of arrhythmia). In some implementations such as those used in aviation maintenance, electrical circuitry searches one or more multi-mote content indexes, over time, in response to a defined mote-appropriate network task (e.g., electrical circuitry searching one or more multi-mote content indexes for motes having capabilities to monitor a defined area of aviation equipment, such as a jet engine, for sounds indicative of motor failure). Those skilled in the art will appreciate that many other searches may be performed, dependent upon the accepted input defining the mote-appropriate network task of method step 3502.

Figure 39:
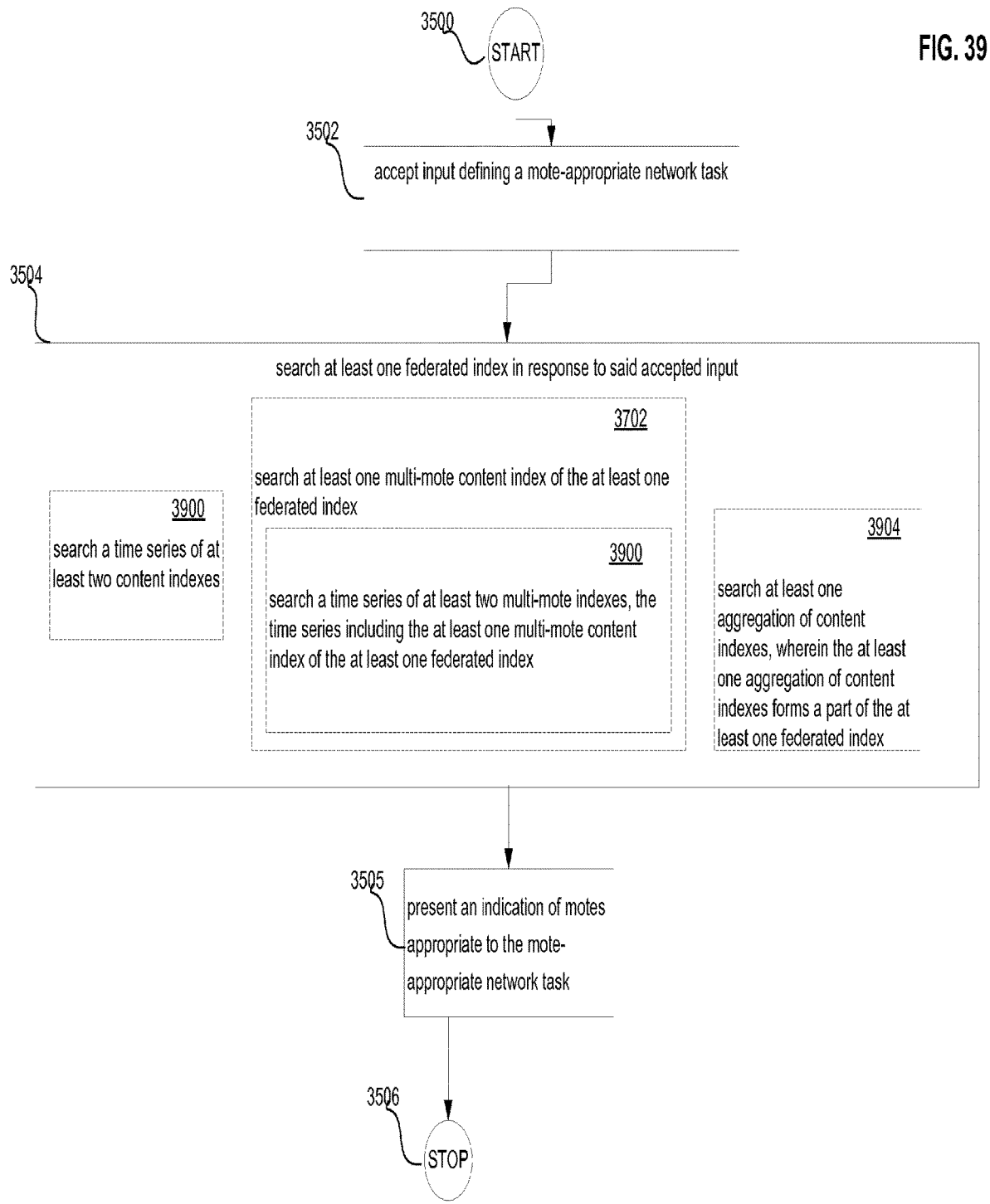
FIG. 39 shows a high-level logic flowchart depicting several alternate implementations of the high-level logic flowchart of FIG. 37.

With reference now to FIG. 39, shown is a high-level logic flowchart depicting several alternate implementations of the high-level logic flowchart of FIG. 37.

Depicted is that in one alternate implementation, method step 3702 includes method step 3900. Method step 3900 shows searching a time series of at least two multi-mote indexes, the time series including the at least one multi-mote content index of the at least one federated index. In various exemplary implementations, electrical circuitry successively searches a time series of at least two multi-mote content indexes for motes capable of gathering various defined types of information appropriate to the mote-appropriate network task. In some specific implementations such as those used in security, electrical circuitry (e.g., electrical circuitry forming a processor configured by a program to perform various tasks) searches a time series including at least one multi-mote content index of the at least one federated index for motes capable of capturing an image in visible light (e.g., searching one or more multi-mote indexes of federated index 916 at time=t_1 (FIG. 32), federated index 916 at time=t_2 (FIG. 33), and federated index 916 at time=t_3 (FIG. 34) in order to identify motes have visible light capabilities appropriate to track a person's progress through the hallway such as shown and/or described in relation to FIGS. 13, 14, and 15). In some implementations such as those used in criminal investigations, electrical circuitry searches a time series of one or more multi-mote content indexes of federated content index 916 for motes capable of identifying a particular pattern or characteristic of sound over time (e.g., searching one or more content indexes of federated content index 916 for motes capable of detecting a pattern of sound or an acoustic signature a gunshot might make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate task of method step 3502.

Referring now again to FIG. 37, depicted is that in one alternate implementation method step 3504 includes method step 3704. Method step 3704 shows searching at least one aggregation of content indexes, wherein the at least one aggregation of content indexes forms a part of the at least one federated index. In various exemplary implementations, electrical circuitry searches the at least one aggregation of content indexes, wherein the at least one aggregation of content indexes forms a part of the at least one federated index. In some specific implementations such as those used in security, electrical circuitry (e.g., electrical circuitry forming a processor configured by a program to perform various tasks) searches at least one aggregation of content indexes forming a part of the at least one federated index for motes capable of capturing an image in the visible light spectrum (e.g., searching one or more aggregations of content indexes forming a part of federated index 916 of content indexes at time=t_1 (FIG. 32) for one or more motes capable of determining if a person was in front of wall 1200 at some time=t_1 as shown and/or described in relation to FIG. 13). In some implementations such as those used in criminal investigations, electrical circuitry searches at least one aggregation of content indexes forming a part of the at least one federated index for motes having capability(ies) to detect a particular sound at a particular time (e.g., having capabilities to detect a certain sound frequency at time=t_1 (FIG. 32)). Those skilled in the art will appreciate that many other searches may be performed, dependent upon the accepted input defining the mote-appropriate task of method step 3502.

Figure 40:
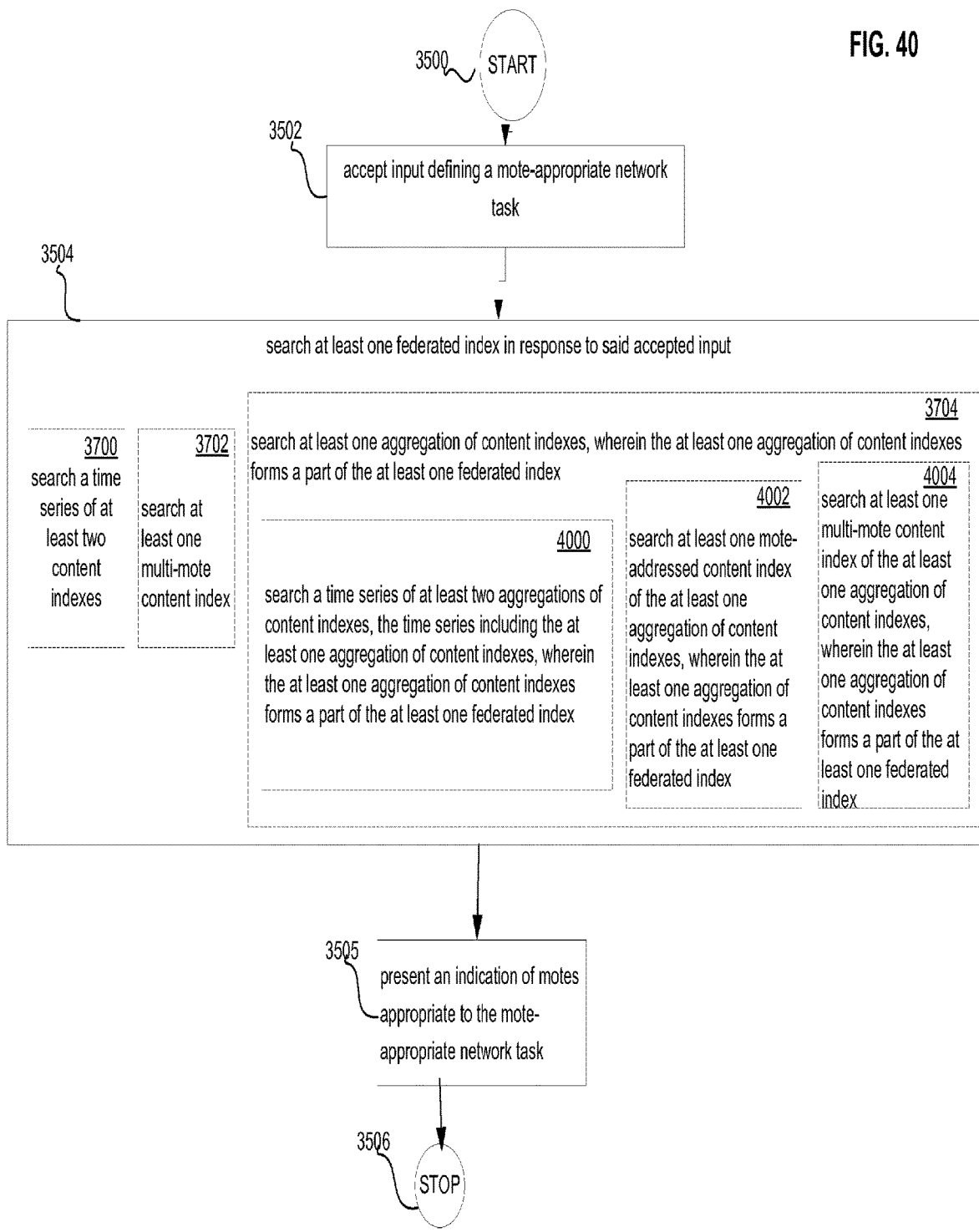
FIG. 40 shows a high-level logic flowchart depicting several alternate implementations of the high-level logic flowchart of FIG. 37.

With reference now to FIG. 40, shown is a high-level logic flowchart depicting several alternate implementations of the high-level logic flowchart of FIG. 37.

Depicted is that in one alternate implementation, method step 3704 includes method step 4000. Method step 4000 illustrates searching a time series of at least two aggregations of content indexes, the time series including the at least one aggregation of content indexes, wherein the at least one aggregation of content indexes forms a part of the at least one federated index. In various exemplary implementations, electrical circuitry searches the at least two aggregations of content indexes, the time series including the at least one aggregation of content indexes, wherein the at least one aggregation of content indexes forms a part of the at least one federated index. In some specific implementations such as those used in security, electrical circuitry (e.g., electrical circuitry forming a processor configured by a program to perform various tasks) searches for motes capable of capturing an image in the visible light spectrum (e.g., searching aggregations of indexes of federated index 916 at time=t_1 (FIG. 32), federated index 916 at time=t_2 (FIG. 33), and federated index 916 at time=t_3 (FIG. 34) for motes capable of tracking a person's progress through the hallway such as shown and/or described in relation to FIGS. 13, 14, and 15). In some implementations such as those used in criminal investigations, electrical circuitry searches the aggregations for motes having capability(ies) to detect a particular pattern of sound over time (e.g., capable of detecting the sound a gunshot would make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate task of method step 3502.

Continuing to refer to FIG. 40, depicted is that in one alternate implementation, method step 3704 includes method step 4002. Method step 4002 illustrates searching at least one mote-addressed content index of the at least one aggregation of content indexes, wherein the at least one aggregation of content indexes forms a part of the at least one federated index. In various exemplary implementations, electrical circuitry is used to effect the searching of at least one mote-addressed content index of the at least one aggregation of content indexes, wherein the at least one aggregation of content indexes forms a part of the at least one federated index. Those skilled in the art will appreciate that many other searches may be performed, dependent upon the accepted input defining the mote-appropriate task of method step 3502.

Continuing to refer to FIG. 40, depicted is that in one alternate implementation, method step 3704 includes method step 4004. Method step 4004 illustrates searching at least one multi-mote content index of the at least one aggregation of content indexes, wherein the at least one aggregation of content indexes forms a part of the at least one federated index. In various exemplary implementations, electrical circuitry is used to effect the searching at least one multi-mote content index of the at least one aggregation of content indexes. Those skilled in the art will appreciate that many other searches may be performed, dependent upon the accepted input defining the mote-appropriate search of method step 3502.

With reference now again to FIG. 41, illustrated is a high-level logic flowchart depicting several alternate implementations of the high-level logic flowchart of FIG. 35. Depicted is that in one alternate implementation, method step 3505 includes method step 4100. Method step 4100 shows transmitting the indication of motes appropriate to the mote-appropriate network task to electrical circuitry configurable to utilize the indication of motes appropriate to the mote-appropriate network task. In various exemplary implementations, the electrical circuitry is configured as incorporated by reference herein to use the accepted mote-appropriate network task input. In some specific implementations such as those used in administration, electrical circuitry (e.g., electrical circuitry configured by a computer program) uses the indication of motes appropriate to the mote-appropriate network task to determine from what motes various content logs (e.g., mote addressed mote logs, aggregations of mote logs, and or federations of mote logs) are to be constructed; that is, in some implementations, since the motes appropriate to the task are known, logging of the actual information produced by those known capabilities can be scheduled (e.g., as in prospective applications), performed (e.g., as in real-time applications), or searched (e.g. as in retrospective applications). For example, when a visual light image search is specified, the circuitry logs data from the motes listed in the indication of motes appropriate to the mote-appropriate network task (e.g., as appropriate to the visual light image search). In one specific implementation, the electrical circuitry is a processor configurable by a computer program to utilize the indication of motes appropriate to the mote-appropriate network task. Those skilled in the art will understand, though, that in many implementations the electrical circuitry constitutes various combinations of hardware, firmware, and/or software as described elsewhere herein.

Figure 41:
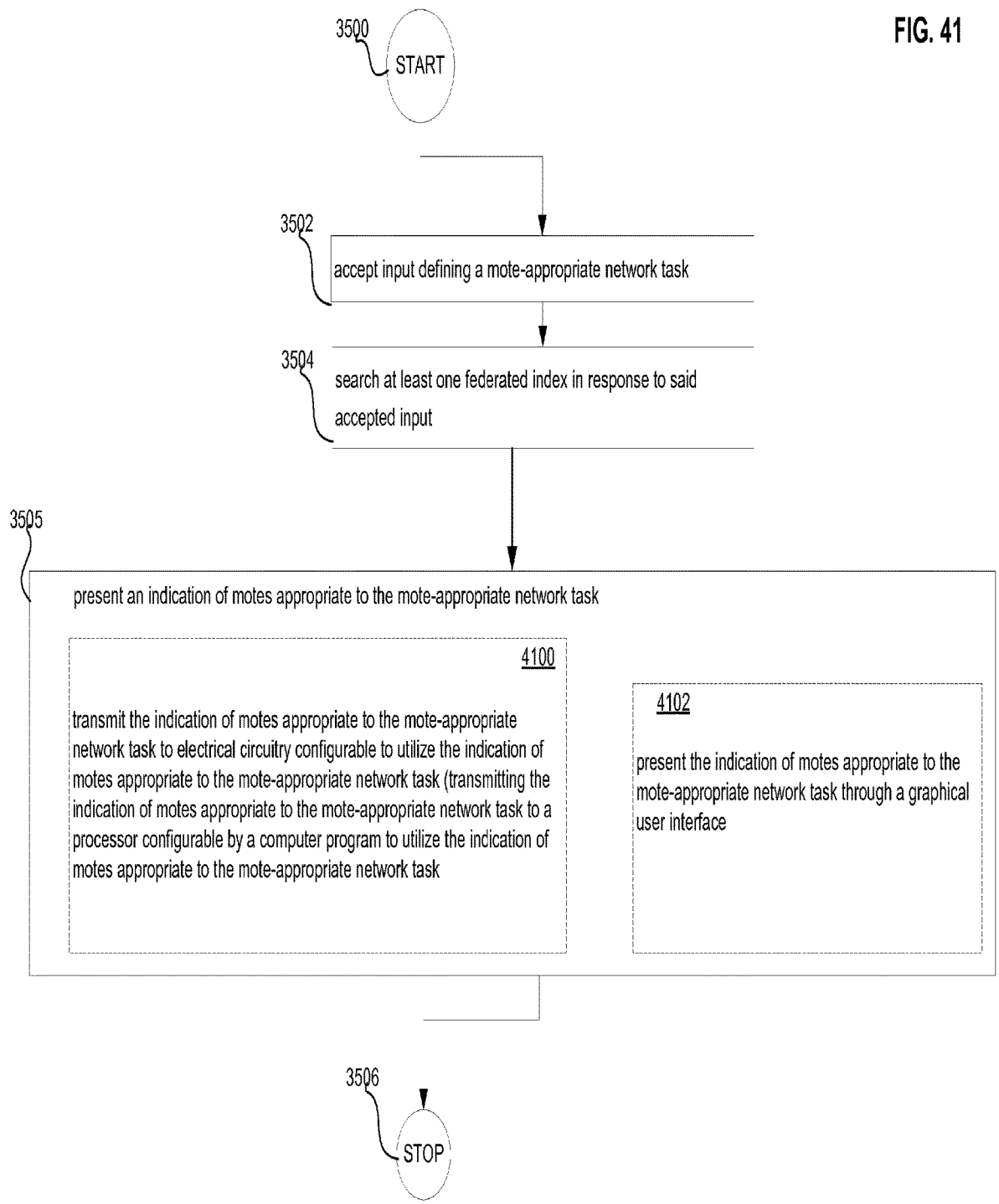
FIG. 41 illustrates a high-level logic flowchart depicting several alternate implementations of the high-level logic flowchart of FIG. 35.

Continuing to refer to FIG. 41, illustrated is a high-level logic flowchart depicting several alternate implementations of the high-level logic flowchart of FIG. 35. Depicted is that in one alternate implementation, method step 3505 includes method step 4102. Method step 4102 shows transmitting the indication of motes appropriate to the mote-appropriate network task to electrical circuitry configurable to utilize the indication of motes appropriate to the mote-appropriate network task. In various exemplary implementations, the indication of motes appropriate to the mote-appropriate network task is presented through a graphical user interface of a data processing system. For example, as might be the case in an implementation where a user has queried the data processing system to show the geographic locations of motes having certain task-appropriate capabilities to determine from what motes various content logs (e.g., mote addressed mote logs, aggregations of mote logs, and or federations of mote logs) are to be constructed. For example, when a visual light image search is specified, the circuitry logs data from the motes listed in the indication of motes appropriate to the mote-appropriate network task as having capabilities appropriate to a visual image search. In one specific implementation, the electrical circuitry is a processor configurable by a computer program to utilize the indication of motes appropriate to the mote-appropriate network task. Those skilled in the art will understand, though, that in many implementations the electrical circuitry constitute various combinations of hardware, firmware, and/or software as described elsewhere herein.

Those skilled in the art will appreciate that in some implementations, the searching described in relation to various processes herein (e.g., such as those shown/described in relation to FIGS. 35-41) is performed on mote-addressed content indexes, multi-mote content indexes, and/or aggregations of content indexes loaded to computer systems external to a mote-appropriate network. For example, as shown/described in relation to gateway 704, which can include, for example, one or more of a notebook computer system, minicomputer system, server computer system, and/or a mainframe computer system. Those skilled in the art will also appreciate that in other implementations the searching described in relation to various processes herein (e.g., such as those shown/described in relation to FIGS. 35-41) is performed in whole or in part at motes of a mote-appropriate network. Those skilled in the art will also recognize that the approaches described herein are not limited to accepting an input of a single kind and that the searching may be refined using a combination of inputs, such as a visual definition input combined with a sonic definition input. When combined, the searching logic may correlate the processes temporally or the searches may be combined independently of relative time references. Those skilled in the art will also appreciate that in other implementations the searching described in relation to various processes herein (e.g., such as those shown/described in relation to FIGS. 35-41) is performed in other computer systems consistent with the teachings herein.

VIII. Mote Networks Using Directional Antenna Techniques

A. Device(s) and/or System(s)

Figure 42:
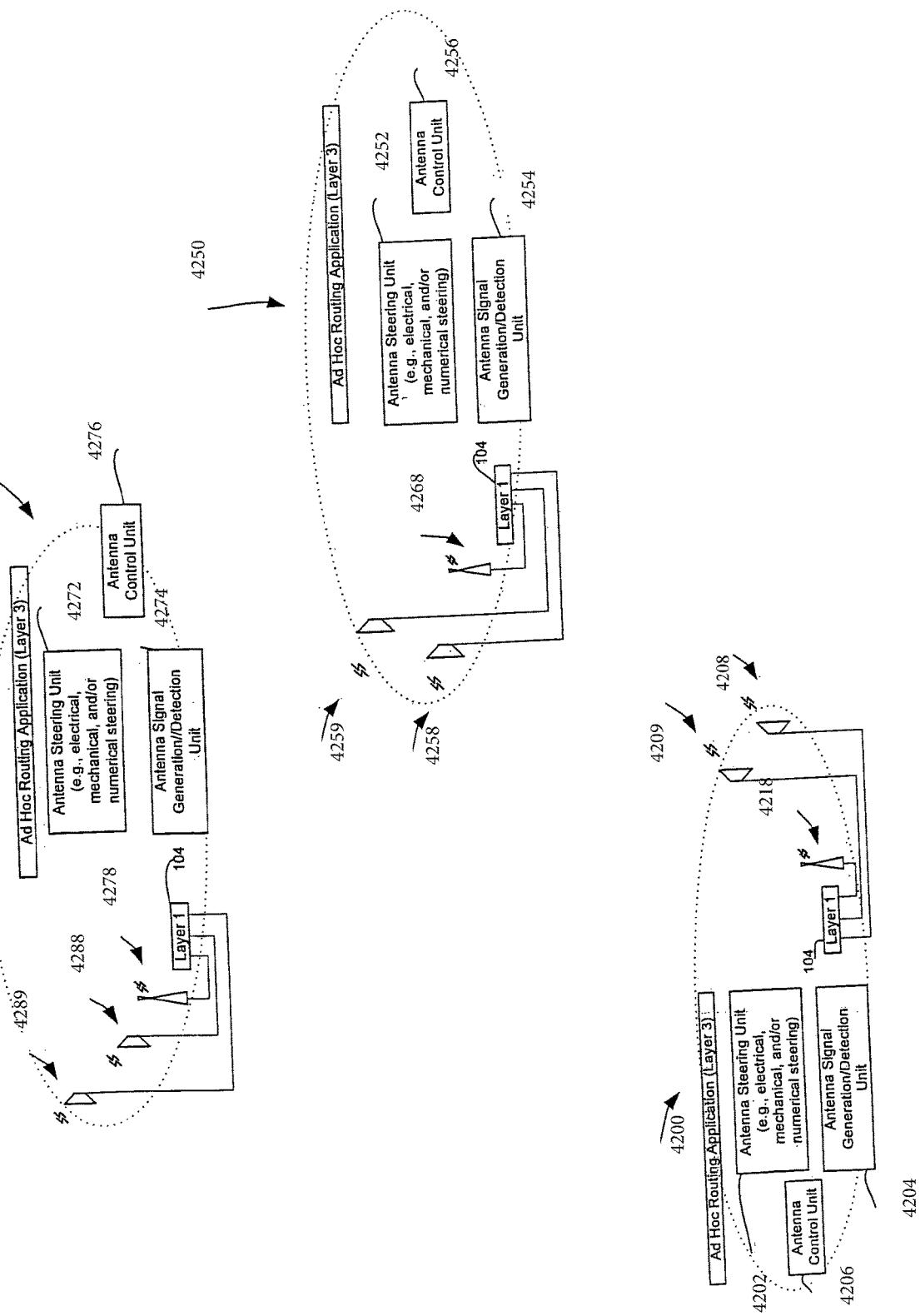
FIG. 42 depicts partial exploded views of motes 4200, 4250, and 4270 that form a part of a mote network.

Referring now to FIG. 42, depicted are partial exploded views of motes 4200, 4250, and 4270 that form a part of a mote network. Mote 4200 is illustrated as similar to mote 100 of mote appropriate network 150 (FIG. 1), but with the addition of antenna steering unit 4202, antenna signal detection/generation unit 4204 ("direction/generation" indicates unit 4204 may perform either or both detection and generation), antenna control unit 4206, omni-directional antenna 4218, and directional antennas 4208, 4209; the other components of mote 100 are also present in mote 4200, but not explicitly shown for sake of clarity. The directional antennas described herein may be any suitable directional antennas consistent with the teachings herein, such as beam-forming antennas, beam-steering antennas, switched-beam antennas, horn antennas, and/or adaptive antennas. Although directional antennas 4208, 4209 are illustrated as horn antennas, those skilled in the art will appreciate that directional antennas 4208, 4209 are representative of any suitable device consistent with the teachings herein, such as Yagi antennas, log-periodic antennas, parabolic antennas, array antennas, horn antennas, and/or biconical antennas. The foregoing is also generally true for other directional antennas described herein. In addition, the inventor points out that in some implementations the antenna steering units described herein may include electromechanical systems such as those having piezoelectric components and/or those having micro-electro-mechanical system components; in some implementations, the antenna steering units may include electromagnetic systems.

Mote 4250 is illustrated as similar to mote 100 of mote appropriate network 150 (FIG. 1), but with the addition of antenna steering unit 4252, antenna signal generation/detection unit 4254, antenna control unit 4256, omnidirectional antenna 4268, and directional antennas 4258, 4259. The other components of mote 100 are also present in mote 4250, but not explicitly shown for sake of clarity. The components of mote 4250 function in fashions similar to like components described in relation to mote 4200 and/or elsewhere herein.

Mote 4270 is illustrated as similar to mote 100 of mote appropriate network 150 (FIG. 1), but with the addition of antenna steering unit 4252, antenna signal generation/detection unit 4274, antenna control unit 4276, omnidirectional antenna 4278, and directional antennas 4288, 4289. The other components of mote 100 are also present in mote 4270, but not explicitly shown for sake of clarity. The components of mote 4270 function in fashions similar to like components described in relation to mote 4200 and/or elsewhere herein.

Those skilled in the art will appreciate that there are various ways in which the directional antennas may be combined with the motes. In some implementations, semiconductor processing techniques are utilized to form at least a part of each mote having one or more directional antennas. In some implementations, micro-electro-mechanical-system or electrooptical techniques are utilized to form or control at least a part of each mote having one or more directional antennas. In some implementations, circuit techniques and circuit board substrates are used to form at least a part of each mote having one or more directional antennas. In some implementations, various combinations of the herein described techniques are used to form at least a part of each mote having one or more directional antennas.

B. Process(es) and/or Scheme(s)

Figure 43:
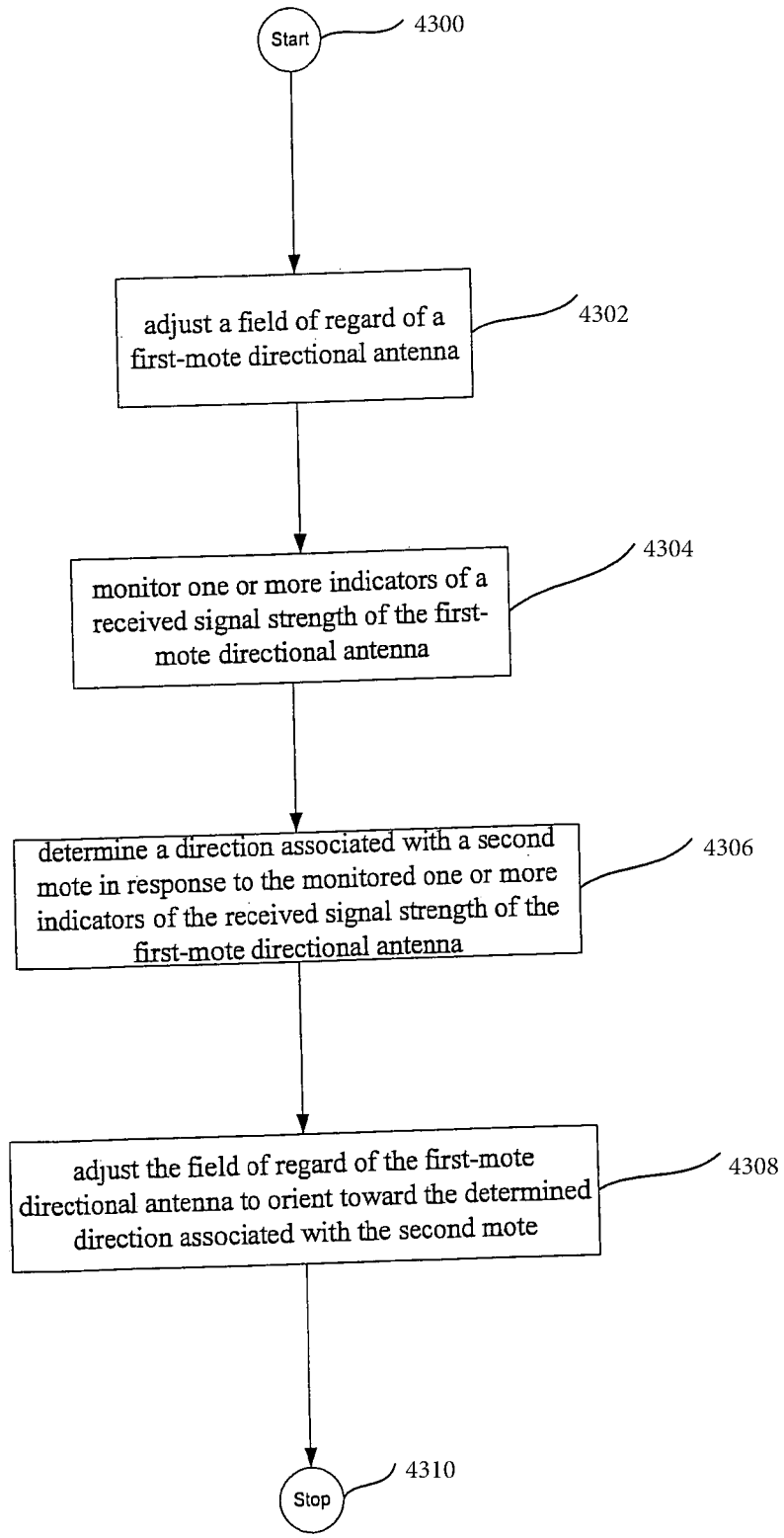
FIG. 43 depicts a high-level logic flowchart of a process.

With reference now to FIG. 43, depicted is a high level logic flowchart of a process. Method step 4300 shows the start of the process. Method step 4302 depicts adjusting a field of regard of a first-mote directional antenna. Method step 4304 illustrates monitoring one or more indicators of received signal strength, signal-to-noise ratio, or other signal characteristic, of the first-mote directional antenna. Method step 4306 shows determining a direction associated with a second mote in response to the monitored one or more indicators of the received signal strength of the first-mote directional antenna. Method step 4308 depicts adjusting the field of regard of the first-mote directional antenna to orient toward the determined direction associated with the second mote. Method step 4310 depicts the end of the process. Specific example implementations of the more general process implementations of FIG. 43 are described following.

Figure 44:
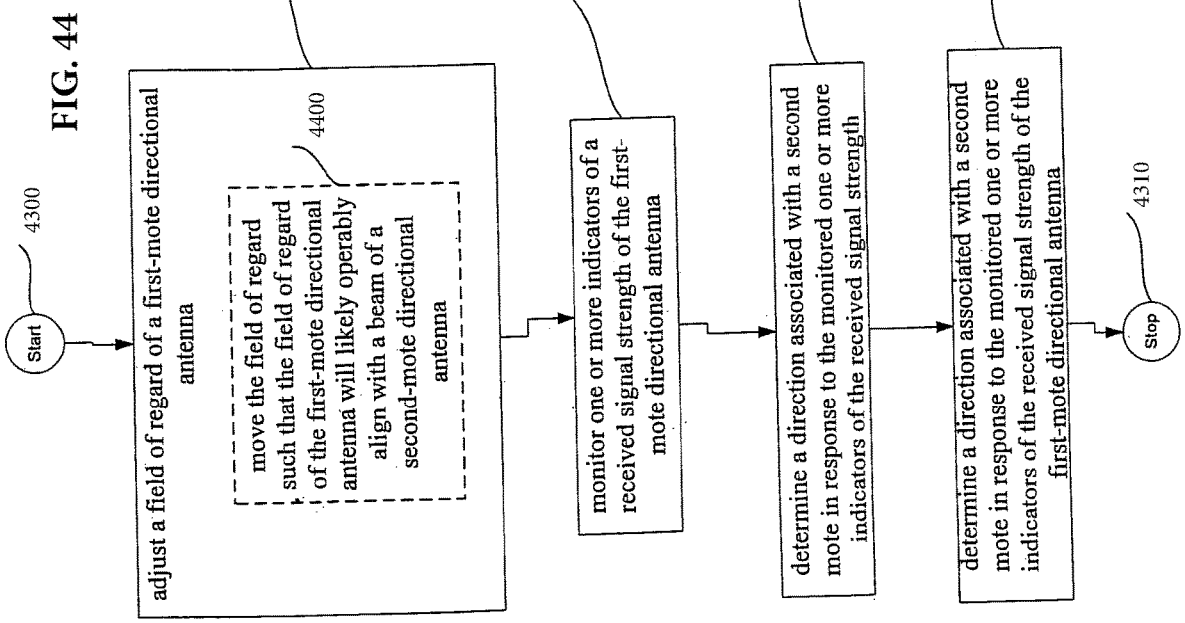
FIG. 44 illustrates a high-level logic flowchart depicting an alternate embodiment of the high-level logic flowchart of FIG. 43.

Referring now to FIG. 44, illustrated is a high-level logic flowchart depicting an alternate embodiment of the high-level logic flowchart of FIG. 43. Depicted is that in some embodiments method step 4302 includes method step 4400. Method step 4400 shows moving the field of regard such that the field of regard of the first-mote directional antenna will likely operably align with a beam of a second-mote directional antenna. (By convention, "field of regard" is sometimes used herein when describing an example wherein an antenna is likely to receive a signal while "beam" is used when describing an example wherein an antenna is likely to transmit a signal.)

In one embodiment of method step 4400, antenna control unit 4256 directs antenna steering unit 4252 to sweep a field of regard of directional antenna 4258 at a rate likely to be different from that of a rate of sweep of a beam of another directional antenna. For example, antenna control units 4206, 4256 directing their respective antenna steering units 4202, 4252 to sweep their respective directional antennas 4208, 4258 at rates which are likely to be different. One implementation of the foregoing includes a network administrator pre-assigning different rates of sweep to antenna control units 4206, 4256. For example, a network administrator (not shown) may assign antenna control unit 4206 a rate of sweep of 4360 degrees/unit-time and assigning antenna control unit 4256 a rate of sweep of 4361 degrees/unit-time and directing antenna control unit 4206, 4256 to direct their respective antenna steering units 4202, 4252 to rotate directional antennas 4208, 4258 for a time period long enough such that directional antenna 4208 completes 4360 total rotations.

Figure 45:
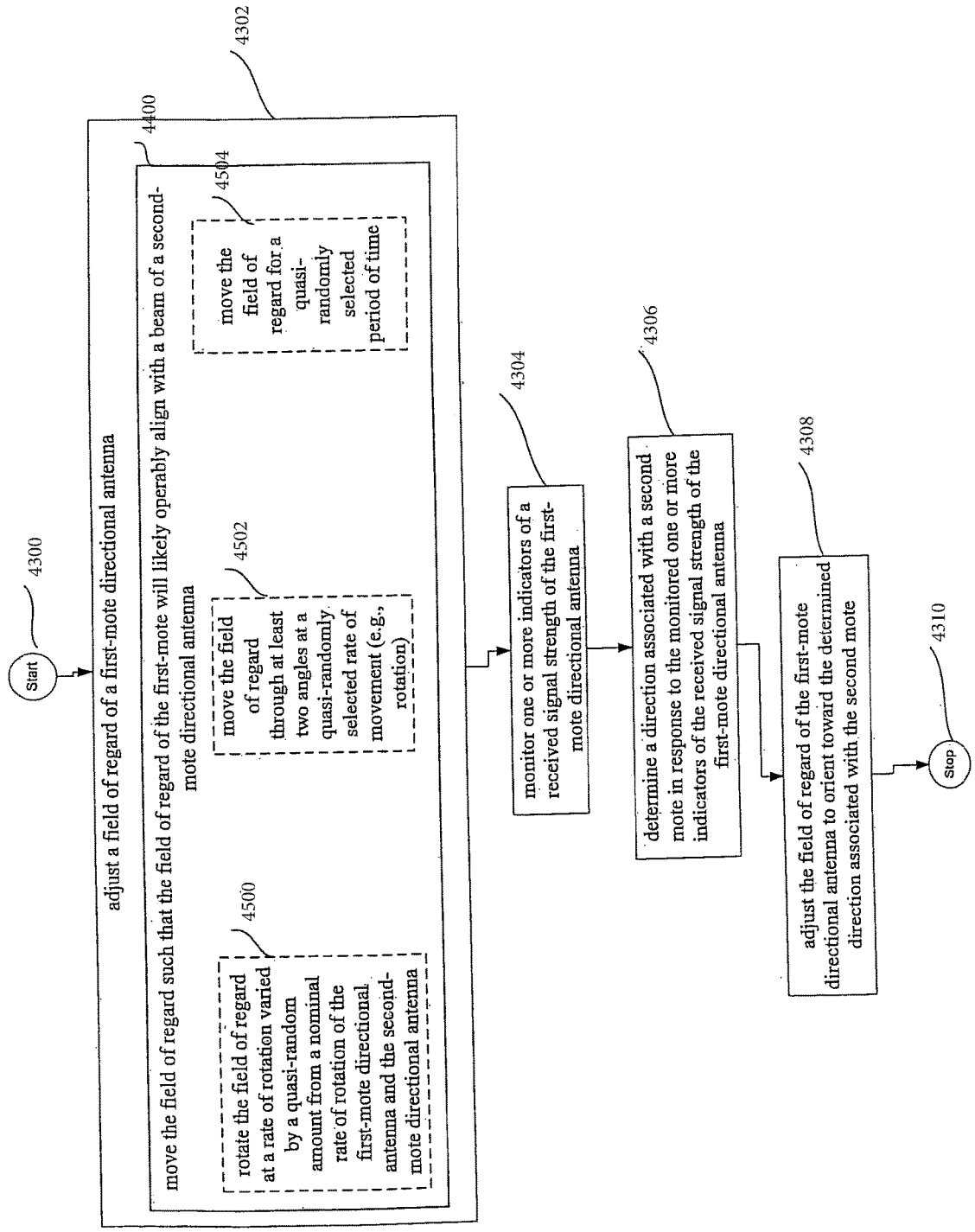
FIG. 45 illustrates a high-level logic flowchart depicting several alternate embodiments of the high-level logic flowchart of FIG. 44.

Referring now to FIG. 45, illustrated is a high-level logic flowchart depicting several alternate embodiments of the high-level logic flowchart of FIG. 44. Depicted is that in some embodiments method step 4400 includes method step 4500. Method step 4500 shows rotating the field of regard at a rate of rotation varied by a quasi-random amount from a nominal rate of rotation of the first-mote directional antenna and the second-mote directional antenna.

In one embodiment of method step 4500, antenna control unit 4256 directs antenna steering unit 4252 to rotate a field of regard of directional antenna 4258 at a rate of rotation varied by a quasi-random amount from a nominal rate of rotation shared by at least one other mote (as used herein, "nominal" generally means according to plan or design). For example, in one implementation antenna control unit 4256 recalls from memory a known nominal rate of rotation and then uses embodied logic to vary that recalled nominal rate of rotation by some amount to devise a mote 4250 resultant rate of rotation (e.g., 4360 degrees/unit-time). Thereafter, antenna control unit 4256 directs antenna steering unit 4252 to rotate directional antenna 4258 at the mote 4250 resultant rate of rotation. At or around the same time, antenna control unit 4202 engages in a similar set of operations to devise a mote 4200 rate of rotation. Insofar as that the mote 4200 rate of rotation and the mote 4250 rate of rotation were devised by quasi-random variations on substantially the same nominal rates of rotation, it is likely that the mote 4200 rate of rotation will be different than the mote 4250 rate of rotation. Hence, eventually the field of regard of directional antenna 4208 will operably align with the beam of directional antenna 4258 such that signals may be respectively received/transmitted between the directional antennas. In some implementations, the directional antennas are rotated for a pre-specified period of time. In some implementations, the directional antennas are rotated until either a strong signal is detected or a timeout occurs.

In one approach, the network administrator or logic within one or more of the antenna control units 4206, 4256 may include logic that can reduce the time to align by monitoring levels, level changes, or rates of change of the signal indicator and adjusting the rate or direction of movement in response. For example, at angles of the field of regard where the indicator is relatively high or deviates in some manner from other angles, the rate of rotation can be adjusted using relatively straightforward logic to improve the likelihood of establishing the desired alignment.

Continuing to refer to FIG. 45, illustrated is that in some embodiments method step 4400 includes method step 4502. Method step 4502 shows moving the field of regard through at least two angles at a quasi-randomly selected rate of movement.

In one embodiment of method step 4502, antenna control unit 4256 directs antenna steering unit 4252 to move a field of regard of directional antenna 4258 through a series of angles at a rate of movement derived from random number generation logic (e.g., moving the field of regard through a 90 degree arc in discrete increments of 5 degrees at time intervals dictated by a random number generator).

Continuing to refer to FIG. 45, illustrated is that in some embodiments method step 4400 includes method step 4504. Method step 4504 shows moving the field of regard for a quasi-randomly selected period of time.

In one embodiment of method step 4504, antenna control unit 4256 directs antenna steering unit 4252 to move a field of regard of directional antenna 4258 at some rate of rotation for a period of time derived from random number generation logic (e.g., moving the field of regard at 4360 degrees/unit-time for a first interval of time dictated by a random number generator, moving the field of regard at 45 degrees/unit time for a second interval of time dictated by the random number generator).

Figure 46:
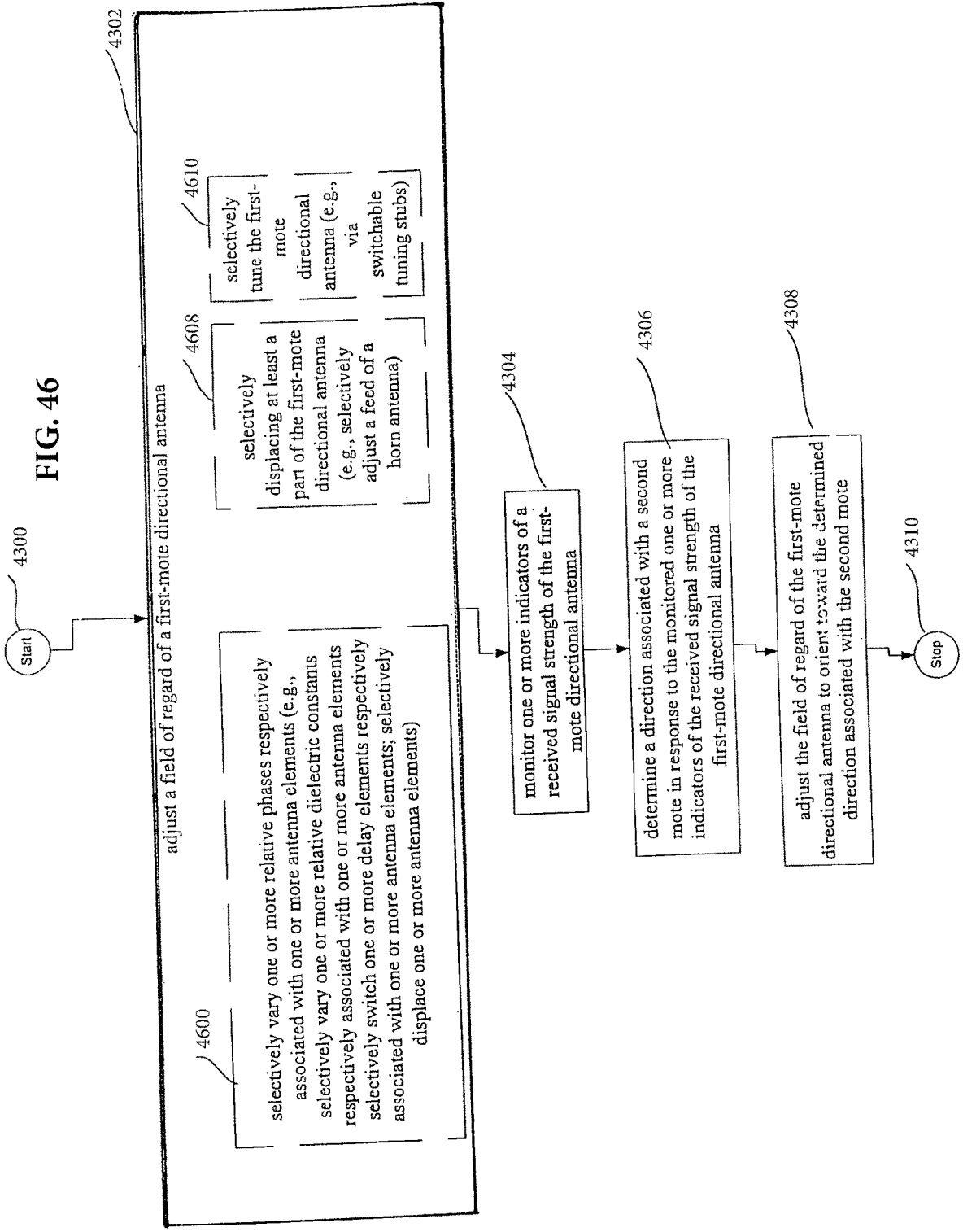
FIG. 46 illustrates a high-level logic flowchart depicting several alternate embodiments of the high-level logic flowchart of FIG. 43.

Referring now to FIG. 46, illustrated is a high-level logic flowchart depicting several alternate embodiments of the high-level logic flowchart of FIG. 43. Depicted is that in some embodiments method step 4302 includes method step 4600. Method step 4600 shows selectively varying one or more relative phases respectively associated with one or more antenna elements.

In one embodiment of method step 4600, antenna control unit 4206 directs antenna steering unit 4202 to selectively delay received signals such that a field of regard of directional antenna 4208 is varied.

Continuing to refer to FIG. 46, shown is that in some implementations of method step 4600, selectively varying one or more relative phases respectively associated with one or more antenna elements can include selectively varying one or more relative dielectric constants respectively associated with the one or more antenna elements. Also shown is that in some implementations of method step 4600, selectively varying one or more relative phases respectively associated with one or more antenna elements can include selectively switching one or more delay elements respectively associated with the one or more antenna elements. Further shown is that in some implementations of method step 4600, selectively varying one or more relative phases respectively associated with one or more antenna elements can include selectively displacing the one or more antenna elements. In some implementations of method step 4600, such as where directional antenna 4258 is implemented with discrete antenna elements (e.g., array antennas and/or Yagi antennas), antenna steering unit 4252 delays one or more of the signals of the discrete antenna elements to steer the field of regard of directional antenna 4258 in a desired fashion (e.g., by numerical techniques and/or delay lines).

Continuing to refer to FIG. 46, illustrated is that in some embodiments method step 4302 includes method step 4608. Method step 4608 shows selectively displacing at least a part of the first-mote directional antenna. In some implementations of method step 4608, such as instances where directional antenna 4258 is implemented with a horn antenna or a biconical antenna, antenna steering unit 4252 moves at least a part of the antenna, such as moving a feed of and/or rotating a horn antenna and/or moving a feed of and/or rotating a biconical antenna.

Continuing to refer to FIG. 46, shown is that in some embodiments method step 4302 includes method step 4610. Method step 4610 shows selectively tuning the first-mote directional antenna (e.g., via switchable tuning stubs). In some implementations of method step 4610, such as instances where directional antenna 4258 is implemented with a tunable antenna (e.g., antennas having tuning stubs), antenna steering unit 4252 either moves and/or switches in and out the various tuning stubs to direct the field of regard of directional antenna 4258.

Figure 47:
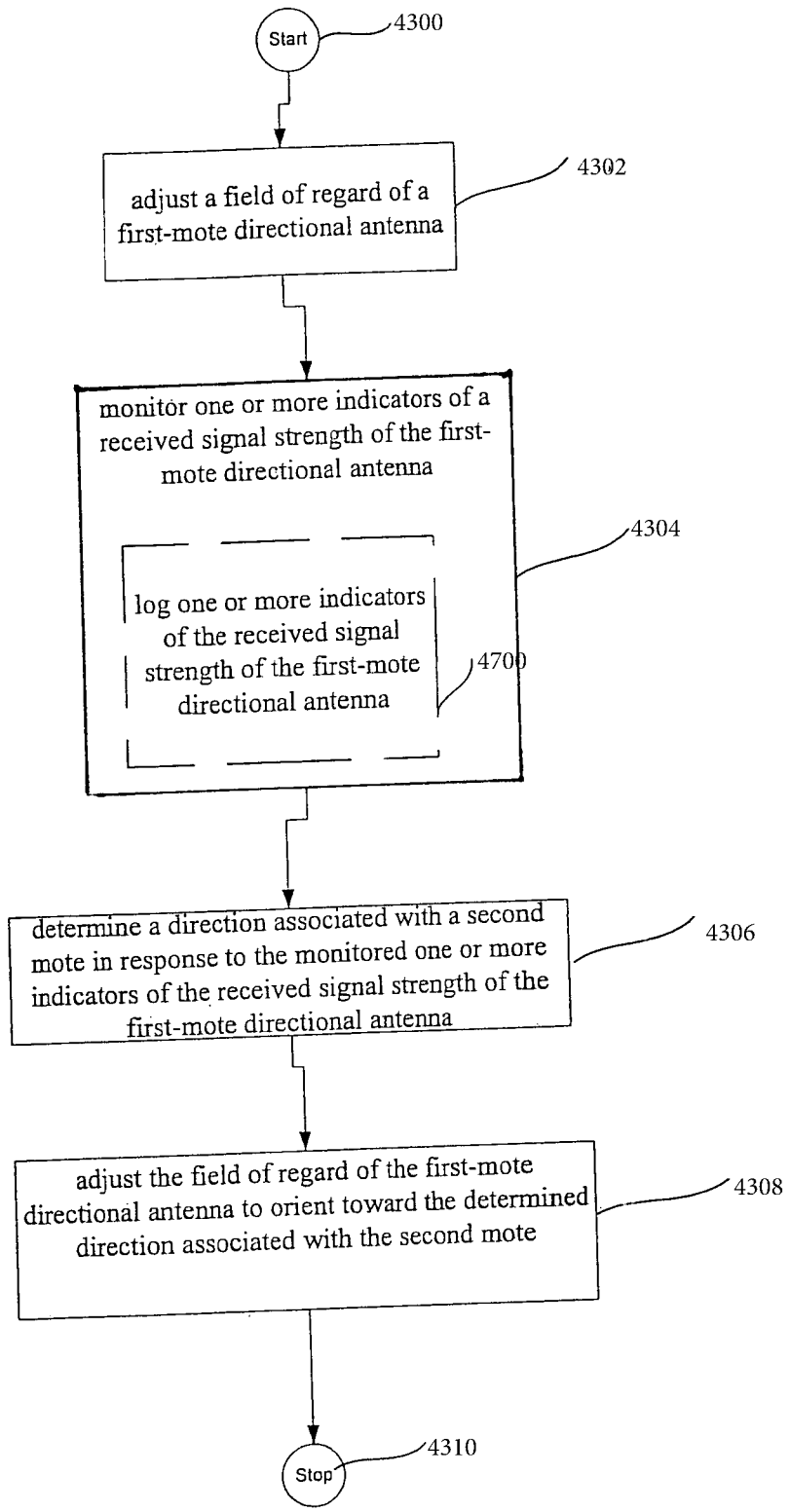
FIG. 47 illustrates a high-level logic flowchart depicting an alternate embodiment of the high-level logic flowchart of FIG. 43.

Referring now to FIG. 47, illustrated is a high-level logic flowchart depicting an alternate embodiment of the high-level logic flowchart of FIG. 43. Depicted is that in some embodiments method step 4304 includes method step 4700. Method step 4700 shows logging one or more indicators of the received signal strength of the first-mote directional antenna.

In one embodiment of method step 4700, antenna control unit 4256 directs antenna signal generation/detection unit 4254 to log a received signal strength indicator of a known beacon signal. For example, in one implementation antenna signal generation/detection unit 4254 contains a correlation detector having as a reference the beacon signal; the output of the correlation detector is stored to a memory which antenna control unit 4256 can then access. Those having ordinary skill of the art will appreciate that other signal detection techniques, consistent with the teachings herein, may be substituted.

Figure 48:
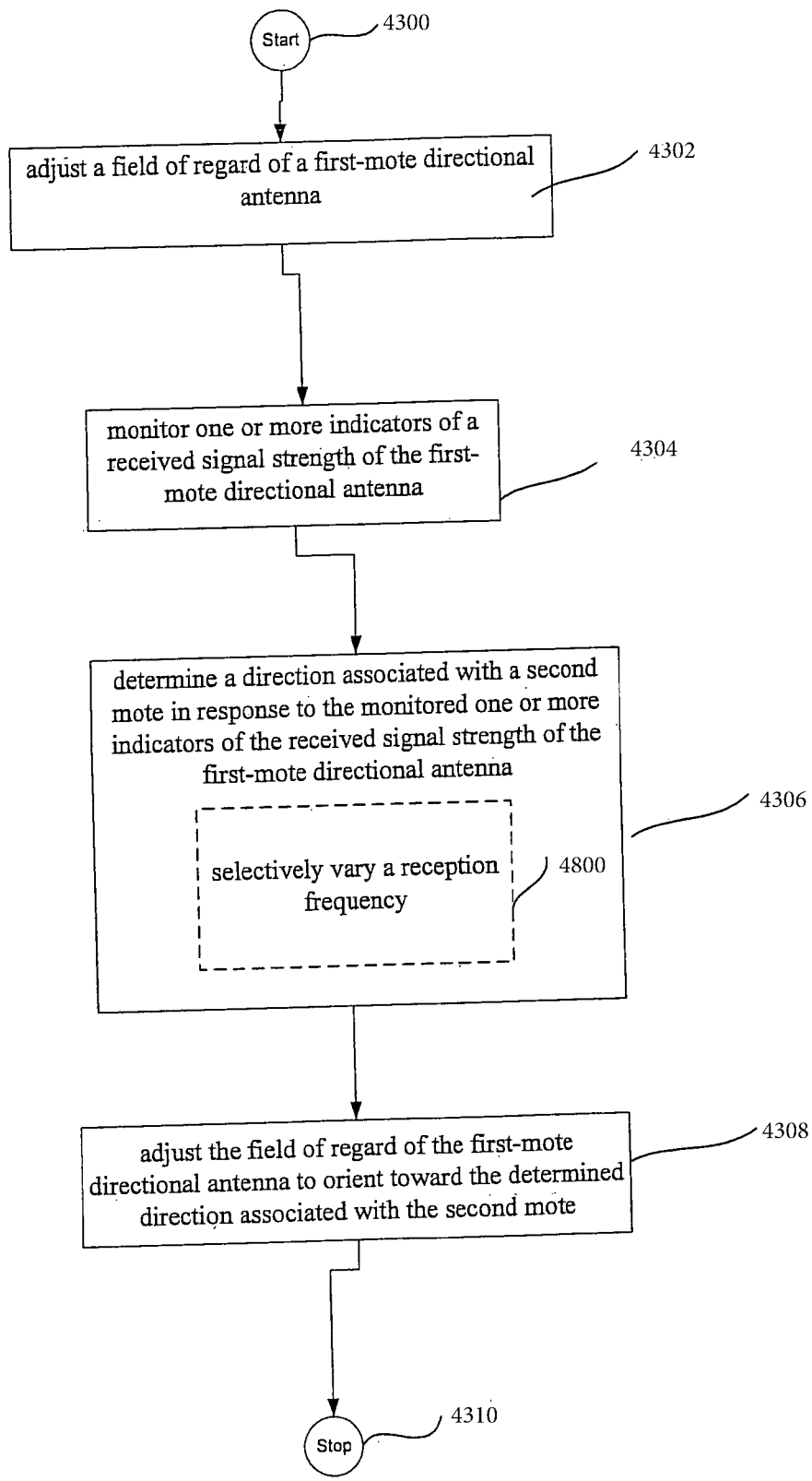
FIG. 48 illustrates a high-level logic flowchart depicting an alternate embodiment of the high-level logic flowchart of FIG. 43.

With reference now to FIG. 48, illustrated is a high-level logic flowchart depicting an alternate embodiment of the high-level logic flowchart of FIG. 43. Depicted is that in some embodiments method step 4306 includes method step 4800. Method step 4800 shows selectively varying a reception frequency.

In one embodiment of method step 4800, antenna control unit 4256 directs antenna signal generation/detection unit 4254 to vary a reference frequency of a demodulator from a nominal value. In some implementations, the way in which the reference frequency is varied is deterministic (e.g., varying above and below the nominal frequency by 5 Hz increments for predetermined and/or quasi-random periods of time). In some implementations, the way in which the reference frequency is varied is quasi-random (e.g., varying above and below the nominal frequency by quasi-random increments for predetermined periods of time). For example, in one implementation antenna signal generation/detection unit 4254 contains demodulation logic whose reference frequency can be varied in fashions as described herein. Those having ordinary skill of the art will appreciate that other signal demodulation techniques, consistent with the teachings herein, may be substituted.

Figure 49:
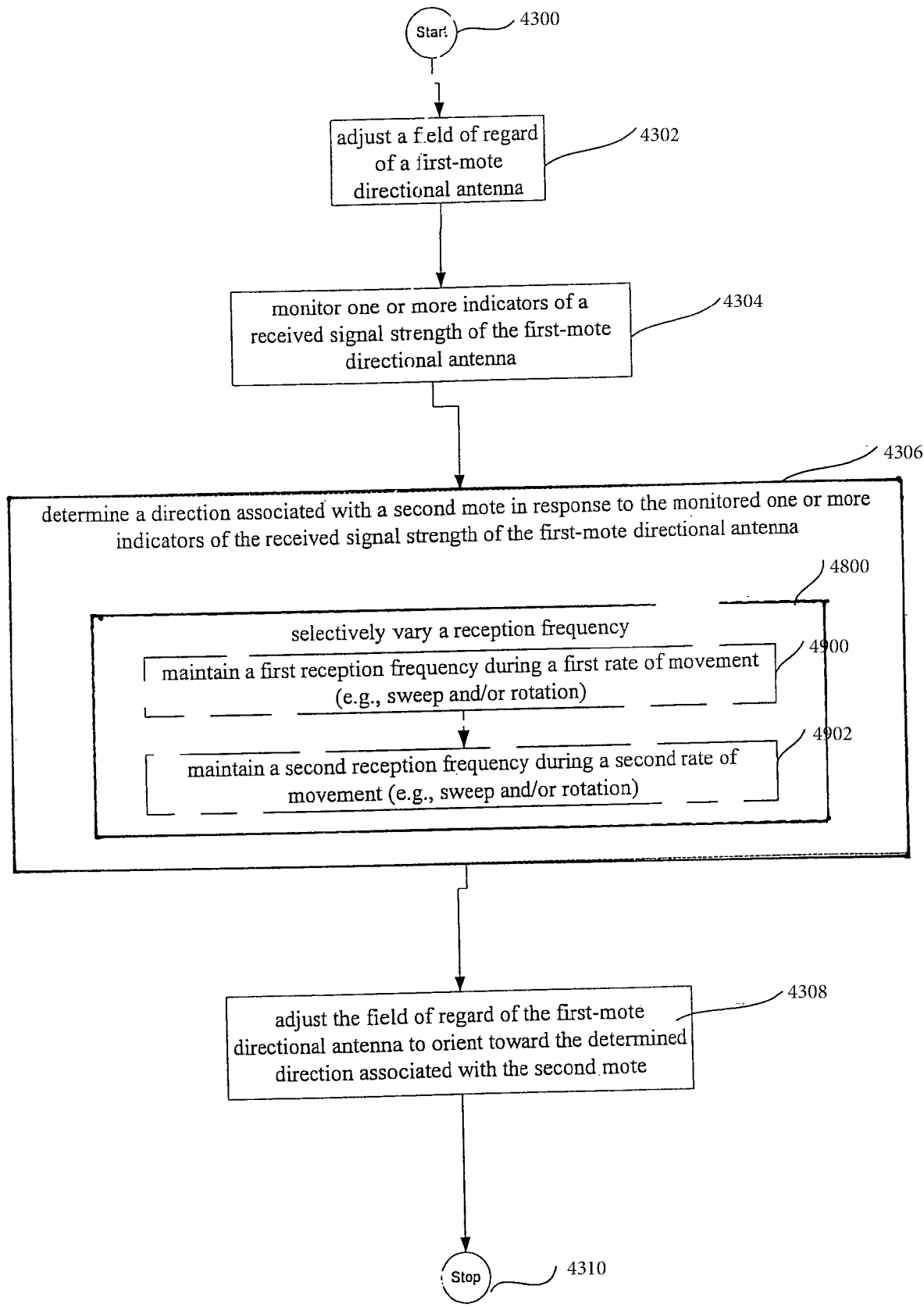
FIG. 49 illustrates a high-level logic flowchart depicting an alternate embodiment of the high-level logic flowchart of FIG. 48.

With reference now to FIG. 49, illustrated is a high-level logic flowchart depicting an alternate embodiment of the high-level logic flowchart of FIG. 48. Depicted is that in some embodiments method step 4800 includes method step 4900 and 4902. Method step 4900 shows maintaining a first reception frequency during a first rate of movement. Method step 4902 shows maintaining a second reception frequency during a second rate of movement.

In one embodiment of method step 4900, antenna control unit 4256 directs antenna signal generation/detection unit 4254 to maintain a first reference frequency of a demodulator while antenna control unit 4256 is causing antenna steering unit 4252 to sweep/rotate at a first rate. In one embodiment of method step 4902, antenna control unit 4256 directs antenna signal generation/detection unit 4254 to maintain a second reference frequency while antenna control unit 4256 is causing antenna steering unit 4252 to sweep/rotate at a second rate. In some implementations, the way in which the first and the second reference frequencies are chosen is deterministic (e.g., varying above and below some nominal frequency by 5 Hz increments for predetermined and/or quasi-random periods of time). In some implementations, the way in which the reference frequency is varied is quasi-random (e.g., varying above and below a nominal frequency by quasi-random amounts dictated by a random number generator).

Figure 50:
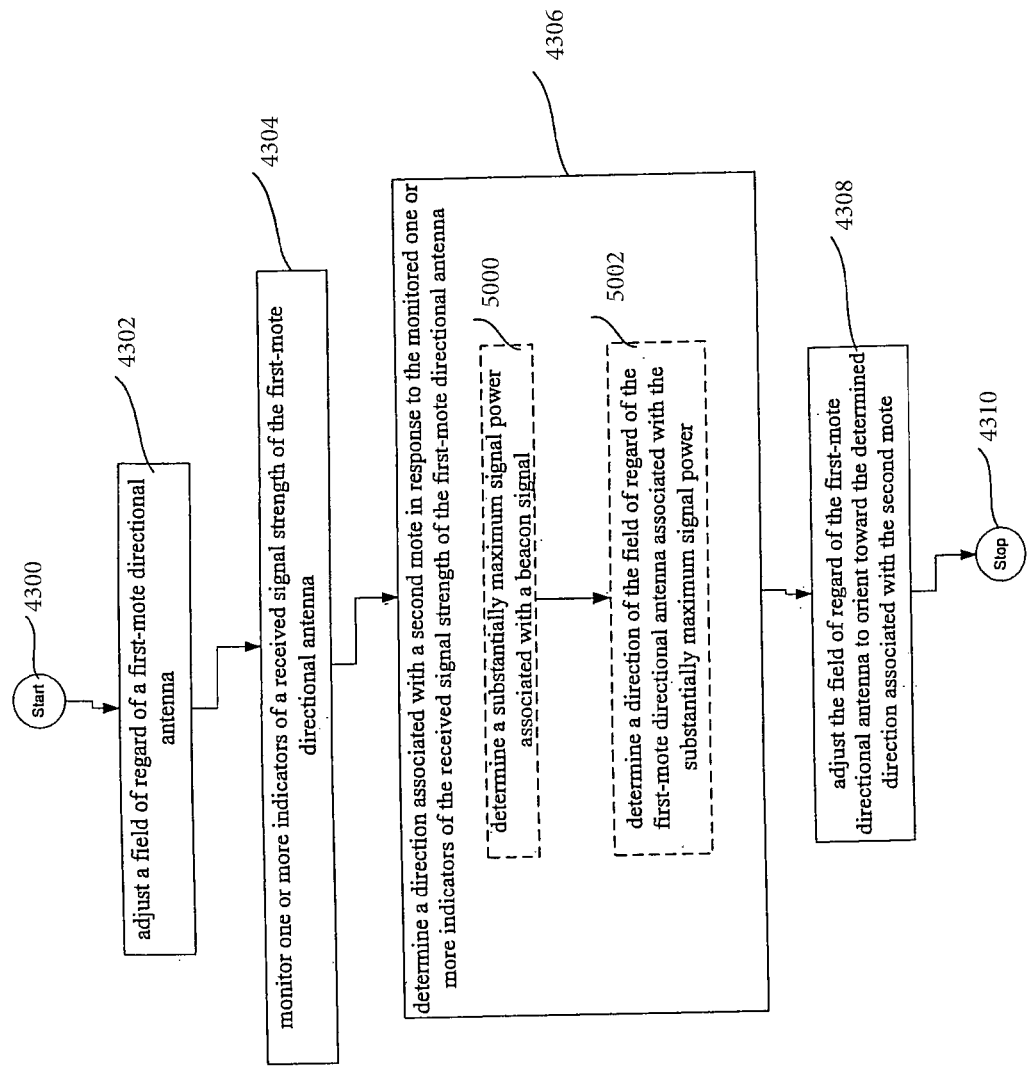
FIG. 50 illustrates a high-level logic flowchart depicting an alternate embodiment of the high-level logic flowchart of FIG. 43.

With reference now to FIG. 50, illustrated is a high-level logic flowchart depicting an alternate embodiment of the high-level logic flowchart of FIG. 43. Depicted is that in some embodiments method step 4306 includes method step 5000 and 5002. Method step 5000 shows determining a substantially maximum signal power associated with a beacon signal. Method step 5002 depicts determining a direction of the field of regard of the first-mote directional antenna associated with the substantially maximum signal power.

In one embodiment of method step 5000, antenna control unit 4206 communicates with antenna signal generation/detection unit 4254 to determine one or more times during which received signal strength of a beacon signal was at one or more substantially maximum values. In one embodiment of method step 5002, antenna control unit 4206 communicates with antenna steering unit 4252 to determine one or more locations along an arc of movement of directional antenna 4258 that correspond with the times at which the received signal strength of the beacon signal was at one or more substantially maximum values.

Figure 51:
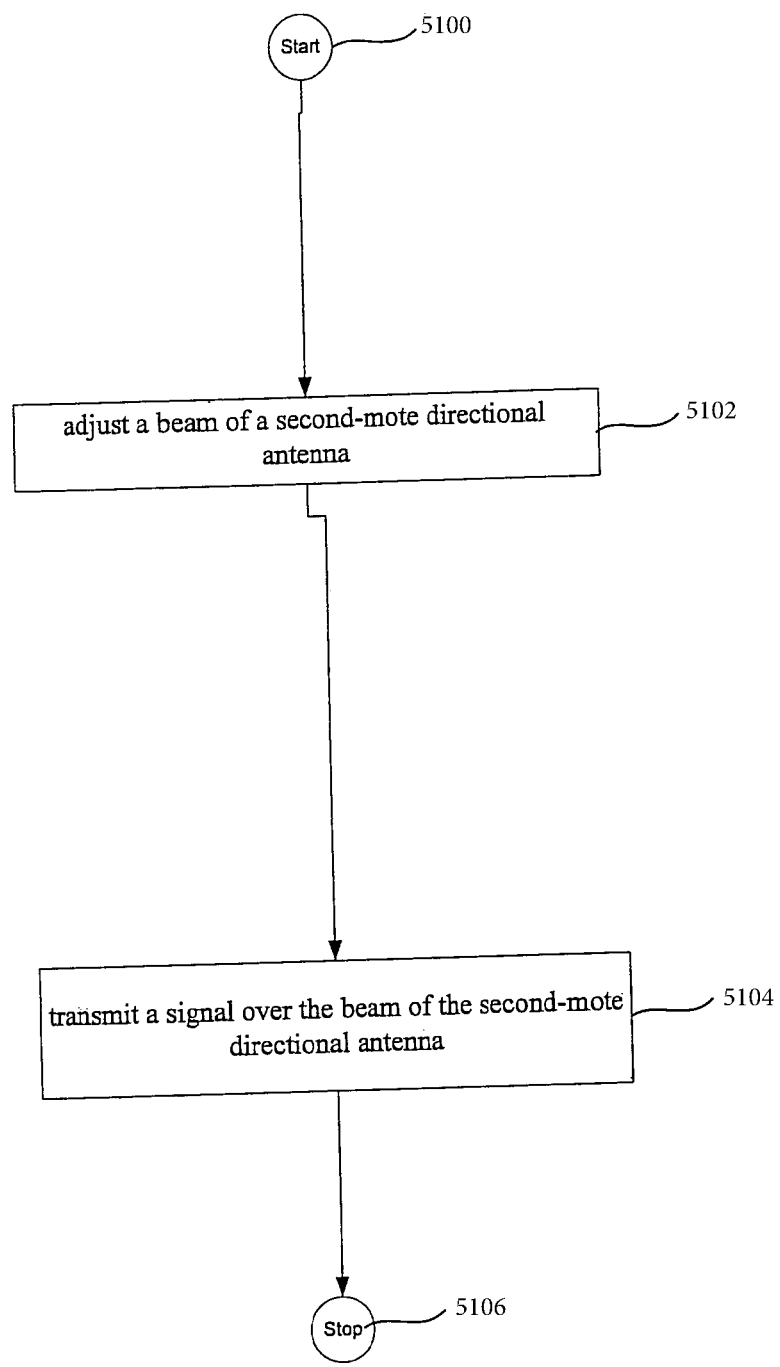
FIG. 51 depicts a high level logic flowchart of a process.

With reference now to FIG. 51, depicted is a high level logic flowchart of a process. Method step 5100 shows the start of the process. Method step 5102 depicts adjusting a beam of a second-mote directional antenna. Method step 5104 illustrates transmitting a signal over the beam of the second-mote directional antenna. Method step 5106 depicts the end of the process. Specific example implementations of the more general process implementations of FIG. 51 are described following.

Figure 52:
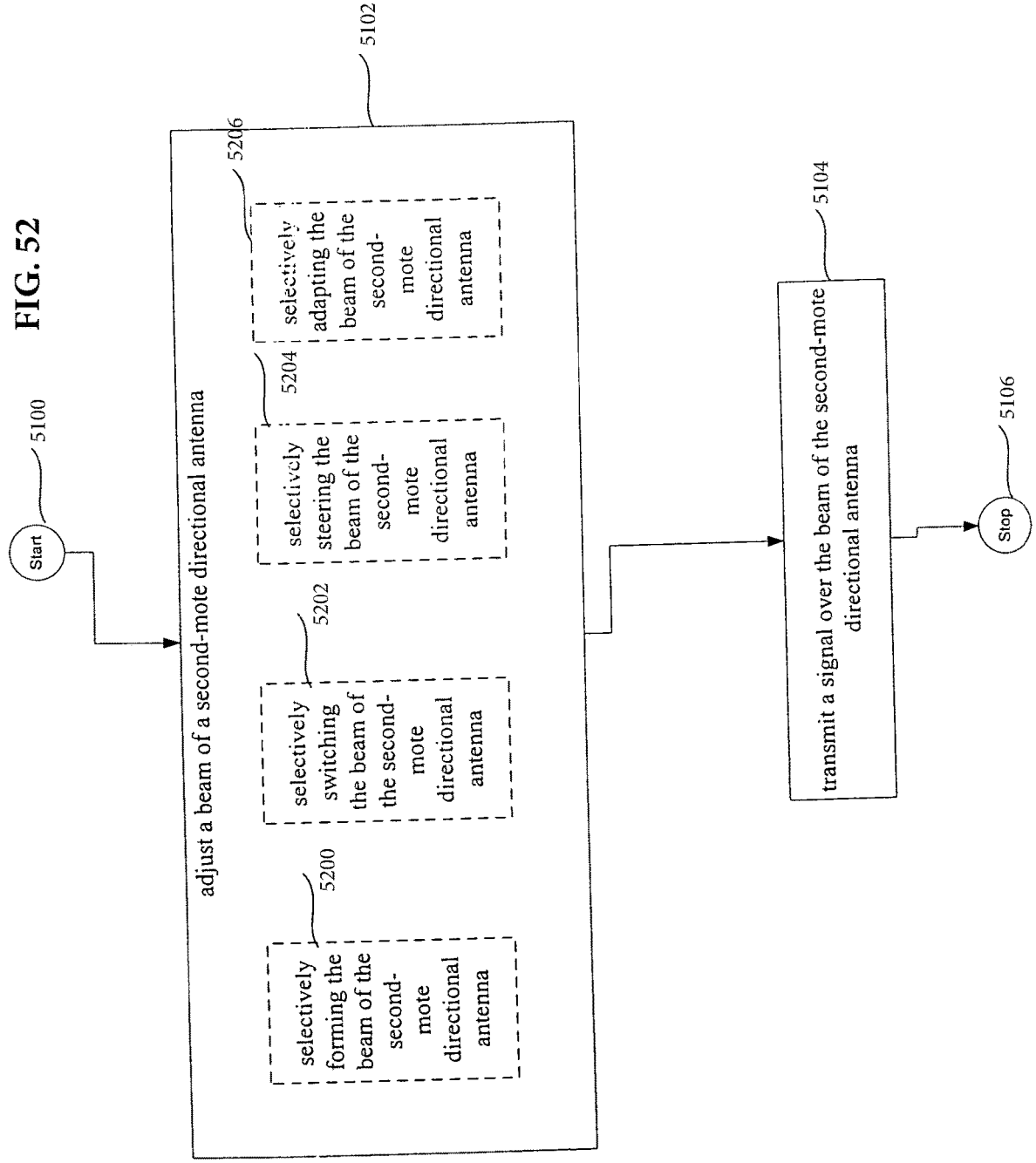
FIG. 52 illustrates a high-level logic flowchart depicting several alternate embodiments of the high-level logic flowchart of FIG. 51.

Referring now to FIG. 52, illustrated is a high-level logic flowchart depicting several alternate embodiments of the high-level logic flowchart of FIG. 51. Depicted is that in some embodiments method step 5102 includes method step 5200. Method step 5200 shows selectively forming the beam of the second-mote directional antenna.

In one embodiment of method step 5200, antenna control unit 4206 directs antenna steering unit 4202 to drive directional antenna 4208 such that a beam is formed over one or more angular ranges. One example of the foregoing could include forming a series of beams across a series of angles.

Continuing to refer to FIG. 52, illustrated is that in some embodiments method step 5102 includes method step 5202. Method step 5202 depicts selectively switching the beam of the second-mote directional antenna.

In some implementations of method step 5202, antenna control unit 4206 directs antenna steering unit 4202 to switch elements of directional antenna 4208 such that a beam is switched on across one or more angles. One example of the foregoing could include switching a series of discrete beams across a series of discrete angles.

Continuing to refer to FIG. 52, illustrated is that in some embodiments method step 5102 includes method step 5204. Method step 5204 depicts selectively steering the beam of the second-mote directional antenna.

In some implementations of method step 5204, antenna control unit 4206 directs antenna steering unit 4202 to selectively steer a beam of directional antenna 4208 such that a beam is moved across one or more angles. One example of the foregoing could include causing a horn or a biconical antenna to move across a series of angles (e.g., rotate in a circle).

Continuing to refer to FIG. 52, illustrated is that in some embodiments method step 5102 includes method step 5206. Method step 5206 depicts selectively adapting the beam of the second-mote directional antenna.

In some implementations of method step 5206, antenna control unit 4206 directs antenna steering unit 4202 to selectively adapt one or more beams of directional antenna 4208 such that a beam is moved across one or more angles. One example of the foregoing could include selectively adapting the beam of the second-mote directional antenna.

With reference again to FIGS. 43 and 51, method step 4302 of FIG. 43, and its supporting text, show and/or describe adjusting a field of regard of a first-mote directional antenna. Method step 5102 of FIG. 51, and its supporting text, illustrate and/or describe adjusting a beam of a second-mote directional antenna (e.g., directional antenna 4208 of mote 4200).

FIGS. 44-46 show and/or describe several implementations of adjusting a field of regard of the first-mote directional antenna. The inventor points out that implementations substantially analogous to those shown for method step 4302 are also contemplated for method step 5102. Specifically, each shown/described example of adjusting the field of regard as described elsewhere herein will in general have a corresponding implementation by which the beam of a second-mote directional antenna is analogously adjusted. Those having skill in the art will appreciate that insofar as that transmitting and receiving are essentially mirror operations and that beam forming and defining field of regard are complementary actions, the examples of adjusting the field of regard set forth above may also be viewed as constituting examples of adjusting beams. In light of the foregoing, those having skill in the art will appreciate that FIGS. 44-46 and their supporting texts, combined with generally known aspects of beam forming, teach such beam forming implementations; consequently, the beam adjusting implementations are not expressly re-described here for sake of clarity.

Figure 53:
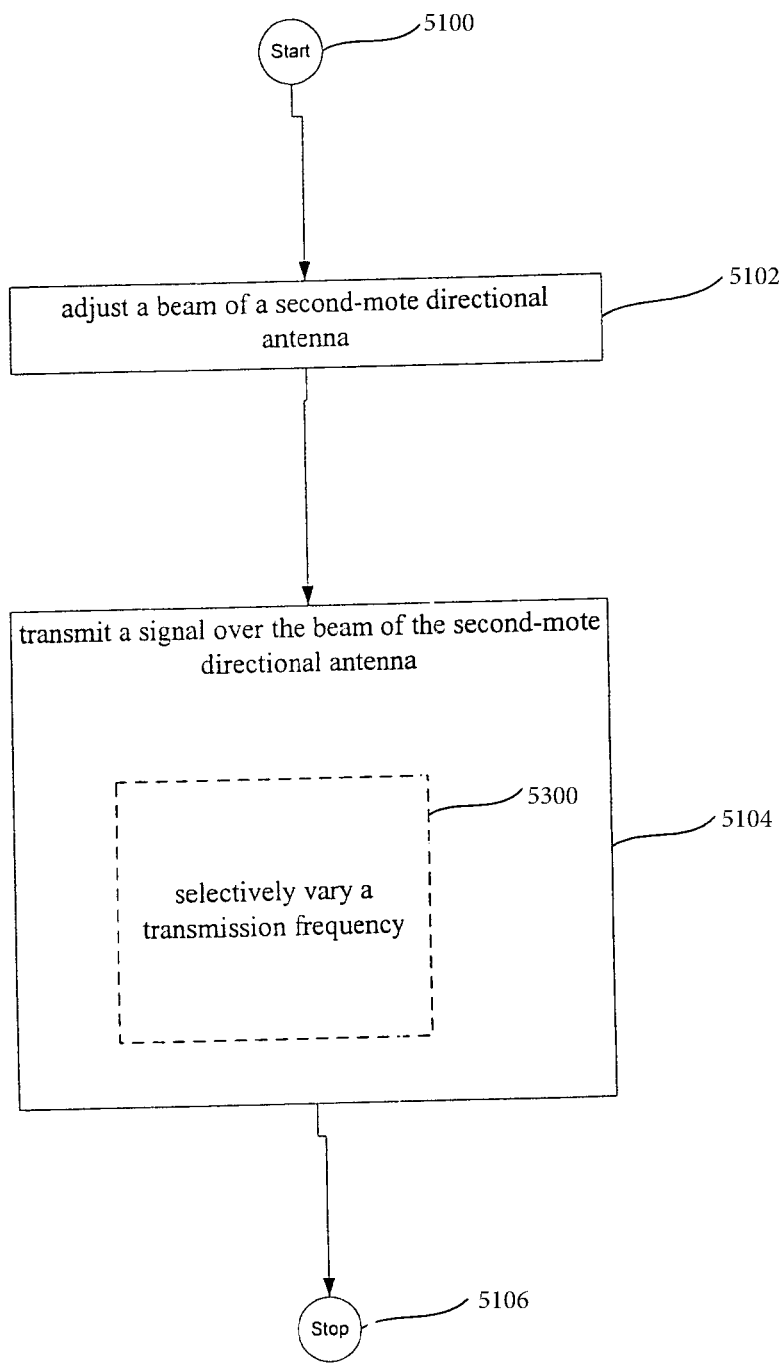
FIG. 53 illustrates a high-level logic flowchart depicting an alternate embodiment of the high-level logic flowchart of FIG. 51.

With reference now to FIG. 53, illustrated is a high-level logic flowchart depicting an alternate embodiment of the high-level logic flowchart of FIG. 51. Depicted is that in some embodiments method step 5104 includes method step 5300. Method step 5300 shows selectively varying a transmission frequency.

In one embodiment of method step 5300, antenna control unit 4206 directs signal generation/detection unit 4204 to vary a carrier frequency of a modulator from a nominal value. In some implementations, the way in which the carrier frequency is varied is deterministic (e.g., varying above and below the nominal frequency by 5 Hz increments for predetermined and/or quasi-random periods of time). In some implementations, the way in which the carrier frequency is varied is quasi-random (e.g., varying above and below the nominal frequency by quasi-random amounts for predetermined periods of time).

In one implementation, antenna signal generation/detection unit 4204 contains a modulator that combines a known beacon signal with the carrier signal which is then transmitted from directional antenna 4208. Those having ordinary skill of the art will appreciate that other signal generation techniques, consistent with the teachings herein, may be substituted.

Figure 54:
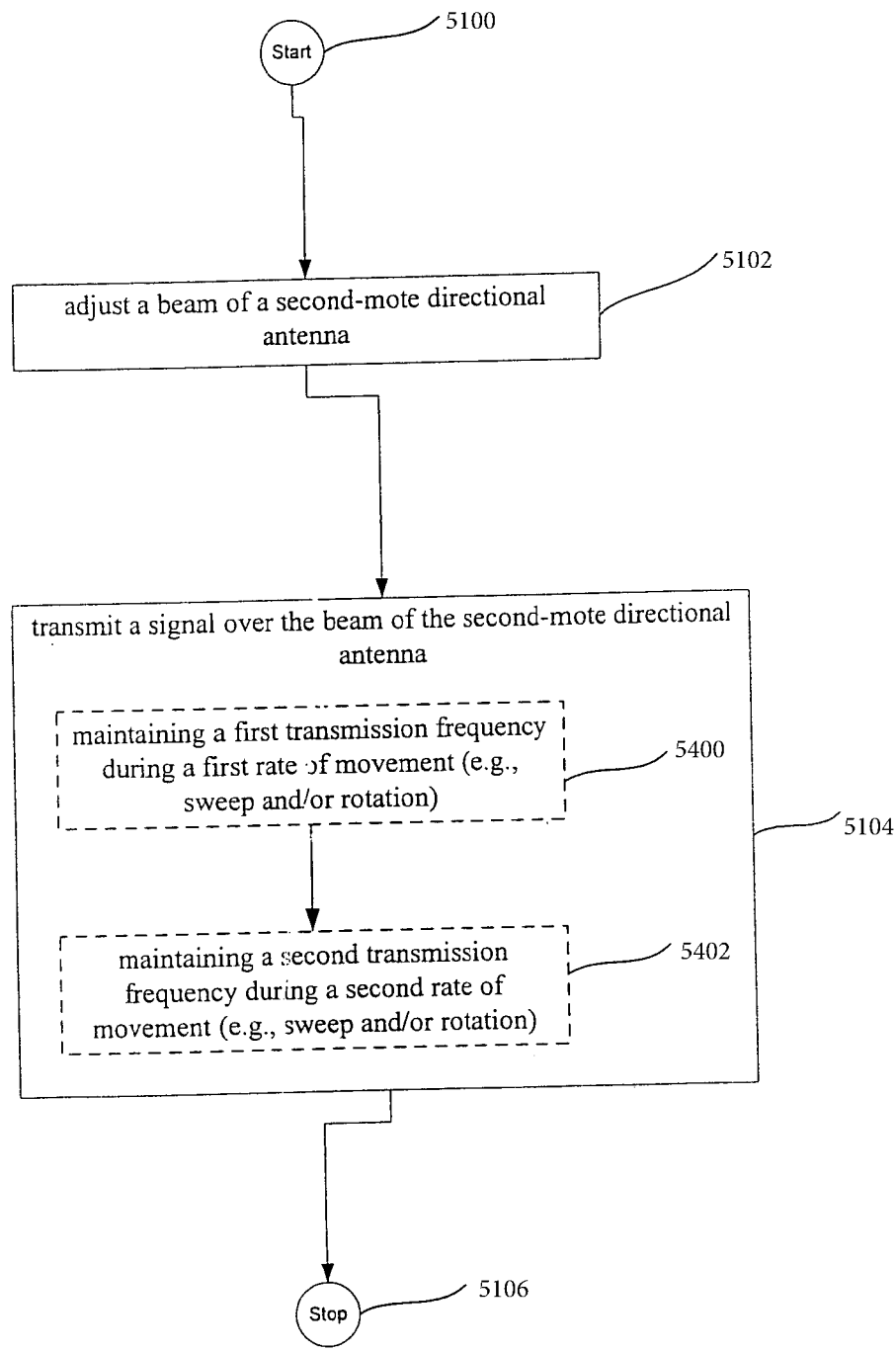
FIG. 54 illustrates a high-level logic flowchart depicting an alternate embodiment of the high-level logic flowchart of FIG. 51.

With reference now to FIG. 54, illustrated is a high-level logic flowchart depicting an alternate embodiment of the high-level logic flowchart of FIG. 51. Depicted is that in some embodiments method step 5104 includes method steps 5400 and 5402. Method step 5400 shows maintaining a first transmission frequency during a first rate of movement (e.g., sweep and/or rotation). Method step 5402 shows maintaining a second transmission frequency during a second rate of movement (e.g., sweep and/or rotation).

In one embodiment of method step 5400, antenna control unit 4206 directs antenna signal generation/detection unit 4204 to maintain a first carrier frequency of a modulator while antenna control unit 4206 is causing antenna steering unit 4202 to sweep/rotate at a first rate. In one embodiment of method step 5400, antenna control unit 4206 directs antenna signal generation/detection unit 4204 to maintain a second carrier frequency of a modulator while antenna control unit 4206 is causing antenna steering unit 4202 to sweep/rotate at a second rate. In some implementations, the way in which the carrier frequency is varied is deterministic (e.g., varying above and below the nominal frequency by 5 Hz increments for predetermined and/or quasi-random periods of time). In some implementations, the way in which the carrier frequency is varied is quasi-random (e.g., varying above and below the nominal frequency by quasi-random amounts for predetermined periods of time).

Figure 55:
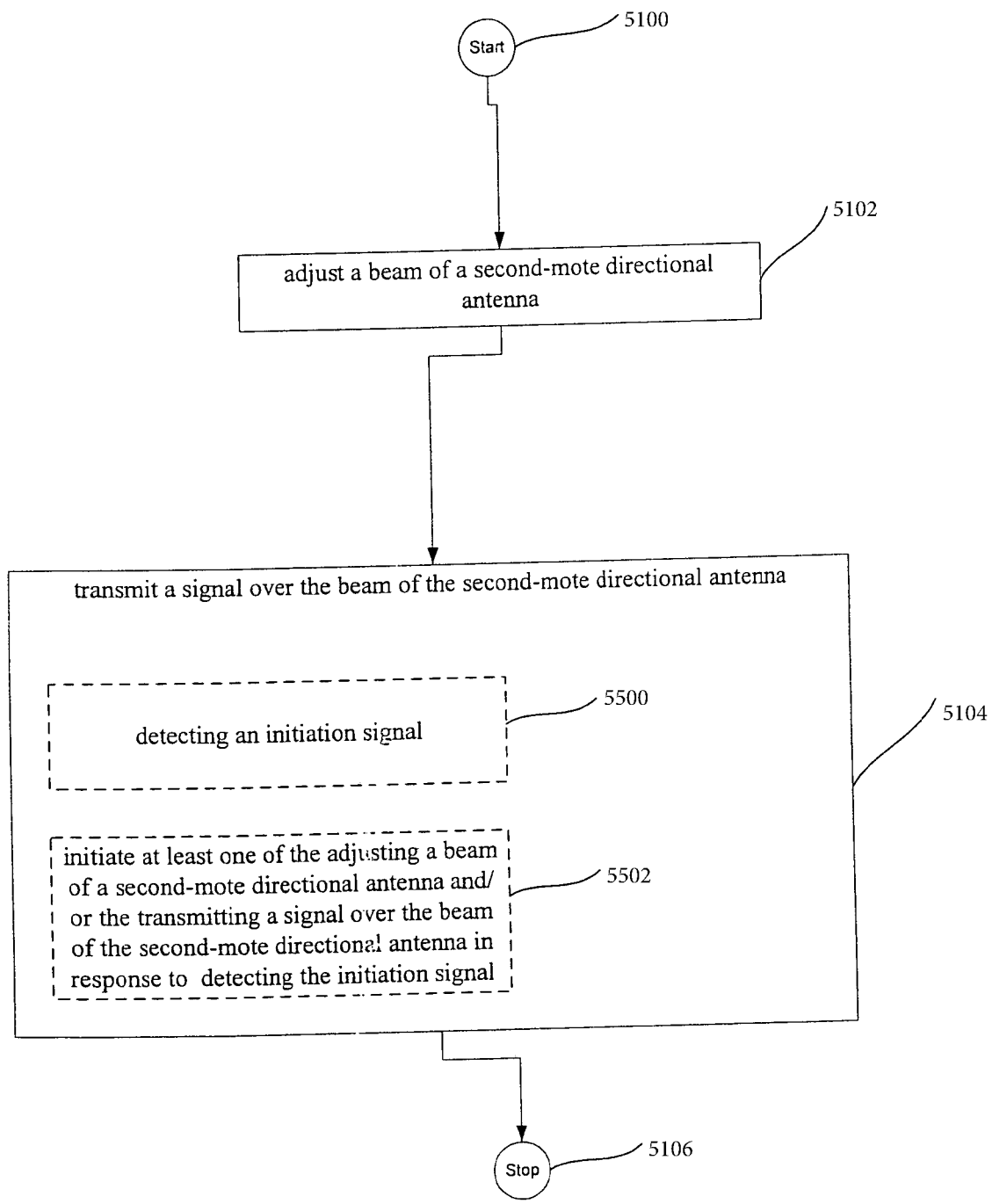
FIG. 55 illustrates a high-level logic flowchart depicting an alternate embodiment of the high-level logic flowchart of FIG. 51.

Referring now to FIG. 55, illustrated is a high-level logic flowchart depicting an alternate embodiment of the high-level logic flowchart of FIG. 51. Depicted is that in some embodiments method step 5104 includes method steps 5500 and 5502. Method step 5500 shows detecting an initiation signal. Method step 5502 depicts initiating at least one of said adjusting a beam of a second-mote directional antenna and/or said transmitting a signal over the beam of the second-mote directional antenna in response to said detecting the initiation signal.

In one embodiment of method step 5500, antenna signal generation/detection unit 4204 detects an incoming pre-defined seek-mote-antennas signal over directional antenna 4208. Signal generation/detection unit 4204 informs antenna control unit 4206 that the seek-mote-antennas signal has been received. In response, antenna control unit 4206 directs antenna signal generation/detection unit 4204 to generate a pre-defined beacon signal and/or communicates with antenna steering unit 4252 to begin adjusting a beam of directional antenna 4208 as described herein (e.g., by moving the beam in an arc or circle through a discrete set of angles, etc.).

Figure 56:
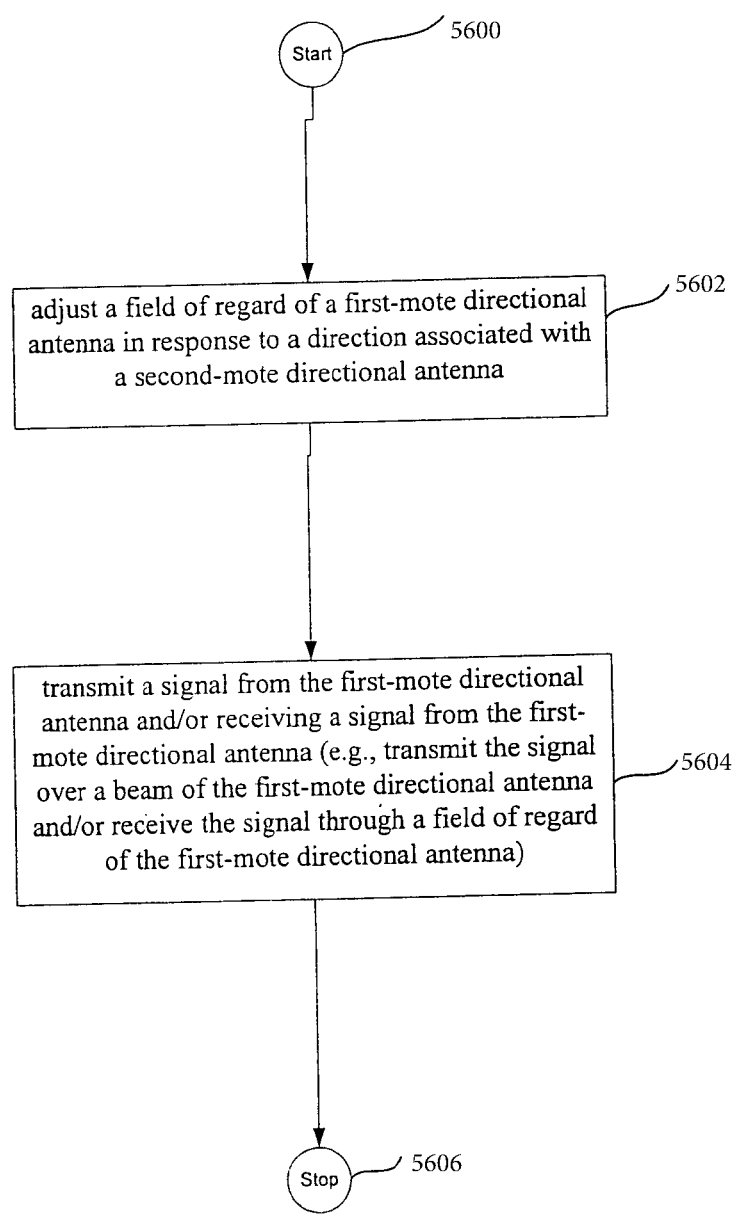
FIG. 56 depicts a high level logic flowchart of a process.

With reference now to FIG. 56, depicted is a high level logic flowchart of a process. Method step 5600 shows the start of the process. Method step 5602 depicts adjusting a field of regard of a first-mote directional antenna in response to a direction associated with a second-mote directional antenna. Method step 5604 illustrates transmitting a signal from the first-mote directional antenna and/or receiving a signal from the first-mote directional antenna (e.g., transmitting the signal over a beam of the first-mote directional antenna and/or receiving the signal through a field of regard of the first-mote directional antenna). Method step 5606 depicts the end of the process. Specific example implementations of the more general process implementations of FIG. 56 are described following.

Figure 57:
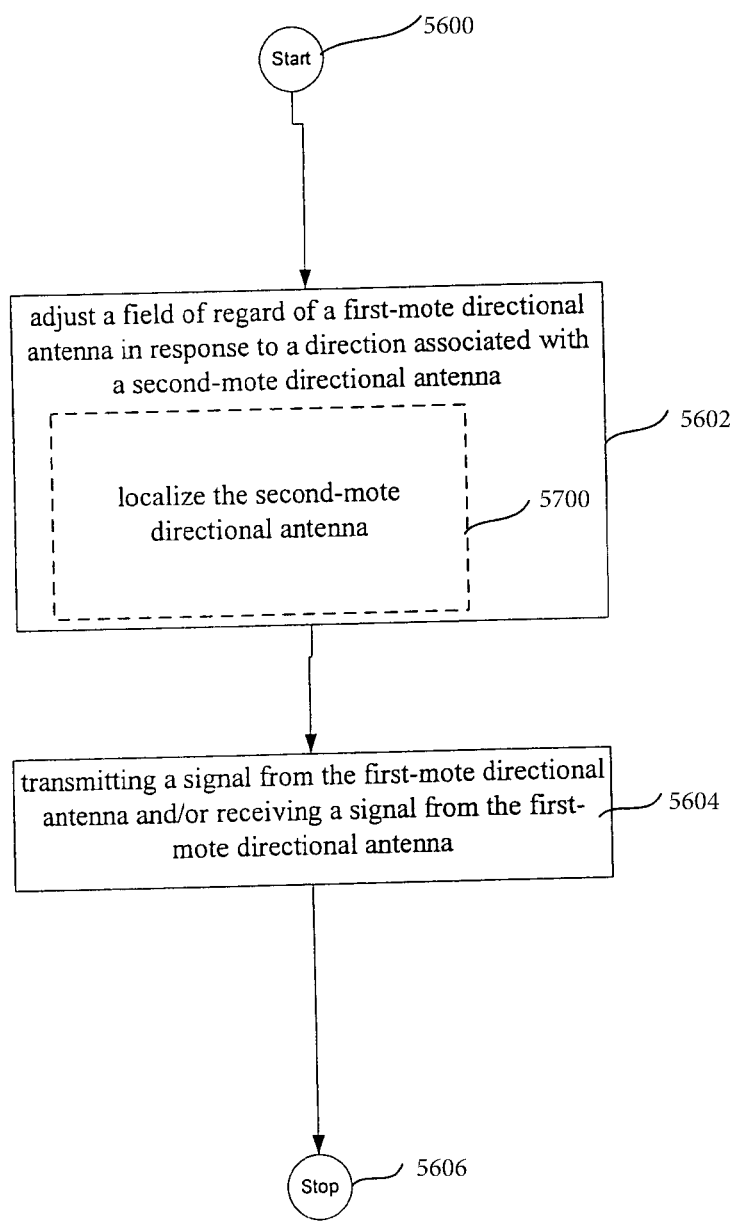
FIG. 57 illustrates a high-level logic flowchart depicting an alternate embodiment of the high-level logic flowchart of FIG. 56.

Referring now to FIG. 57, illustrated is a high-level logic flowchart depicting an alternate embodiment of the high-level logic flowchart of FIG. 56. Depicted is that in some embodiments method step 5602 includes method step 5700. Method step 5700 shows localizing the second-mote directional antenna. Specific example implementations of the more general process implementations of FIG. 57 are described following.

Figure 58:
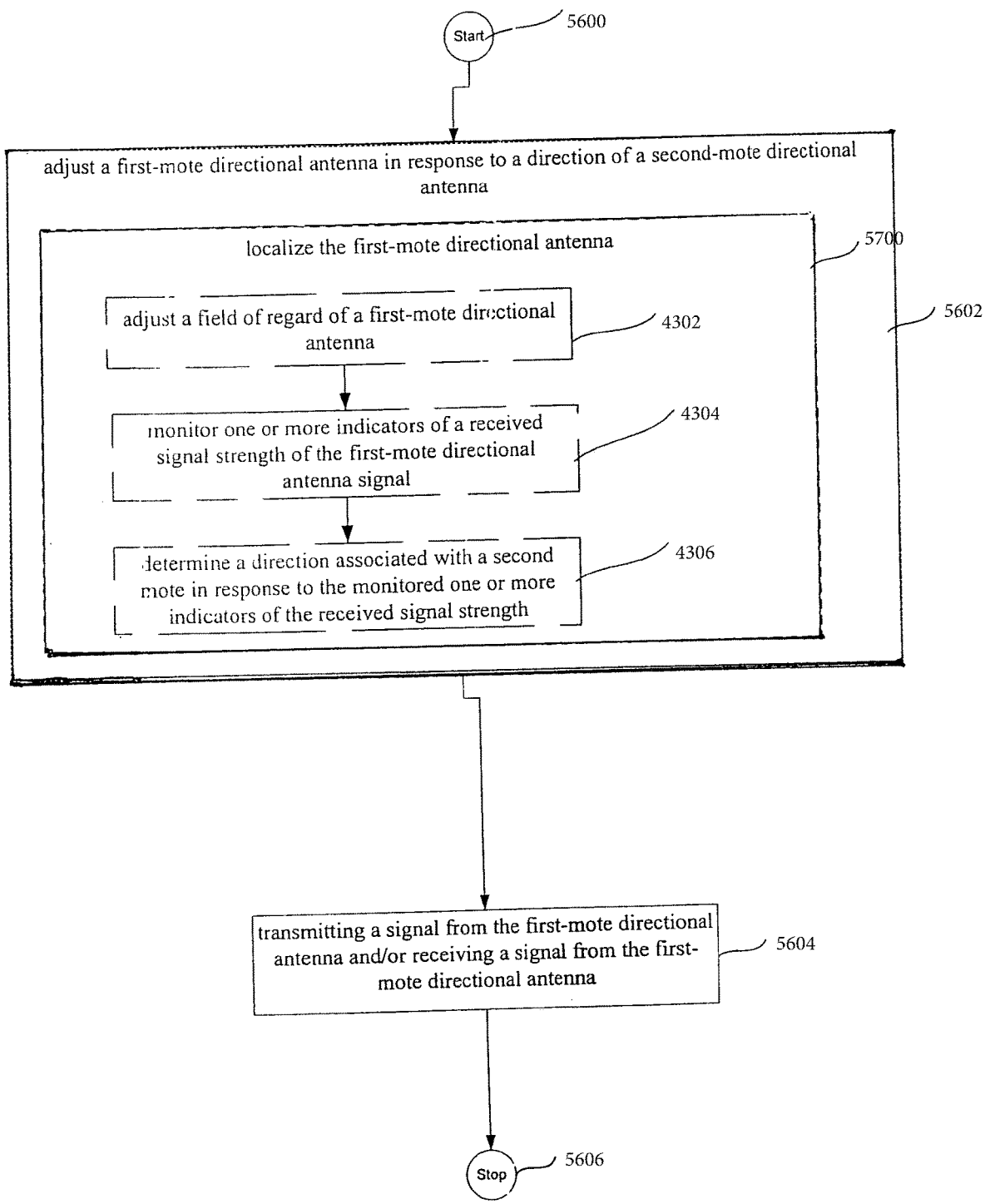
FIG. 58 illustrates a high-level logic flowchart depicting an alternate embodiment of the high-level logic flowchart of FIG. 57.

With reference now to FIG. 58, illustrated is a high-level logic flowchart depicting an alternate embodiment of the high-level logic flowchart of FIG. 57. Depicted is that in some embodiments method step 5700 includes method steps 4302, 4304, and 4306. Method steps 4302, 4304, and 4306, as well as various multiple implementations of such steps, are described elsewhere herein—e.g., FIGS. 43-46—and are hence not redescribed here for sake of clarity. However, it is to be understood that method steps 4302, 4304, and 4306 as illustrated in FIG. 58 are intended to incorporate and/or represent substantially all aspects and/or facets of the various implementations of method steps 4302, 4304, and 4306 as shown and described elsewhere herein, unless context requires otherwise.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution.

Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote-appropriate computing/communication systems, combined with standard engineering practices.

Specific examples of such components include commercially described components such as Intel Corporation's mote components and supporting hardware, software, and firmware.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

What is claimed is:

1. A method, comprising:
   selectively varying, by at least one ad hoc programmed computer processor of at least one first mote, at least one antenna property operatively associated with a plurality of first antennas elements of at least one first-mote directional antenna of the at least one first mote so that the plurality of first antennas elements are configured to continuously cycle through a plurality of states over a time period, wherein each state of the plurality of states associated with a respective time interval of a plurality of time intervals within the time period and a respective communication alignment of the at least one first-mote directional antenna of the at least one first mote;
   wherein the at least one first-mote directional antenna comprises the plurality of first antennas elements;
   causing, by the at least one ad hoc programmed computer processor of the at least one first mote, to establish a communication link between the at least one first mote and at least one second mote, based on at least one first state of the plurality of states corresponding to at least one first desired communication alignment between the at least one first-mote directional antenna of the at least one first mote and at least one second mote directional antenna of the at least one second mote during at least one first time interval of the plurality of time intervals;
   wherein the communication link comprises a plurality of signals which has been exchanged between the at least one first mote and the at least one second mote;
   monitoring, in real time, by the at least one ad hoc programmed computer processor of the at least one first mote, at least one communication condition of the communication link, wherein the at least one communication condition is at least one of:
   i) a level of at least one signal indicator of at least one signal characteristic of each signal of the plurality of signals,
   ii) a level change of the at least one signal indicator of the at least one signal characteristic of each signal of the plurality of signals, and
   iii) a rate of change of the at least one signal indicator of the at least one signal characteristic of each signal of the plurality of signals;
   determining, by the at least one ad hoc programmed computer processor of the at least one first mote, based on the at least one communication condition, at least one second state of the plurality of states corresponding to at least one second desired communication alignment between the at least one first-mote directional antenna of the at least one first mote and at least one second-mote directional antenna of the at least one second mote during at least one second time interval of the plurality of time intervals, wherein the at least one second desired communication alignment is superior to the at least one first desired communication alignment; and
   causing, by the at least one ad hoc programmed computer processor of the at least one first mote, to continue the communication link between the at least one first mote and the at least one second mote, based on the at least one second state of the plurality of first antenna elements,
   wherein the selectively varying the at least one antenna property operatively associated with the plurality of first antennas elements comprises:
   selectively moving or switching various tuning stubs respectively associated with at least one first antenna element of the plurality of first antennas elements to direct a field of regard of the first-mote directional antenna.

2. The method of claim 1, wherein the at least one first mote and the at least one second mote are of the same mote type.

3. The method of claim 1, wherein the first mote and the at least one second mote are distinct mote types.

4. The method of claim 1, wherein the selectively varying the at least one antenna property operatively associated with the plurality of first antennas elements comprises:
   selectively varying at least one relative phase respectively associated with at least one first antenna element of the plurality of first antennas elements.

5. The method of claim 4, wherein the selectively varying the at least one relative phase comprises:
   selectively positioning at least one first antenna element of the plurality of first antennas elements with respect to at least one other first antenna element of the plurality of first antennas elements.

6. The method of claim 1, wherein the selectively varying the at least one antenna property operatively associated with the plurality of first antennas elements comprises:
   selectively varying at least one relative dielectric constant respectively associated with at least one first antenna element of the plurality of first antennas elements.

7. The method of claim 1, wherein the selectively varying the at least one antenna property operatively associated with the plurality of first antennas elements comprises:
   selectively switching at least one delay element respectively associated with at least one first antenna element of the plurality of first antennas elements.

8. The method of claim 1, wherein the selectively varying the at least one antenna property operatively associated with the plurality of first antennas elements, comprises:
selectively varying a transmission frequency respectively associated with at least one first antenna element of the plurality of first antennas elements.

9. The method of claim 1, wherein each signal is a packet.

10. The method of claim 1, wherein the at least one signal characteristic is one of:
i) a signal strength, and
ii) a signal-to-noise ratio.

11. The method of claim 1, further comprising:
upon causing to establish a communication link, detecting, by the at least one ad hoc programmed computer processor of the at least one first mote, an incoming pre-defined seek-mote-antennas signal over the at least one first-mote directional antenna;
beginning, by the at least one ad hoc programmed computer processor of the at least one first mote, adjustment of the at least one first-mote directional antenna by performing one or more of generating a pre-defined beacon and communicating with the at least one second mote directional antenna; and
moving, by the at least one ad hoc programmed computer processor of the at least one first mote, a beam of the at least one first-mote directional antenna in an arc or circle through a discrete set of angles.

12. The method of claim 1, wherein each of the at least one first mote and the at least one second mote comprises semi-autonomous computing, communication, and sensing devices implemented on a substrate.

13. The method of claim 1, wherein a field of regard of the at least one first-mote directional antenna operably aligns with a field of regard of the at least one second-mote directional antenna such that signals may be received and transmitted between the at least one first-mote directional antenna and the at least one second-mote directional antenna.

14. The method of claim 1, further comprising:
determining, by the at least one ad hoc programmed computer processor of the at least one first mote in communication with the at least one second mote, one or more times at which a strength of a beacon signal is at least one of maximum values.

15. The method of claim 14, further comprising:
determining, by the at least one ad hoc programmed computer processor of the at least one first mote in communication with the at least one second mote, one or more locations along an arc of movement of the at least one second mote directional antenna of the at least one second mote that correspond to the times at which the strength of the beacon signal is at least one of the maximum values.

16. The method of claim 1, further comprising:
adjusting, by the at least one ad hoc programmed computer processor of the at least one first mote, a field of regard of the at least one first-mote directional antenna of the at least one first mote in response to a direction associated with the at least one second-mote directional antenna of the at least one second mote.

17. The method of claim 1, further comprising:
receiving, by the at least one ad hoc programmed computer processor of the at least one first mote, a signal from the at least one second mote upon detection of an initiation signal at the at least one second mote; and
initiating, by the at least one ad hoc programmed computer processor of the at least one first mote, at least one of adjusting a beam of the at least one second mote directional antenna and transmitting a signal over a beam of at least one second mote directional antenna in response to the detection of the initiation signal.

18. The method of claim 1, further comprising:
adjusting, by the at least one ad hoc programmed computer processor of the at least one first mote, the at least one first mote in response to receiving communications at the at least one first mote analogous to adjusting the at least one second mote in response to receiving communications at the at least one second mote.

19. The method of claim 1, wherein one of the at least one first-mote directional antenna and at least one second-mote directional antenna is connected to only one mote.

20. The method of claim 1, wherein one of the at least one first-mote directional antenna and at least one second-mote directional antenna is connected to more than one mote.

21. The method of claim 1, wherein selectively moving or switching various tuning stubs respectively associated with at least one first antenna element of the plurality of first antennas elements to direct a field of regard of the first-mote directional antenna comprises selectively moving various tuning stubs respectively associated with at least one first antenna element of the plurality of first antennas elements to direct the field of regard of the first-mote directional antenna.

22. The method of claim 1, wherein selectively moving or switching various tuning stubs respectively associated with at least one first antenna element of the plurality of first antennas elements to direct a field of regard of the first-mote directional antenna comprises selectively switching various tuning stubs respectively associated with at least one first antenna element of the plurality of first antennas elements to direct the field of regard of the first-mote directional antenna.

23. The method of claim 1, wherein selectively moving or switching various tuning stubs respectively associated with at least one first antenna element of the plurality of first antennas elements to direct a field of regard of the first-mote directional antenna comprises selectively moving in and out various tuning stubs respectively associated with at least one first antenna element of the plurality of first antennas elements to direct the field of regard of the first-mote directional antenna.

24. The method of claim 1, wherein selectively moving or switching various tuning stubs respectively associated with at least one first antenna element of the plurality of first antennas elements to direct a field of regard of the first-mote directional antenna comprises selectively switching in and out various tuning stubs respectively associated with at least one first antenna element of the plurality of first antennas elements to direct the field of regard of the first-mote directional antenna.

25. A first mote, comprising:
at least one first-mote directional antenna;
wherein the at least one first-mote directional antenna comprises a plurality of first antennas elements;
at least one ad hoc programmed computer processor which is configured to perform at least the following operations:
selectively varying at least one antenna property operatively associated with the plurality of first antennas elements of the at least one first-mote directional antenna of the first mote so that the plurality of first antennas elements are configured to continuously cycle through a plurality of states over a time period, wherein each state of the plurality of states associated with a respective time interval of a plurality of time intervals within the time period and wherein each state corresponds to a respective communication alignment of the at least one first-mote directional antenna of the first mote;

wherein the at least one first-mote directional antenna comprises the plurality of first antennas elements;

causing to establish a first communication link between the first mote and at least one second mote, based on at least one first state of the plurality of states corresponding to at least one first desired communication alignment between the at least one first-mote directional antenna of the first mote and at least one second-mote directional antenna of the at least one second mote during at least one first time interval of the plurality of time intervals;

wherein the communication link comprises a plurality of signals which has been exchanged between the first mote and the at least one second mote;

monitoring, in real time, at least one communication condition of the communication link, wherein the at least one communication condition is at least one of:
i) a level of at least one signal indicator of at least one signal characteristic of each signal of the plurality of signals,
ii) a level change of the at least one signal indicator of the at least one signal characteristic of each signal of the plurality of signals, and
iii) a rate of change of the at least one signal indicator of the at least one signal characteristic of each signal of the plurality of signals;

determining, based on the at least one communication condition, at least one second state of the plurality of states corresponding to at least one second desired communication alignment between the at least one first-mote directional antenna of the first mote and at least one second-mote directional antenna of the at least one second mote during at least one second time interval of the plurality of time intervals, wherein the at least one second desired communication alignment is superior to the at least one first desired communication alignment; and causing to continue the communication link between the first mote and the at least one second mote, based on the at least one second state of the plurality of first antenna elements, wherein the selectively varying the at least one antenna property operatively associated with the plurality of first antennas elements comprises:

selectively moving or switching various tuning stubs respectively associated with at least one first antenna element of the plurality of first antennas elements to direct a field of regard of the first-mote directional antenna.

26. The first mote of claim 25, wherein the first mote and the at least one second mote are of the same mote type.

27. The first mote of claim 25, wherein the first mote and the at least one second mote are distinct mote types.

28. The first mote of claim 25, wherein the selectively varying the at least one antenna property operatively associated with the plurality of first antennas elements, comprises:

selectively varying at least one relative phase respectively associated with at least one first antenna element of the plurality of first antennas elements.

29. The first mote of claim 28, wherein the selectively varying the at least one relative phase comprises:

selectively positioning at least one first antenna element of the plurality of first antennas elements with respect to at least one other first antenna element of the plurality of first antennas elements.

30. The first mote of claim 25, wherein the selectively varying the at least one antenna property operatively associated with the plurality of first antennas elements comprises:

selectively varying at least one relative dielectric constant respectively associated with at least one first antenna element of the plurality of first antennas elements.

31. The first mote of claim 25, wherein the selectively varying the at least one antenna property operatively associated with the plurality of first antennas elements comprises:

selectively switching at least one delay element respectively associated with at least one first antenna element of the plurality of first antennas elements.

32. The first mote of claim 25, wherein the selectively varying the at least one antenna property operatively associated with the plurality of first antennas elements comprises:

selectively varying a transmission frequency respectively associated with at least one first antenna element of the plurality of first antennas elements.

33. The first mote of claim 25, wherein each signal is a packet.

34. The first mote of claim 25, wherein the at least one signal characteristic is one of: i) a signal strength, and ii) a signal-to-noise ratio.

35. The first mote of claim 25, wherein selectively moving or switching various tuning stubs respectively associated with at least one first antenna element of the plurality of first antennas elements to direct a field of regard of the first-mote directional antenna comprises selectively moving various tuning stubs respectively associated with at least one first antenna element of the plurality of first antennas elements to direct the field of regard of the first-mote directional antenna.

36. The first mote of claim 25, wherein selectively moving or switching various tuning stubs respectively associated with at least one first antenna element of the plurality of first antennas elements to direct a field of regard of the first-mote directional antenna comprises selectively switching various tuning stubs respectively associated with at least one first antenna element of the plurality of first antennas elements to direct the field of regard of the first-mote directional antenna.

37. The first mote of claim 25, wherein selectively moving or switching various tuning stubs respectively associated with at least one first antenna element of the plurality of first antennas elements to direct a field of regard of the first-mote directional antenna comprises selectively moving in and out various tuning stubs respectively associated with at least one first antenna element of the plurality of first antennas elements to direct the field of regard of the first-mote directional antenna.

38. The first mote of claim 25, wherein selectively moving or switching various tuning stubs respectively associated with at least one first antenna element of the plurality of first antennas elements to direct a field of regard of the first-mote directional antenna comprises selectively switching in and out various tuning stubs respectively associated with at least one first antenna element of the plurality of first antennas elements to direct the field of regard of the first-mote directional antenna.

39. A method, comprising:

selectively varying, by at least one ad hoc programmed computer processor of at least one first mote, at least one antenna property operatively associated with a plurality of first antennas elements of at least one first-mote directional antenna of the at least one first mote so that the plurality of first antennas elements are configured to continuously cycle through a plurality of states over a time period, wherein each state of the plurality of states associated with a respective time interval of a plurality of time intervals within the time period and a respective communication alignment of the at least one first-mote directional antenna of the at least one first mote;

wherein the at least one first-mote directional antenna comprises the plurality of first antennas elements;

causing, by the at least one ad hoc programmed computer processor of the at least one first mote, to establish a communication link between the at least one first mote and at least one second mote, based on at least one first state of the plurality of states corresponding to at least one first desired communication alignment between the at least one first-mote directional antenna of the at least one first mote and at least one second mote directional antenna of the at least one second mote during at least one first time interval of the plurality of time intervals;

wherein the communication link comprises a plurality of signals which has been exchanged between the at least one first mote and the at least one second mote;

monitoring, in real time, by the at least one ad hoc programmed computer processor of the at least one first mote, at least one communication condition of the communication link, wherein the at least one communication condition is at least one of:
  i) a level of at least one signal indicator of at least one signal characteristic of each signal of the plurality of signals,
  ii) a level change of the at least one signal indicator of the at least one signal characteristic of each signal of the plurality of signals, and
  iii) a rate of change of the at least one signal indicator of the at least one signal characteristic of each signal of the plurality of signals;

determining, by the at least one ad hoc programmed computer processor of the at least one first mote, based on the at least one communication condition, at least one second state of the plurality of states corresponding to at least one second desired communication alignment between the at least one first-mote directional antenna of the at least one first mote and at least one second-mote directional antenna of the at least one second mote during at least one second time interval of the plurality of time intervals, wherein the at least one second desired communication alignment is superior to the at least one first desired communication alignment;

causing, by the at least one ad hoc programmed computer processor of the at least one first mote, to continue the communication link between the at least one first mote and the at least one second mote, based on the at least one second state of the plurality of first antenna elements;

upon causing to establish a communication link, detecting, by the at least one ad hoc programmed computer processor of the at least one first mote, an incoming pre-defined seek-mote-antennas signal over the at least one first-mote directional antenna;

beginning, by the at least one ad hoc programmed computer processor of the at least one first mote, adjustment of the at least one first-mote directional antenna by performing one or more of generating a pre-defined beacon and communicating with the at least one second mote directional antenna; and moving, by the at least one ad hoc programmed computer processor of the at least one first mote, a beam of the at least one first-mote directional antenna in an arc or circle through a discrete set of angles, wherein moving the beam of the at least one first-mote directional antenna in the arc or circle through the discrete set of angles further comprises:

sweeping, by the at least one ad hoc programmed computer processor of the at least one first mote, an angle of the discrete set of angles at a different rate from that of a sweep of a beam of the second mote directional antenna, wherein differences of rates of sweeps are predetermined by a network administrator.

\* \* \* \* \*